(12) United States Patent
Evans

(10) Patent No.: US 10,759,286 B2
(45) Date of Patent: Sep. 1, 2020

(54) INTELLIGENT POD MANAGEMENT AND TRANSPORT

(71) Applicant: Michael Steward Evans, Los Gatos, CA (US)

(72) Inventor: Michael Steward Evans, Los Gatos, CA (US)

(*) Notice: Subject to any disclaimer, the term of this patent is extended or adjusted under 35 U.S.C. 154(b) by 0 days.

(21) Appl. No.: 16/599,514

(22) Filed: Oct. 11, 2019

(65) Prior Publication Data

US 2020/0040598 A1    Feb. 6, 2020

Related U.S. Application Data

(60) Division of application No. 16/028,084, filed on Jul. 5, 2018, now Pat. No. 10,443,262, which is a
(Continued)

(51) Int. Cl.
*B64F 1/31* (2006.01)
*B60P 3/00* (2006.01)
(Continued)

(52) U.S. Cl.
CPC ............ *B60L 53/00* (2019.02); *B60L 53/14* (2019.02); *B60L 53/30* (2019.02); *B60L 53/53* (2019.02); *B60P 3/007* (2013.01); *B61B 1/02* (2013.01); *B61B 3/02* (2013.01); *B61B 13/00* (2013.01); *B62D 31/003* (2013.01); *B62D 31/025* (2013.01); *B62D 47/006* (2013.01); *B64F 1/31* (2013.01); *E04H 14/00* (2013.01); *B60L 2200/10* (2013.01); *B60L 2200/24* (2013.01); *B60L 2200/26* (2013.01); *B60L 2260/32* (2013.01); *B60M 1/30* (2013.01); *H02J 7/0027* (2013.01)

(58) Field of Classification Search
CPC .... B64F 1/30; B64F 1/305; B64F 1/31; B64F 1/36; B64F 1/366; E04H 14/00; B60L 53/14; B60L 53/30; B60P 3/007
USPC ........................................................ 244/118.1
See application file for complete search history.

(56) References Cited

U.S. PATENT DOCUMENTS 4,791,871 A * 12/1988 Mowll ...................... B60L 5/40
                                                                    104/94
4,841,871 A *  6/1989 Leibowitz ............... B61B 13/04
                                                                    104/139
(Continued)

*Primary Examiner* — Richard R. Green
*Assistant Examiner* — Brady W Frazier
(74) *Attorney, Agent, or Firm* — Donald R. Boys; Central Coast Patent Agency LLC

(57) ABSTRACT

A method for transporting a person or a parcel from a first location to a second location involves mounting a pod having a rechargeable battery and a compartment to a first vehicle, moving the first vehicle with the pod mounted to a loading position at or near the first location, loading a person or a parcel into the pod, moving the first transporter vehicle from the loading position to a first exchange point, exchanging the passenger pod from the first transporter vehicle to a second transporter vehicle at the first exchange point by de-mounting the pod from the first transporter vehicle and mounting the pod to the second transporter vehicle by a compatible physical interface between the pod and the second transporter vehicle, and transporting the second transporter vehicle with the pod to the second location.

15 Claims, 42 Drawing Sheets

Related U.S. Application Data continuation-in-part of application No. 15/982,339, filed on May 17, 2018, now Pat. No. 10,286,925, which is a continuation-in-part of application No. 15/960,975, filed on Apr. 24, 2018, now Pat. No. 10,150,524, and a continuation-in-part of application No. 15/950,018, filed on Apr. 10, 2018, now Pat. No. 10,112,728, which is a continuation-in-part of application No. 15/456,311, filed on Mar. 10, 2017, now Pat. No. 10,207,805, which is a continuation-in-part of application No. 15/260,670, filed on Sep. 9, 2016, now Pat. No. 9,937,808.

(60) Provisional application No. 62/443,187, filed on Jan. 6, 2017.

(51) Int. Cl.

| | | |
|---|---|---|
| *B61B 1/02* | (2006.01) | |
| *B62D 31/00* | (2006.01) | |
| *B61B 3/02* | (2006.01) | |
| *B61B 13/00* | (2006.01) | |
| *B62D 31/02* | (2006.01) | |
| *B62D 47/00* | (2006.01) | |
| *B60M 1/30* | (2006.01) | |
| *E04H 14/00* | (2006.01) | |
| *B60L 53/30* | (2019.01) | |
| *B60L 53/14* | (2019.01) | |
| *B60L 53/00* | (2019.01) | |
| *B60L 53/53* | (2019.01) | |
| *H02J 7/00* | (2006.01) | |

(56) References Cited

U.S. PATENT DOCUMENTS

| | | | | |
|---|---|---|---|---|
| 5,592,883 | A * | 1/1997 | Andress, III | B60F 1/00 104/88.03 |
| 6,115,974 | A * | 9/2000 | Milanian | B63B 13/00 52/169.2 |
| 6,494,404 | B1 * | 12/2002 | Meyer | B64C 39/02 244/118.1 |
| 6,810,817 | B1 * | 11/2004 | James | B61B 13/04 104/88.02 |
| 7,344,109 | B1 * | 3/2008 | Rezai | B64C 1/22 244/118.2 |
| 7,921,782 | B2 * | 4/2011 | Keller | B61B 3/02 104/124 |
| 9,940,840 | B1 * | 4/2018 | Schubert | G01C 21/3407 |
| 10,059,349 | B2 * | 8/2018 | Phadke | B61C 13/06 |
| 2005/0247824 | A1 * | 11/2005 | Allison, Sr. | B64D 11/00 244/137.2 |
| 2007/0007389 | A1 * | 1/2007 | McCoskey | B64C 25/405 244/118.5 |
| 2007/0187183 | A1 * | 8/2007 | Saigh | E04H 14/00 186/53 |
| 2011/0042509 | A1 * | 2/2011 | Bevirt | B64C 29/0033 244/12.4 |
| 2015/0033647 | A1 * | 2/2015 | Suhami | E04H 6/10 52/236.3 |
| 2017/0116814 | A1 * | 4/2017 | Storch | G07F 17/0057 |
| 2017/0175413 | A1 * | 6/2017 | Curlander | E04H 14/00 |
| 2018/0002015 | A1 * | 1/2018 | McCullough | B64C 29/02 |

\* cited by examiner

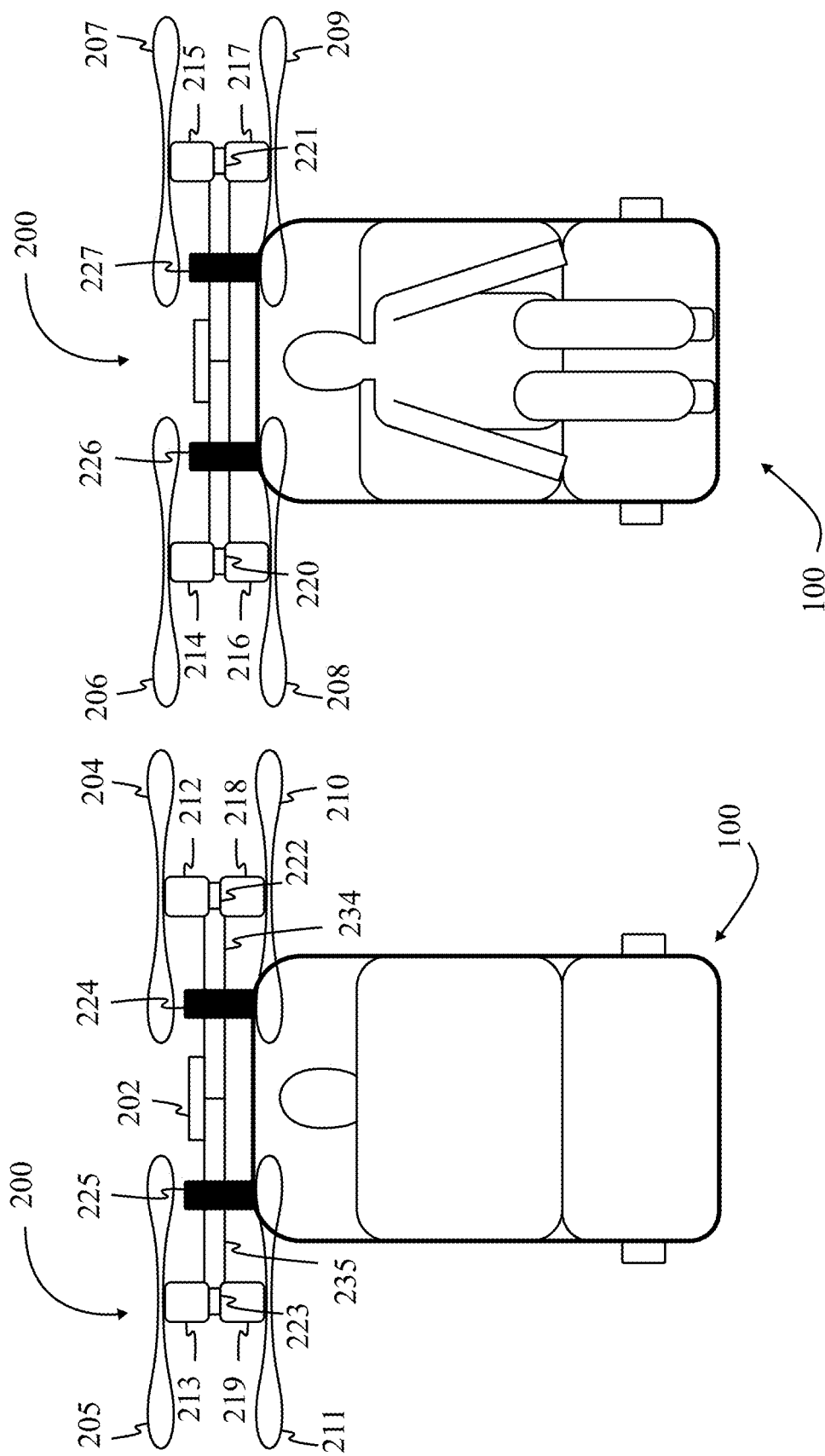

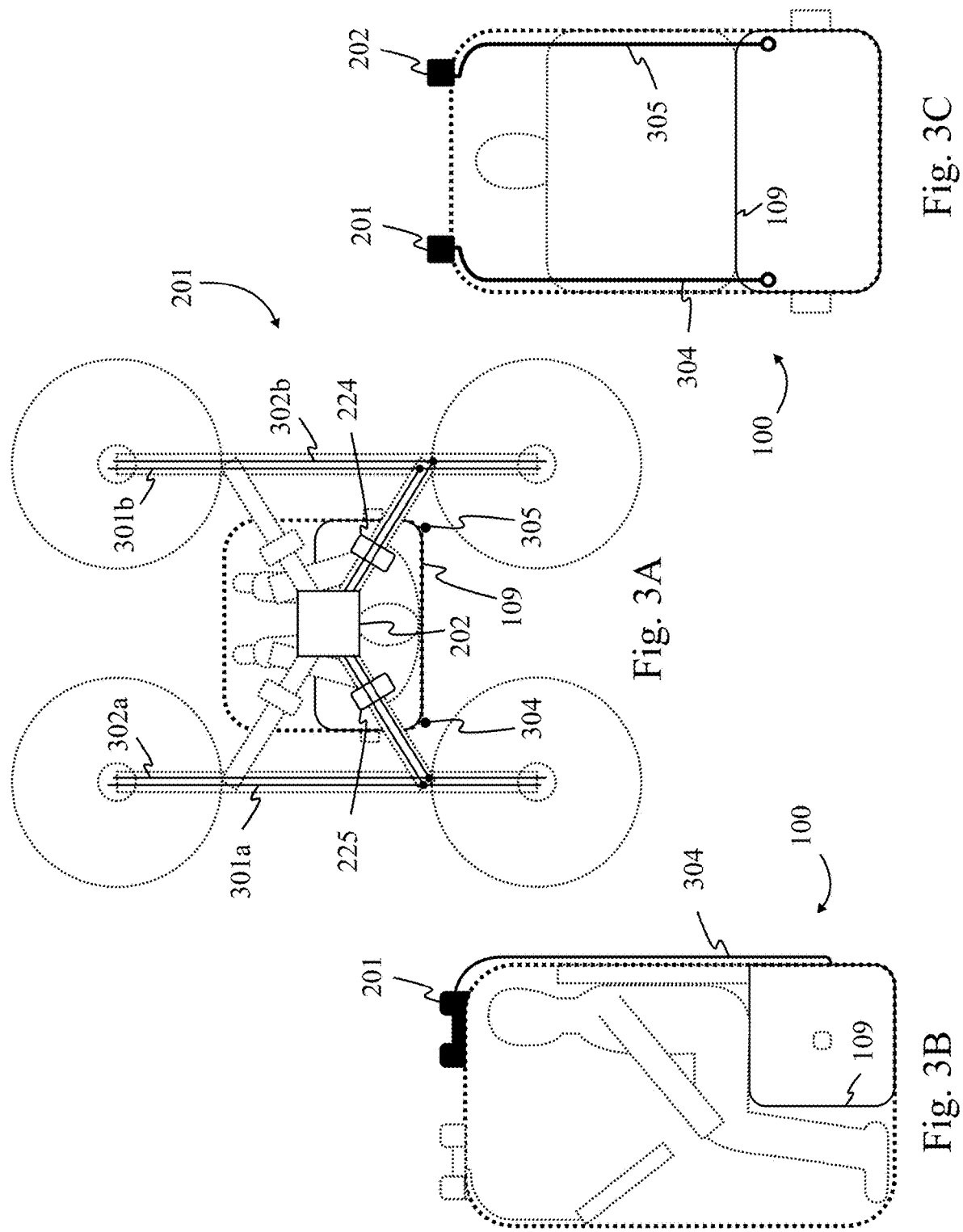

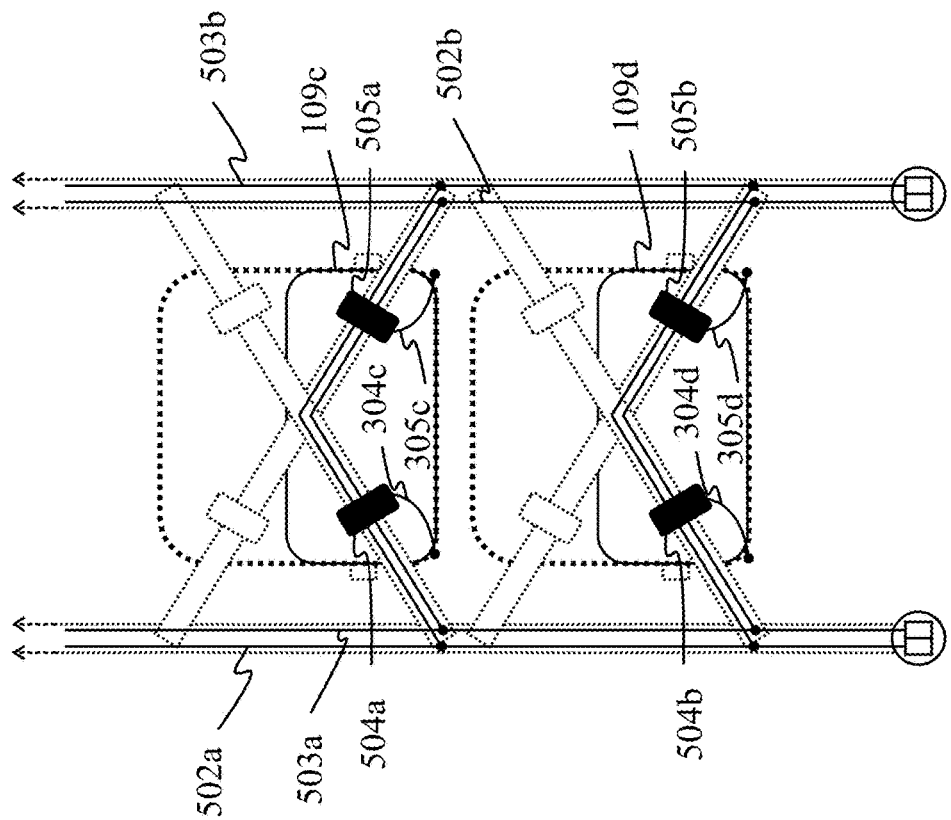
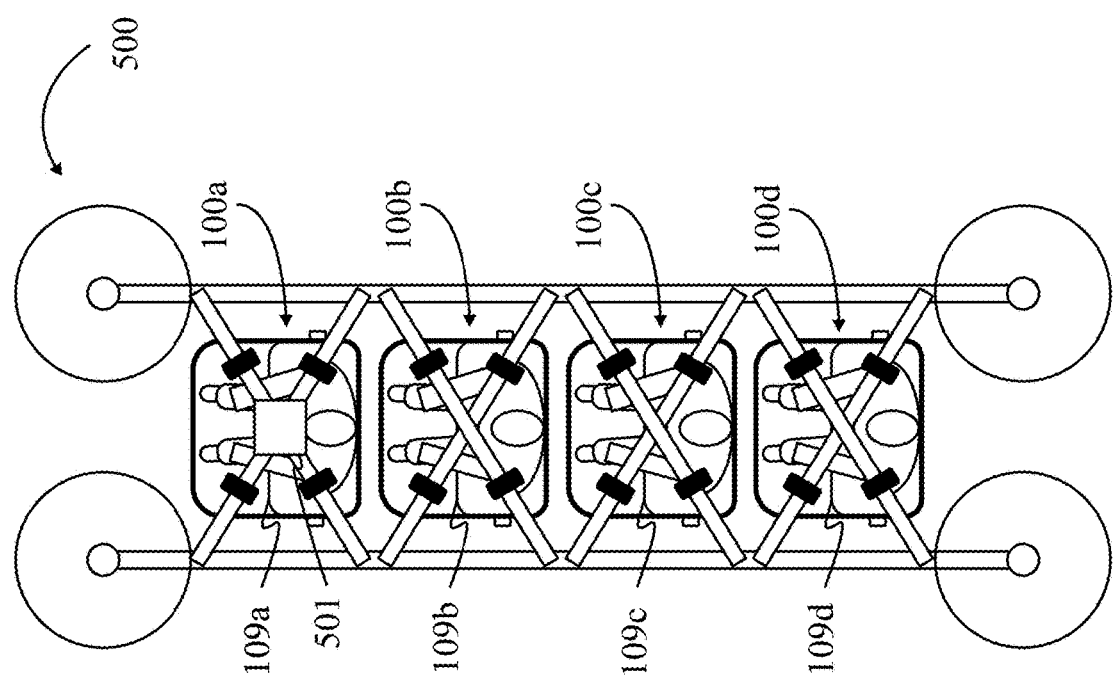
Fig. 5B
Fig. 5A

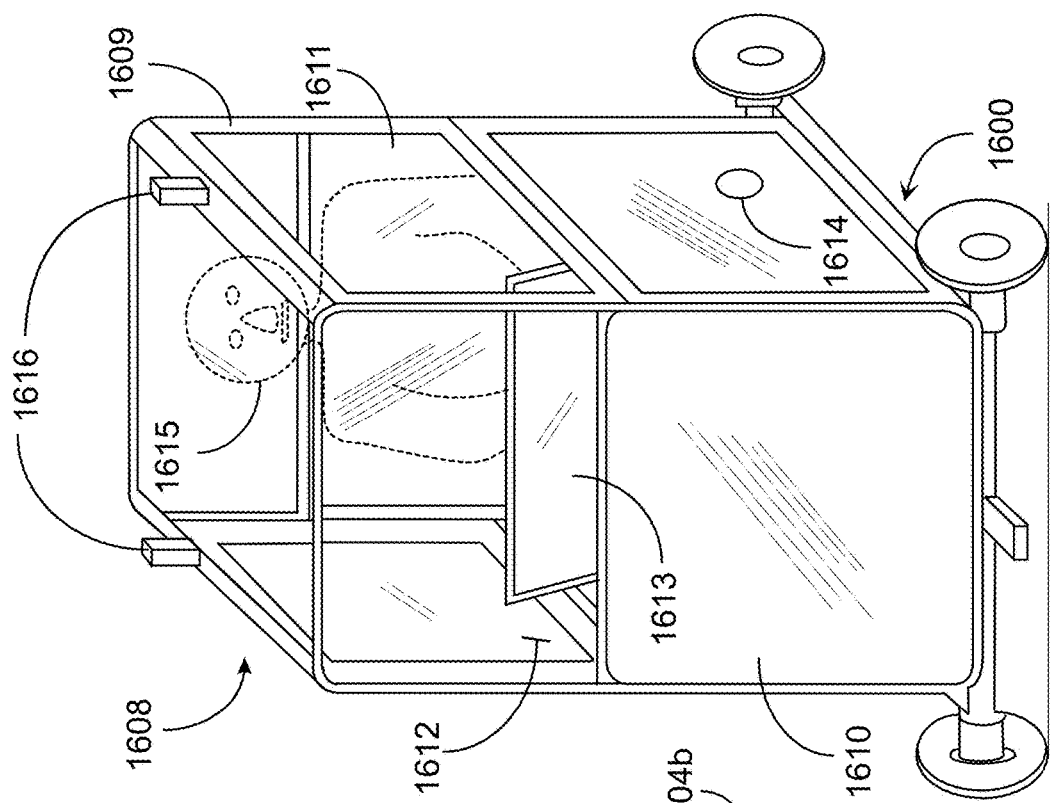
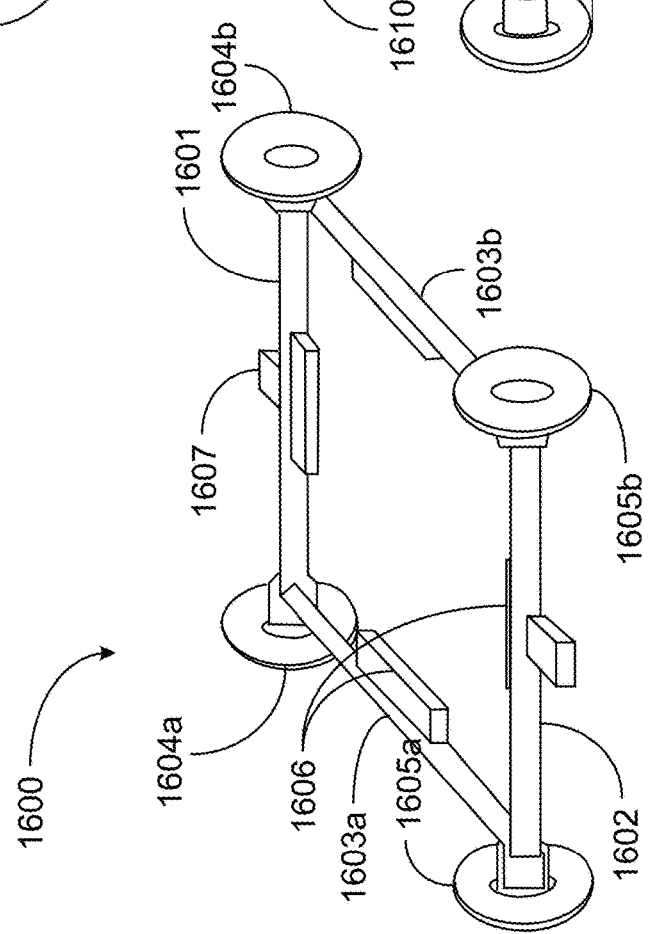

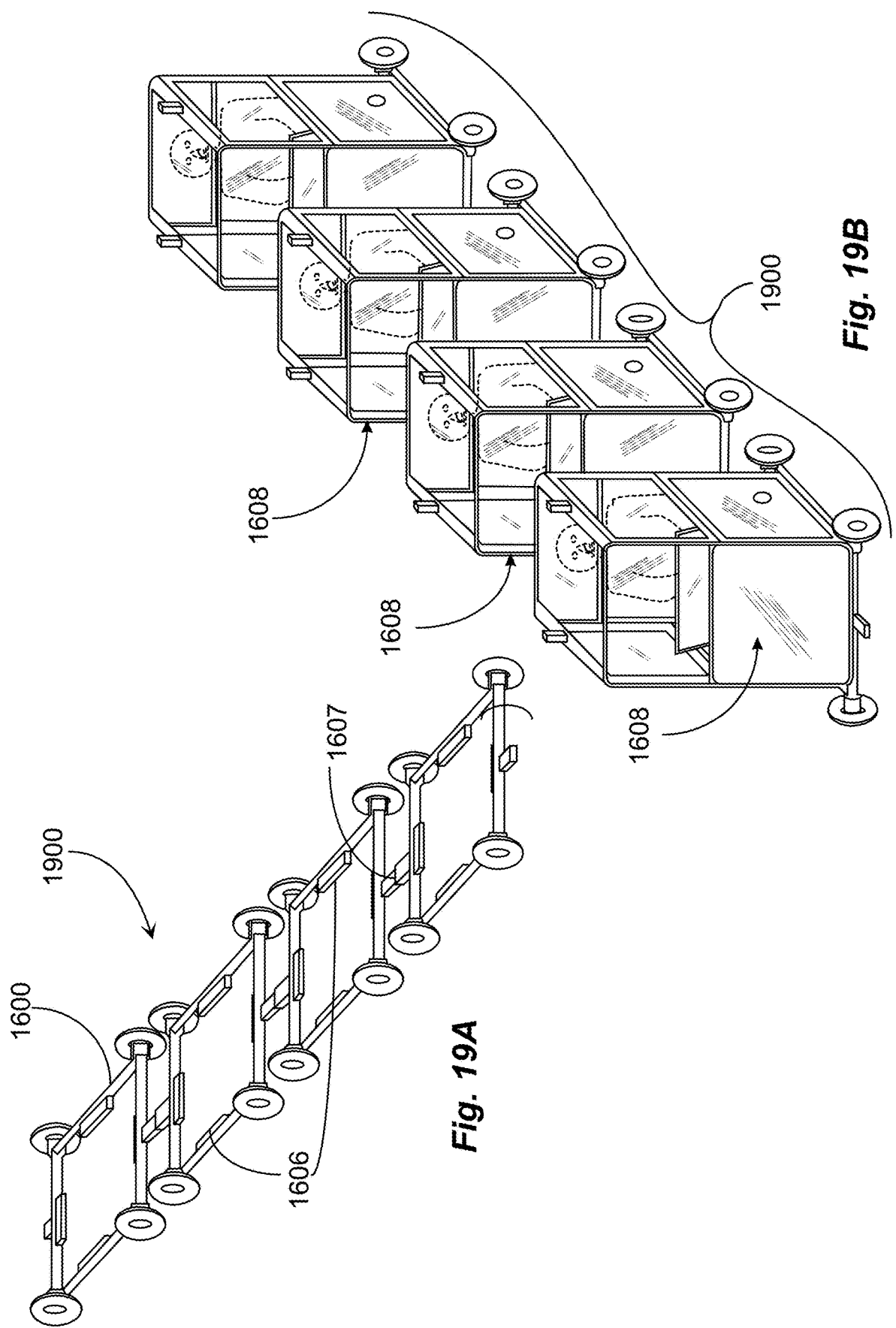

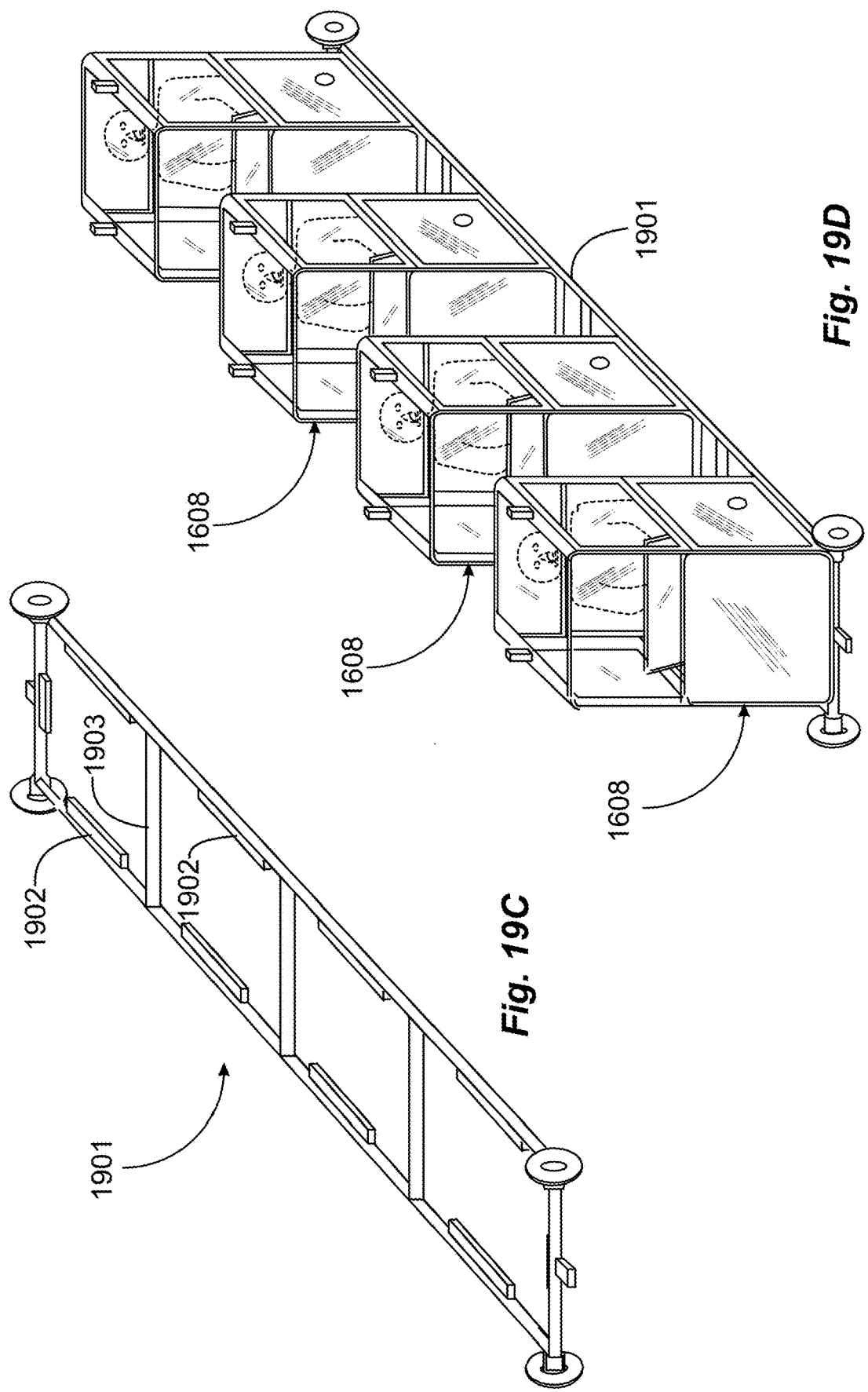

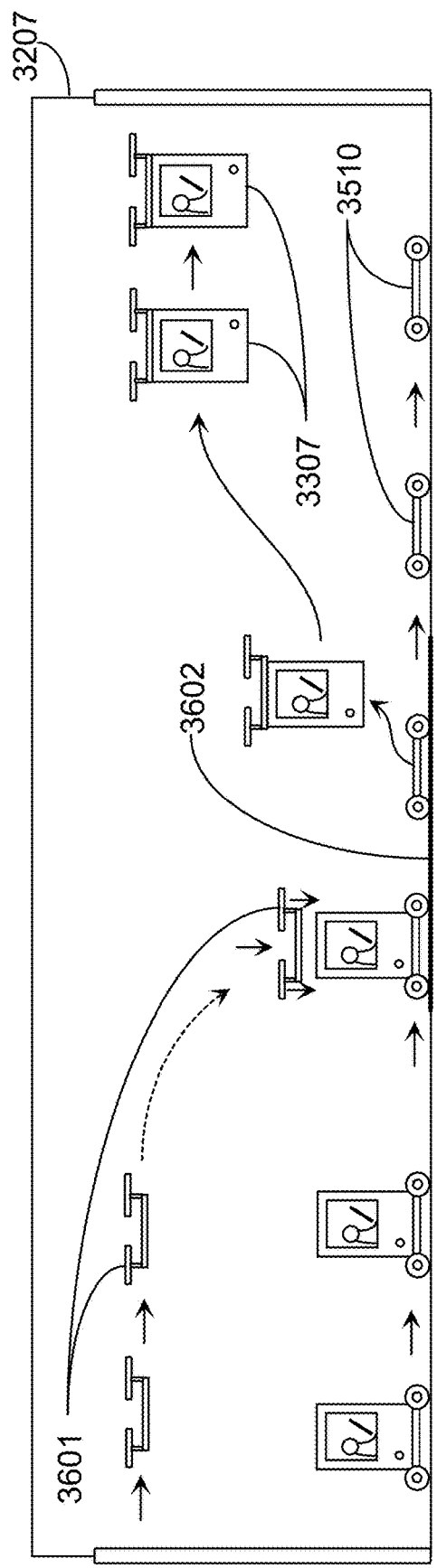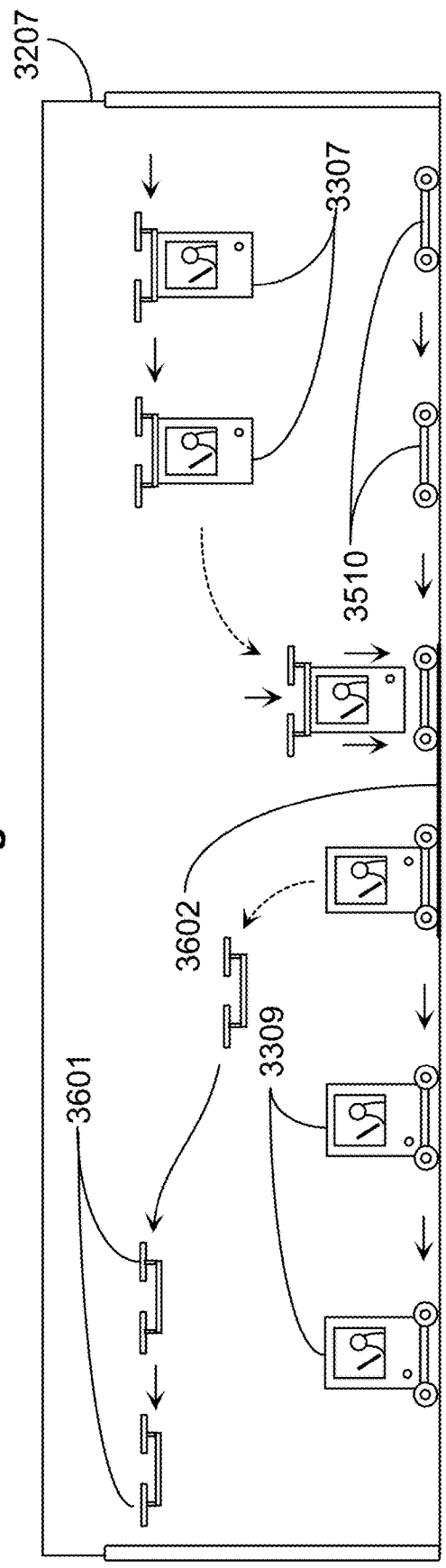
Fig. 36A
Fig. 36B

INTELLIGENT POD MANAGEMENT AND TRANSPORT

CROSS-REFERENCE TO RELATED DOCUMENTS

The present application is a Divisional application of co-pending U.S. patent application Ser. No. 16/028,084, filed Jul. 5, 2018, which is a Continuation-in-Part of, and claims priority to U.S. patent application Ser. No. 15/982,339, filed May 17, 2018 and issued on May 14, 2019 as U.S. patent Ser. No. 10/286,925, which is a Continuation-in-Part of Ser. No. 15/960,975, filed Apr. 24, 2018 and issued on Dec. 11, 2018 as U.S. patent Ser. No. 10/150,524, which is a Continuation-in-Part of Ser. No. 15/456,311, entitled "Drone Transport System", filed on Mar. 10, 2017 and issued on Feb. 19, 2019 as U.S. patent Ser. No. 10/207,805, which claims priority to provisional patent application (PPA) 62/443,187, filed Jan. 6, 2017.

Further the instant application also claims priority to U.S. Ser. No. 15/950,018, filed Apr. 10, 2018 and issued on Oct. 30, 2018 as U.S. patent Ser. No. 10/112,728, which is a Continuation-in-Part of U.S. Ser. No. 15/260,670, filed Sep. 9, 2016 and issued on Apr. 10, 2018 as U.S. Pat. No. 9,937,808.

The present application also claims priority to PPA 62/613,285 filed Jan. 3, 2018, PPA 62/639,205, filed Mar. 6, 2018, and to PPA 62/651,496, filed Apr. 2, 2018. All disclosure of the parent applications is incorporated herein at least by reference.

BACKGROUND OF THE INVENTION

1. Field of the Invention

The present invention is in the field of transport systems and pertains particularly to methods and apparatus for enabling self-driving autonomous chassis for transporting pods and drones for carrying passengers or parcels in pods.

2. Discussion of the State of the Art

It is the opinion of many that passenger drones in coming years will slowly replace cars and small trucks, and will be able to carry one passenger, or multiple, or freight, such as parcels and other cargo. These drones will be autonomous, although under the control of networks, not humans. Most drones will be battery-driven because battery technology is becoming cost competitive and improving rapidly, enabling batteries to store more energy while decreasing in size and weight.

Besides battery technology, other new technologies exist today to make passenger drones quite feasible: Examples are Internet of Things (IoT) to enable communication between a wide range of electronic devices; collision avoidance, including using video recognition; highly intelligent electronics that are also lightweight, cheap and small; advanced radio communications, such as the latest Wi-Fi specifications and upcoming 5G variants; advanced fast response motors and control; and new flying technologies and materials that are lightweight and strong. Also, the demand is now here for two major reasons. Firstly, three-dimensional, above-ground transport avoids rush hour traffic jams, where commuters all over the world get stuck every morning and evening wasting valuable time on a 2-dimensional surface. Secondly, for environmental reasons, because batteries plus electric motors eliminate the need for fossil fuels and are now cost competitive.

Currently there is a system known to the inventor, but not the public, and described in the priority documents as a drone transport system capable of engaging and transporting a pod that may hold one or more passengers or may be filled with parcels to deliver to a destination or may have a combination of passengers and freight.

The system alluded to above includes a carrier pod, hereafter pod, adapted for carrying a passenger or parcels with the passenger or parcels enclosed, the pod having an attachment interface for automated attachment to a drone. The flight-enabled drone is controllable to approach the pod from above, to align and engage the attachment interfaces to latch onto and to lift and carry the pod from one place to another, and to land and disengage the attachment interfaces, leaving the pod at a new place, and lifting off again.

The pod may include a seat and battery and can carry one person, or it may have no passenger seat and is dedicated to parcel delivery. The system as known to the inventor may include a variety of drones, such as one enabled to attach to and carry a plurality of passenger pods, or parcel pods, or a mixture of each. The flight-enabled drone, depending on design, may carry a plurality of passenger or parcel pods arranged linearly and oriented in the direction of flight. The pods may be adapted to carry a plurality of passengers each having seating for each passenger such as for example, four persons in seats one behind the other, eight people in two rows of four each.

The carrier drones comprise a plurality of electric motors driving a plurality of propeller rotors, a control system and wireless connectivity to one or more control stations. The system includes battery power lines from the pod and carrier drone batteries that may become connected through the attachment interface mechanism such that the drone may draw power from the connected pod to gain more flight time. In use of the system pods may be stored at pod exchange stations and may be picked up or dropped off at such stations localized for convenience to passengers headed to a destination.

The pods may be stored and picked up or dropped off at locations known as exchanges stations, but otherwise do not move unless being carried by a drone or in some other mode of transport. Therefore, what is clearly needed is an exchange station transferring pods from one mode of transport to another, and for charging batteries in various apparatus of the system.

BRIEF SUMMARY OF THE INVENTION

In one embodiment of the invention method for transporting a person from a first location to a second location is provided, comprising mounting a passenger pod having a rechargeable battery and a compartment with seating for a person, to a first transporter vehicle, by a compatible physical interface between the passenger pod and the first transporter vehicle, moving the first transporter vehicle with the passenger pod mounted to a personal loading position at or near the first location, loading a person into the passenger pod mounted to the first transporter vehicle at the personal loading position; moving the first transporter vehicle from the personal loading position to a first exchange point, exchanging the passenger pod with person aboard from the first transporter vehicle to a second transporter vehicle at the first exchange point by de-mounting the passenger pod from the first transporter vehicle and mounting the passenger pod to the second transporter vehicle by a compatible physical interface between the passenger pod and the second transporter vehicle, and transporting the second transporter vehicle with the passenger pod to the second location.

In one embodiment the method comprises powering the first transporter vehicle by the rechargeable battery in the passenger pod through a separable electrical interface between the passenger pod and the first transporter vehicle. Also, in one embodiment the method comprises mounting the passenger pod having a rechargeable battery, to an intelligent wheeled chassis capable of navigating on surface pathways as the first transporter vehicle, and exchanging the passenger pod from the intelligent wheeled chassis at the first exchange point to an Unmanned Aerial Vehicle (UAV), adapted to carry the passenger pod suspended from the compatible physical interface. In one embodiment the method comprises mounting a wheeled passenger pod by the wheels onto a set of parallel rails and navigating the wheeled passenger pod to the first exchange point and engaging the passenger pod at the first exchange point to a UAV. And in one embodiment the first exchange point is in an exchange station having exchange facilities enabled to exchange the arriving passenger pod from the first transporter vehicle to any one of a UAV, an intelligent wheeled chassis, or a powered vehicle riding on a set of rails, as the second transporter vehicle.

In one embodiment of the method the first location is a passenger terminal at an integrated exchange station and the first exchange point is a part of the integrated exchange station, the method comprising checking in and processing a passenger, loading the passenger into a passenger pod, moving the passenger pod in the integrated exchange station to the first exchange point, and exchanging the pod to UAV, an intelligent wheeled chassis, or a powered vehicle riding on a set of rails, as the second transporter vehicle. Also, in one embodiment the first transport vehicle carries a single pod and the second transport vehicle carries a plurality of pods from the first exchange point to the second location.

In another aspect of the invention a method is provided for transporting a parcel from a first location to a second location, comprising mounting a parcel pod having a rechargeable battery and a compartment for carrying the parcel to a first transporter vehicle, by a compatible physical interface between the parcel pod and the first transporter vehicle, moving the first transporter vehicle with the parcel pod mounted to a loading position at or near the first location, loading the parcel into the parcel pod mounted to the first transporter vehicle at the loading position, moving the first transporter vehicle from the loading position to a first exchange point, exchanging the parcel pod with the parcel aboard from the first transporter vehicle to a second transporter vehicle at the first exchange point by de-mounting the parcel pod from the first transporter vehicle and mounting the parcel pod to the second transporter vehicle by a compatible physical interface between the parcel pod and the second transporter vehicle, and transporting the second transporter vehicle with the parcel pod to the second location.

In one embodiment this method comprises powering the first transporter vehicle by the rechargeable battery in the parcel pod through a separable electrical interface between the parcel pod and the first transporter vehicle. Also in one embodiment the method comprises mounting the parcel pod having a rechargeable battery, to an intelligent wheeled chassis capable of navigating on surface pathways as the first transporter vehicle, and exchanging the parcel pod from the intelligent wheeled chassis at the first exchange point to an Unmanned Aerial Vehicle (UAV), adapted to carry the parcel pod suspended from the compatible physical interface. In one embodiment the method comprises mounting a wheeled parcel pod by the wheels onto a set of parallel rails, navigating the wheeled parcel pod to the first exchange point, and engaging the parcel pod at the first exchange point to a UAV. And in one embodiment the first exchange point is in an exchange station having exchange facilities enabled to exchange the arriving parcel pod from the first transporter vehicle to any one of a UAV, an intelligent wheeled chassis, or a powered vehicle riding on a set of rails, as the second transporter vehicle.

In one embodiment of this method the first location is a terminal at an integrated exchange station and the first exchange point is a part of the integrated exchange station, the method comprising checking in and processing one or more parcels, loading the parcels into a parcel pod, moving the parcel pod in the integrated exchange station to the first exchange point, and exchanging the parcel pod to UAV, an intelligent wheeled chassis, or a powered vehicle riding on a set of rails, as the second transporter vehicle. In one embodiment the first transport vehicle carries a single pod and the second transport vehicle carries a plurality of pods from the first exchange point to the second location. In one embodiment this method comprises loading a plurality of parcels having a common destination to a single parcel pod. And in one embodiment the method comprises recharging transport vehicles and pod batteries as needed within the exchange station.

BRIEF DESCRIPTION OF THE SEVERAL VIEWS OF THE DRAWINGS

FIG. 2C is a rear view of a single-person pod attached to a transport drone according to one embodiment of the present invention.

FIG. 2D is a front view of a single-person pod attached a to transport drone according to one embodiment of the present invention.

FIG. 3A is a top view of a transport drone with an attached pod with a wiring layout according to one embodiment of the present invention.

FIG. 3B is a side view of a pod with a wiring layout according to one embodiment of the present invention.

FIG. 3C is a back view of a pod with a wiring layout according to one embodiment of the present invention.

FIG. 5A is a top view of a 4-pod transport drone capable of transporting four single-person pods according to one embodiment of the present invention.

FIG. 5B is an in-depth top view of a segment of a 4-pod transport drone according to one embodiment of the present invention.

FIG. 16A is a perspective view of an intelligent pod chassis according to one embodiment of the present invention.

FIG. 16B is a perspective view of a passenger pod seated and latched to the chassis of FIG. 16A.

FIG. 19A is a perspective view of a train of pod chassis.

FIG. 19B is a perspective view of a pod plus chassis group linked together or aligned by command to travel in line.

FIG. 19C is a perspective view of a chassis in another embodiment of the invention.

FIG. 19D is a perspective view of pods carried by the chassis of FIG. 19C.

FIG. 36A is an elevation cut-away view of the drone connect-release bay of FIG. 32 depicting a drone connect operation.

FIG. 36B is an elevation cut-away view of the drone connect-release bay of FIG. 32 depicting a drone release operation.

DETAILED DESCRIPTION OF THE INVENTION

In various embodiments described in enabling detail herein, the inventor provides a unique drone enabled transport system that includes self-navigating chassis carrying pods, that may carry passengers or parcels. The present invention is described using the following examples, which may describe more than one relevant embodiment falling within the scope of the invention.

Single Pod Drones

What is generally proposed as unique in embodiment of the invention is a drone and pods which may separate from each other. All pods in this system may conform to a standardized drone-pod attaching system, and the pods may be used to carry passengers, parcels, or both.

Figure 1A:
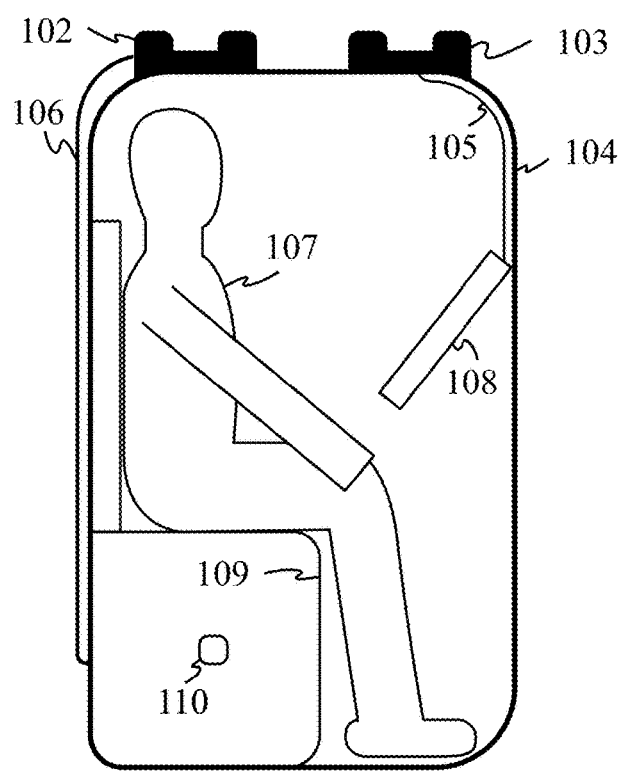
FIG. 1A is a side view of a single-person pod occupied by a person according to one embodiment of the present invention.
Figure 1B:
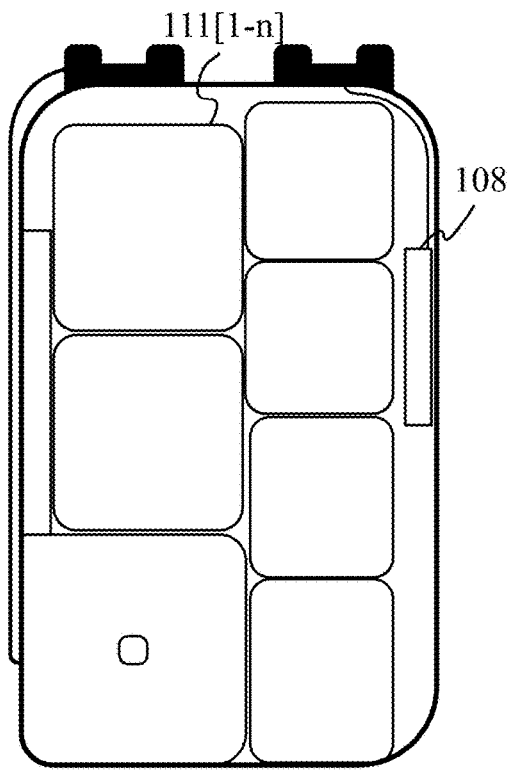
FIG. 1B is a side view of a pod occupied by a plurality of parcels to be delivered according to one embodiment of the present invention.
Figure 1C:
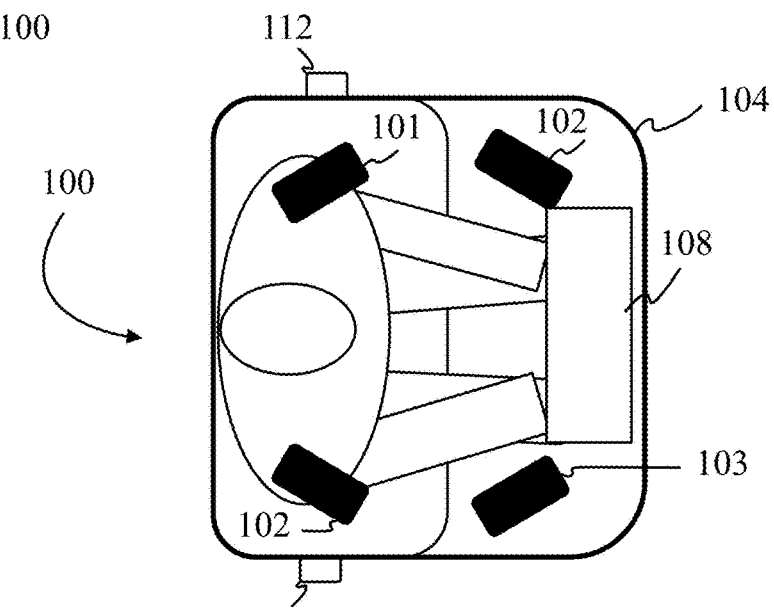
FIG. 1C is a top view of a single-person pod occupied by a person according to one embodiment of the present invention.
Figure 2A:
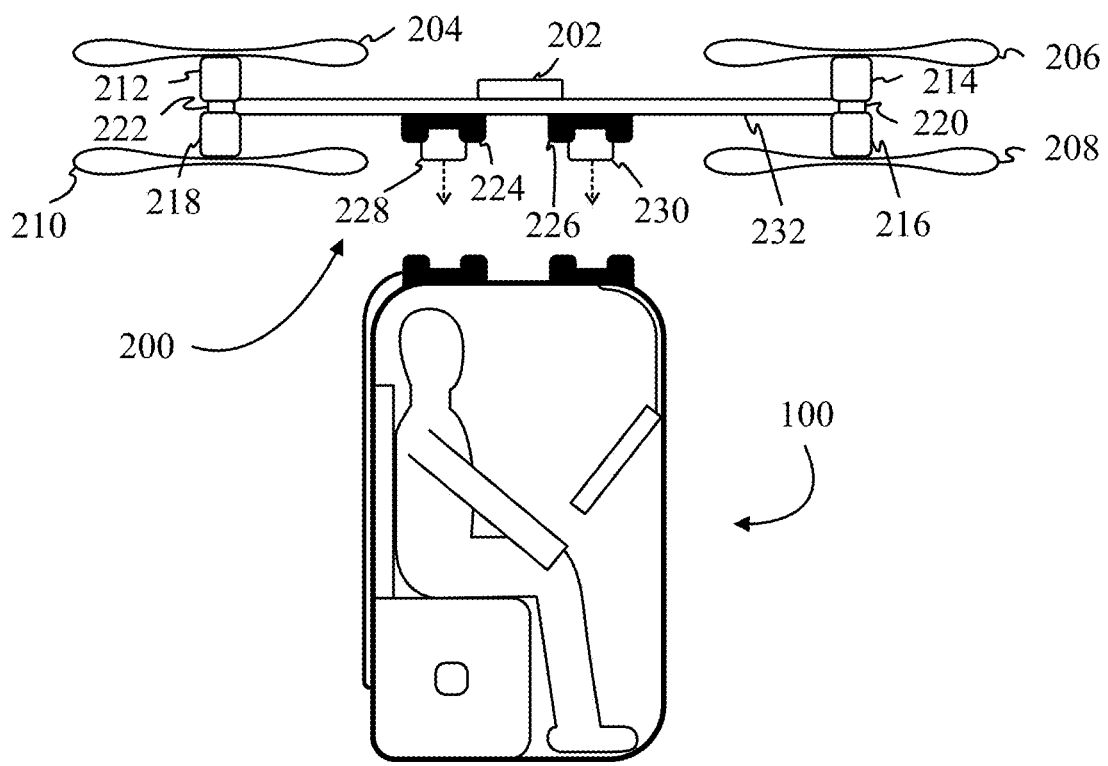
FIG. 2A is a side view of a single-person pod soon to be attached to a transport drone according to one embodiment of the present invention.
Figure 2B:
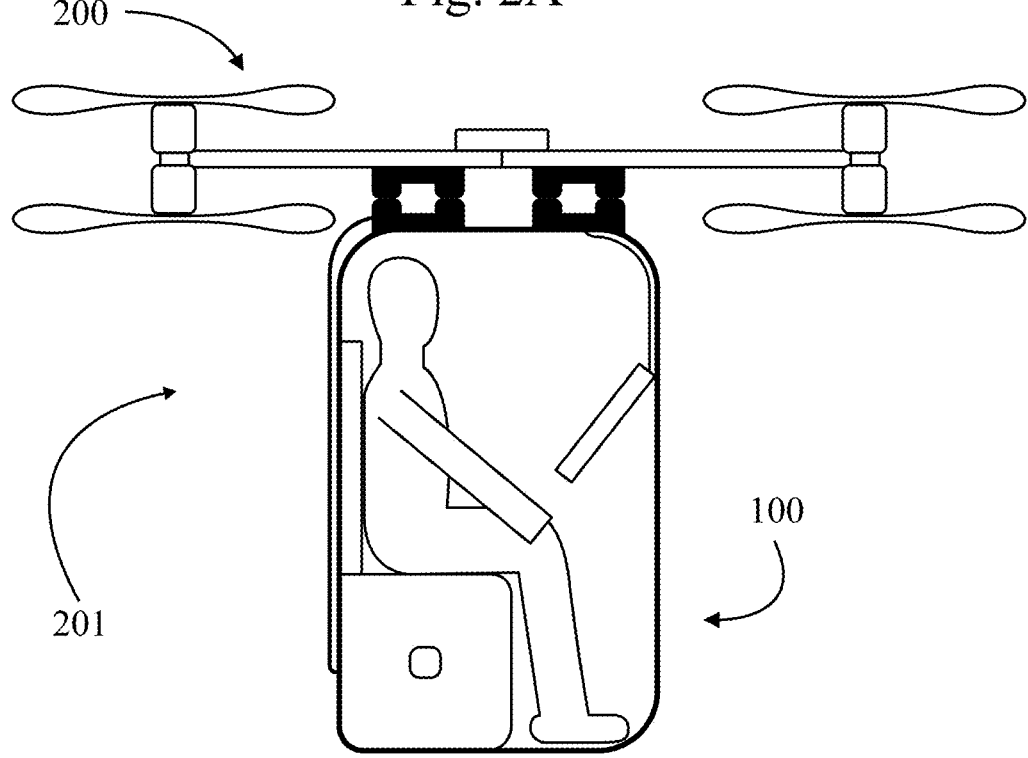
FIG. 2B is a side view of a single-person pod attached to a transport drone according to one embodiment of the present invention.
Figure 2E:
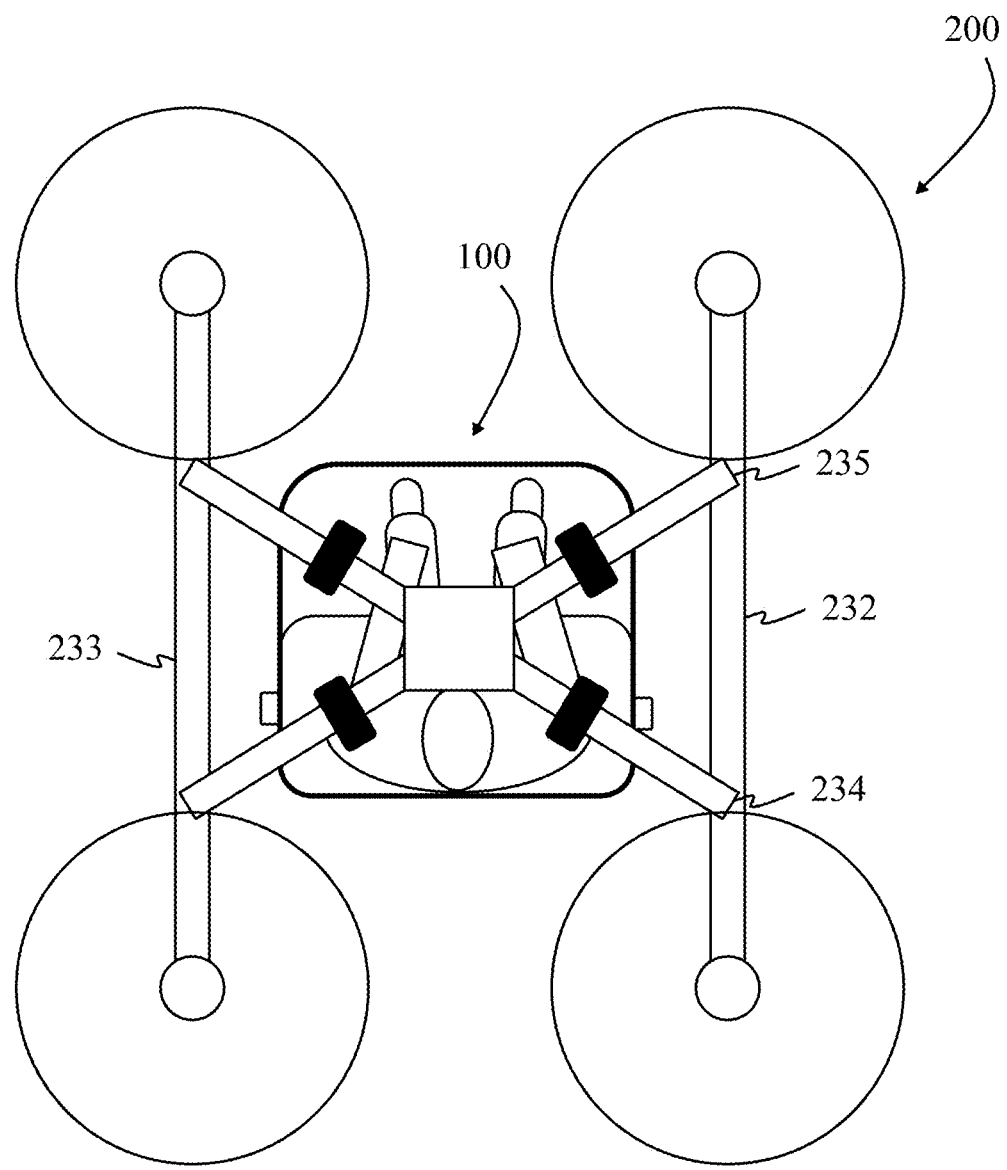
FIG. 2E is a top view of a single-person pod attached to a transport drone according to one embodiment of the present invention.

FIGS. 1A to 1C are illustrations of a pod 100 according to one embodiment of the present invention. Pod 100 comprises a capsule about the height of a passenger 107 while seated and around 1 m×1 m (3'×3') in width and depth. These dimensions are exemplary and may vary considerably. Pod 100 may have four latches on its roof, labeled 101 through 104, to latch the pod to a transport drone, as explained in further detail below. In the embodiment illustrated, a single occupant 107 is inside pod 100, but pod 100 may be adapted for other arrangements, such as, but not limited to, a mother with baby, or two small children, or an adult with an animal, such as a dog, or an adult with baggage that will fit in an overhead luggage compartment that may be present. Pod 100 may have a maximum weight limit for the total load, above which the drone may not take off as a safety precaution. A pod control box 108 present in pod 100 may display the present weight of the contents of pod 100, along with other relevant information. Pod control box 108 is further detailed below. Besides being used to transport passengers, pod 100 may be used to transport parcels 111[1-n], as shown in FIG. 1B. Parcels 111[1-n] may be loaded in at an approved parcel bay by a qualified loader.

Each pod 100 may have a highly intelligent pod control box 108 that has its own touch screen display in front of occupant 107. The control may box may be foldable to be flat against the front side in the case of transporting parcels 111[1-n], but relevant information may remain visible from the outside in case of issues. Pod control box 108 links up to the roof of pod 100 by wired or wireless connection for connecting to a drone. In one embodiment of the present invention, control box 108 may be an internet-connected interactive screen with a highspeed internet link to a drone management system for both communications and entertainment of passengers. The control box 108 is powered from the pod's battery, via two cables, one on each side of the pod, for dual redundancy.

In one embodiment, as passenger 107 enters through a side door, the side door closes and auto-locks after passenger 107 is seated. Under the seat is a battery with charger controller 109, both located where they are not in the way. Battery and charger controller 109 may also be significantly heavy enough, such that the center of mass is shifted towards the bottom of a drone-pod unit, therefore providing increased stability. The battery is charged through the charger controller via either a first charging receptacle 110 or a second charging receptacle 112, allowing pod 100 to be charged from either side, or potentially from both sides simultaneously. Charging receptacles 110 and 112 may use any charging standard used in the art. The battery is connected to an attached drone in this example with two redundant identical cables going to the roof of pod 100, as is further detailed below.

FIGS. 2A through 2E show various views of drone 200 attaching to pod 100 to form a pod-drone unit 201 according to one embodiment of the present invention. Drone 200 flies above pod 100 and is connected to the roof of pod 100. Drone 200 may have four of its own compatible latches to compliment pod latches 101 to 104, a first drone latch 224, a second drone latch 225, a third drone latch 226, and a fourth drone latch 227. The latches used in this embodiment are a male and female set, with the male latches attached to drone 200, as indicated with male protrusions 228 and 230. Any latching system commonly used in the art may be used as substitution. Latches 224 to 227 are attached to two diagonal cross struts on drone 200, a first cross strut 234, and a second cross strut 235. It should be understood that the idea of cross struts 234 and 235 is to give drone 200 in this embodiment added stability in all directions, but other designs may be used in its place. The four pairs of latches 101 to 104 and 224 to 227 are for redundancy in case one or even two latches may break or decouple. Latches 101 to 104 and 224 to 227 may be designed to withstand carrying a fully loaded pod with any two latch sets functioning.

Motors 212 to 219 are shown at corners of drone 200, attached to eight motor-drivers in pairs 220 to 223, with two motor-rotor combos per corner, totaling eight totally independent rotors. Each of motors 212 to 219 are attached to its own rotor (propeller) 204 to 211, totaling eight propellers to provide lifting power to drone 200. Drone 200 also has its own control box 202, shown mounted at the junction of the cross-struts 234 and 235. Drone control box 202 works in unison with the pod control box 108 for dual redundancy.

Cross struts 234 and 235 are connected to two front-to-back struts, a right front-to-back strut 232, and a left front-to-back strut 233, with the motors and rotors at each end. Drone 200 may have its own battery, which may comprise small batteries fixed to struts 232 to 235, where they may be positioned in a manner which enables easy access for replacement or maintenance. The total energy available from the drone batteries may be enough to allow an empty drone with no pod to fly for approximately thirty minutes to one hour. This flying duration may improve as battery technology improves. While carrying a pod, pod-drone unit 201 utilizes the larger pod battery 109 and the drone battery does not discharge, allowing for continuing in emergency flight in the case of loss of power of the pod battery. The pod battery is much larger in weight and kWh, and all of the stored energy of a loaded drone may be provided by the pod battery 109. The drone batteries may only activate once the voltage of pod battery 109 has dropped below a certain predetermined safety threshold that indicates it may no longer provide sufficient power. If the drone battery needs to be recharged, it may receive a charge from pod battery 109 whenever the pod battery voltage is larger.

FIG. 3A shows a wiring diagram for a pod-drone unit 201 according to one embodiment of the present invention. Whereas FIGS. 3B and 3C shows various angles of wiring for a pod unit 100 according to one embodiment of the present invention. Irrelevant portions have been drawn in dotted lines to increase viewability of relevant parts. The pod has two cables, a first cable 304 and a second cable 305, connected to pod battery 109 and traveling up the rear corners of pod 100 (to avoid collisions with the pod behind with four pod drones), and, in this example, are shown connecting through rear pod latches 101 and 104 and to drone latches 224 and 225, once latched, and finally to the cables on the struts of the drone. In this embodiment, the purpose of the two cables 304 and 305 is redundancy for increased safety and reliability. Designers may prefer to link via separate connectors on the roof of pod 100. The two identical cables 304 and 305 each comprise a power line and a ground return, totaling two of each—a first powerline 301a in first cable 304, and a second power line 301b in second cable 305; and a first ground return 302a in first cable 304, and a second ground return 302b in second cable 305. Power lines 301a and 301b go to the front and back motors on both upper and lower sides. At each motor, they provide power to two motor driver-circuits duplicated, with their own control signals and outputs linked together at the motor terminal. This ensures full power line redundancy from pod battery 109 all the way to each drone motor terminal.

Pod control box connection cables 306 and 307 may connect to the front latches of pod 100 to provide a means to connect the pod control box to the drone control once latching has occurred. This is to create a wired interface between pod and drone for communication purposes and may be augmented by a wireless connection for dual redundancy.

Figure 4:
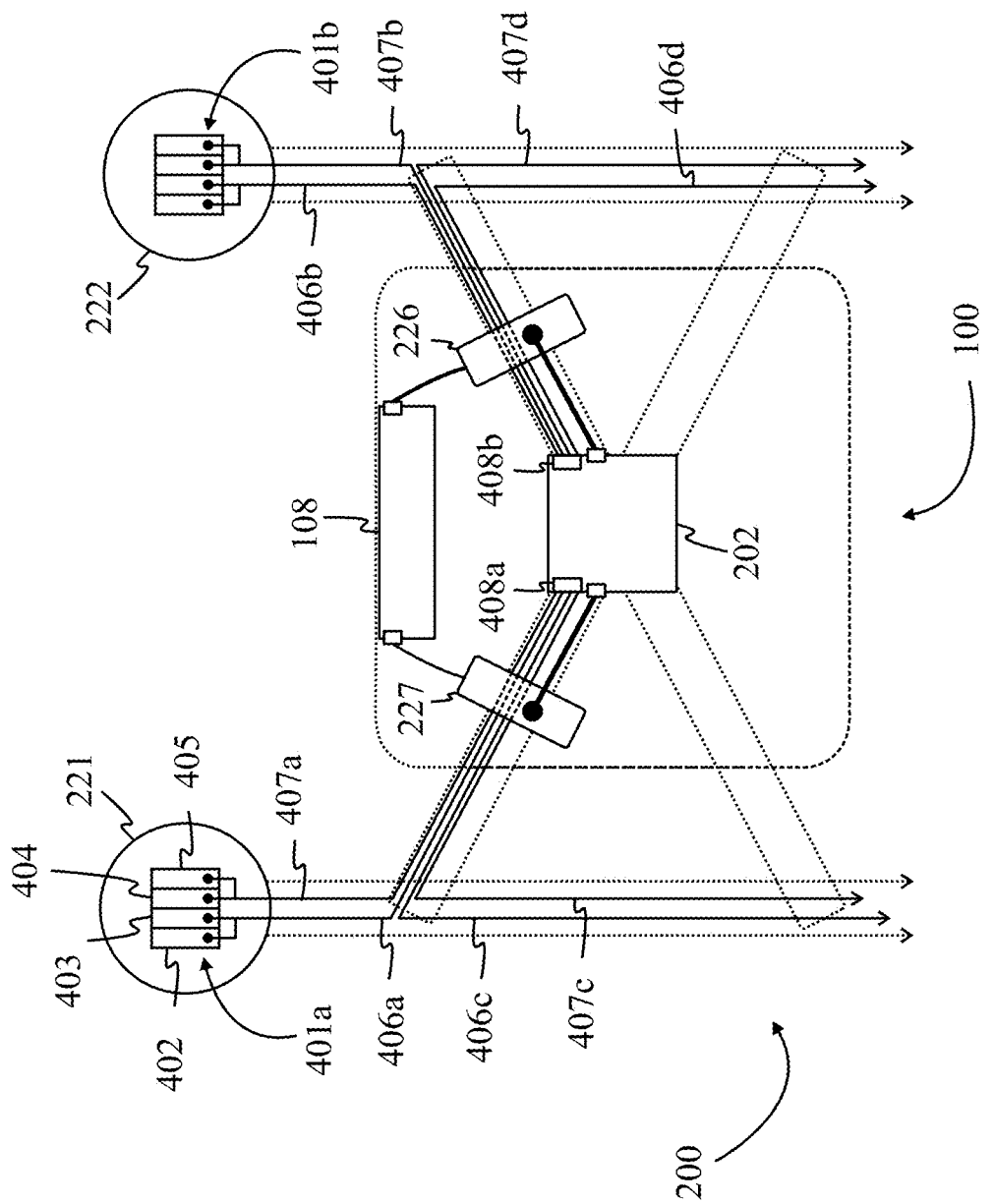
FIG. 4 is an in-depth top view of a transport drone with an attached pod with a wiring layout according to one embodiment of the present invention.

FIG. 4 illustrates a portion of a pod-drone unit 201 showing pod control box 108 and drone control box 202, and a wiring layout according to one embodiment of the present invention. The drone control box 202 is powered from the drone's battery, via two cables, one on each of the diagonal struts, for dual redundancy.

For redundancy, both pod and drone control boxes 108 and 202 include identical controls for navigation, communications, and transport. Differences may include pod control box 108 having a display for a passenger, and drone control box 202 may have eight identical pairs of digital motor control pulse pairs that connect, by wires 406a to 406d and 407a to 407d, to motor driver circuits 401a and 401b present at each corner. Motor driver circuits 401a and 401b may comprise a lower motor left driver circuit 402, a lower motor right driver circuit 403, an upper motor left driver circuit 404, and an upper motor right driver circuit 405. Although only one set of driver motor circuits is individually labeled, and two sets illustrated in FIG. 4, it should be understood that the same arrangement of driver circuits may be found in all four corners of drone 200 as denoted by 401a and 401b, with theoretical 401c and 401d. As with the power lines, there is full dual redundancy between the two control boxes 108 and 202 and also the drive signal pairs from drone control box 202 to each of the 8 motor control terminals. These signals then drive the digital motor controller.

During normal operations drone control box 202 may be considered the master controller provided both box control signals are identical. If a difference is detected both control boxes work together to determine which one is functioning correctly, and that control box assumes the role of master device. Similar systems are presently in use on airplanes.

Multi-Pod Drones

FIG. 5A shows a proposed 4-pod drone 500, also called a quad-pod drone, according to one embodiment of the present invention. The design is similar to 1-pod drone 201 but with capabilities of latching to and transporting up to four individual pods, being a first pod 100a, a second pod 100b, a third pod 100c, and a fourth pod 100d, one behind the other. Each set of latches may be individually controllable so any of the pods may be released without effecting the latching of other pods. So, it is not necessary that all four pod positions be utilized. A drone control box 501 of 4-pod drone 500 is located above front pod 100a. Motor-rotor pairs 506 to 509 of 4-pod drone 500 may be larger than those found on the 1-pod drone 200 to enable 4-pod drone 500 to carry three extra pods and may also enable it to travel at greater speed. The 1×4 configuration may result in less air resistance than a 2×2 configuration or even a 4×1 wide configuration because the back three drones 100b to 100d are sheltered behind first pod 100a. A wind screen may additionally be fitted on drone 500 in front of first pod 100a to reduce air resistance to first pod 100a. Pods 100a to 100d may be designed to bounce air away from a pod directly behind them, creating a vacuum effect between the pods. The 1×4 configuration may also make balancing drone 500 in flight easier.

In other embodiments of the present invention, it may be possible for additional dual motor-rotor units to be placed in between the front and rear dual motor-rotor units to offer drone 500 more redundancy, higher speed potential, and better lifting capability.

FIG. 5B is an illustration of a segment of 4-pod drone 500 with a wiring layout according to one embodiment of the present invention. All four batteries 109a to 109d from the four connected pods 100a to 100d may be connected in parallel with power cables 502a 502b 503a and 503b for redundancy inside the struts of drone 500 and are protected in each battery compartment from any other battery voltage dropping due to failure.

Control circuitry for 4-pod drone 500 is similar to the circuitry of 1-pod drone 200 shown in FIG. 4. This may significantly simplify the design of the 4-pod controller. The control algorithms for 4-pod drone control box 501 may be different, but the navigation, communications, and transport control may be the same. Additionally, the 4-pod drone control box 501 must communicate with up to 4 pod control boxes present in each of connected pods 100a to 100d. With good planning and design, it may be possible for the 1-pod and 4-pod control boxes to be identical, for example, with the presence of an input wire or multiple wires for detecting what kind of drone a pod is connected to. Maybe with some communication control information exchanged as well.

Figures 6A, 6B:
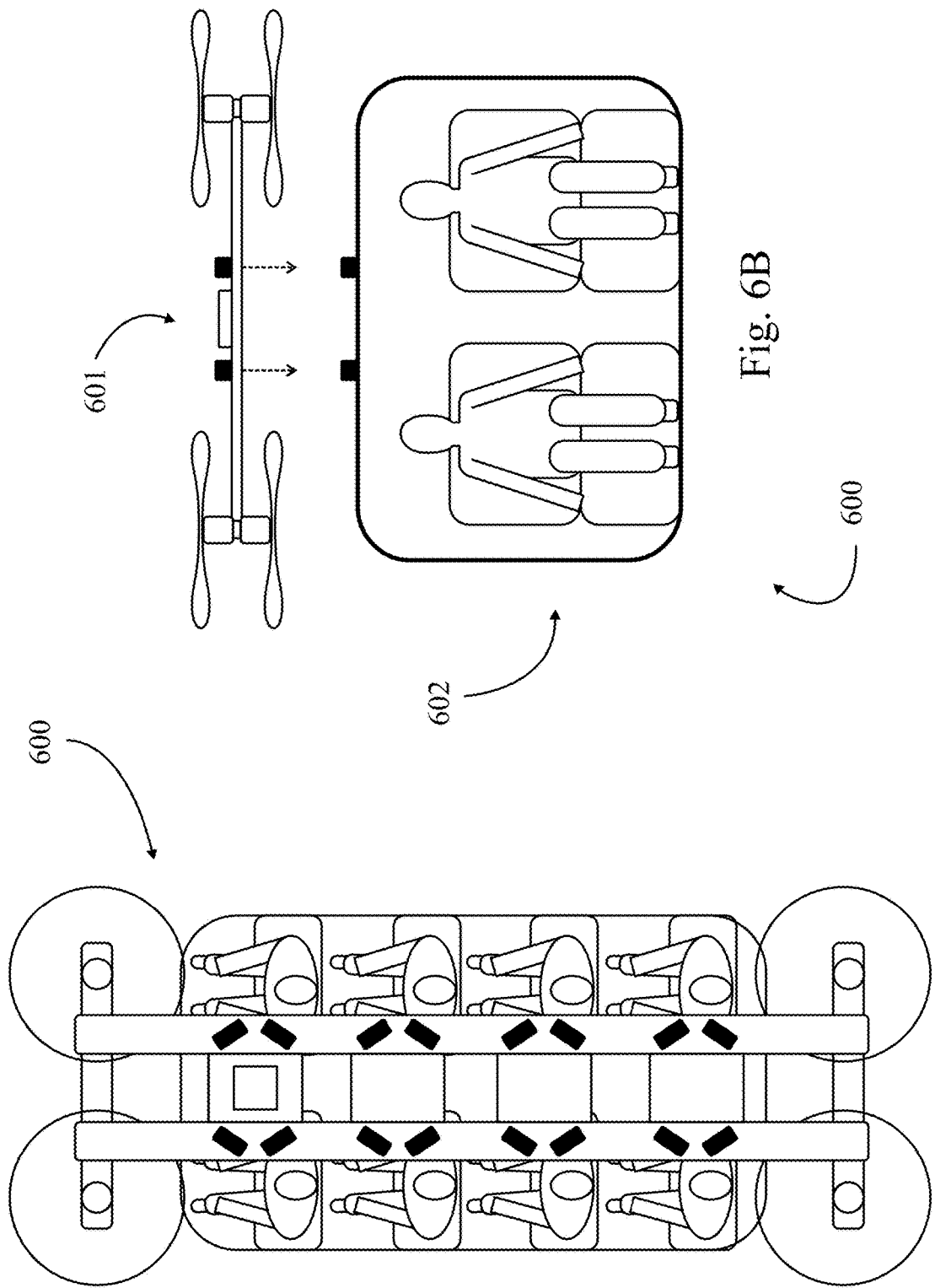
FIG. 6A is a top view of a transport drone capable of transporting an eight-person pod according to one embodiment of the present invention.
FIG. 6B is a front view of a transport drone capable of transporting an eight-person pod according to one embodiment of the present invention.

Although single-person pods may have advantages, such as versatility, cross-operation with abovementioned 1-pod drones or 4-pod drones and allowing passengers to remain in the same pod throughout their journey, some passengers may prefer to travel with others in the same pod. For example, families, or just couples with luggage, or small groups, or to have a meeting while traveling, or even just to be with other people. As such, there may be a need for multi-person pods. Multi-person pod 602, as seen in FIG. 6B, may be a detachable unit similar to a single-passenger pod 100 found in the 1-pod or 4-pod drone embodiments, or the drone and pod may be a semi-permanently attached unit only removed for replacement or maintenance. FIGS. 6A and 6B show an 8-person pod 602 and drone 601 attached to create a complete pod-drone unit 600 according to one embodiment of the present invention. Seating may be arranged in a 2×4 formation with an aisle down the middle with four seats on each side. Pod-drone unit 600 may require larger motors and rotors, or may just employ a greater number of motors and rotors situated in between the four motors present at the corners of drone 600. In this embodiment, multi-person pod 601 is detachable as shown in FIG. 6B, but in uses where there is no advantage, multi-person pod 601 may be an integral part of drone 600 and is only detached to be replaced or for maintenance purposes. Multi-person pod 601 may have batteries underneath each seat similar to pod 100, as this saves space and ensures stability in flight with the center of gravity lower in the overall structure. The batteries will still need to be charged, and the pod may use identical receptacles and chargers as those found on single passenger pod 100. This may allow multi-person pod drones to be charged along-side 1-pod and 4-pod drones on predetermined drone pathways at the same charging stations.

Exchange Stations

An exchange station enables 1-pod drones, from the suburbs or other low usage areas, to link up with higher speed 4-pod drones going to a next exchange station.

Exchange stations may also provide an ability for pods to change from one 4-pod drone to another 4-pod drone to fly to another exchange station onwards and eventually switch back down to a 1-pod drone to fly to a final destination. Exchange stations also accept passenger entry and exit through a passenger terminal, as well as parcel management, with full intermixing of parcel pods with passenger pods.

Figure 7A:
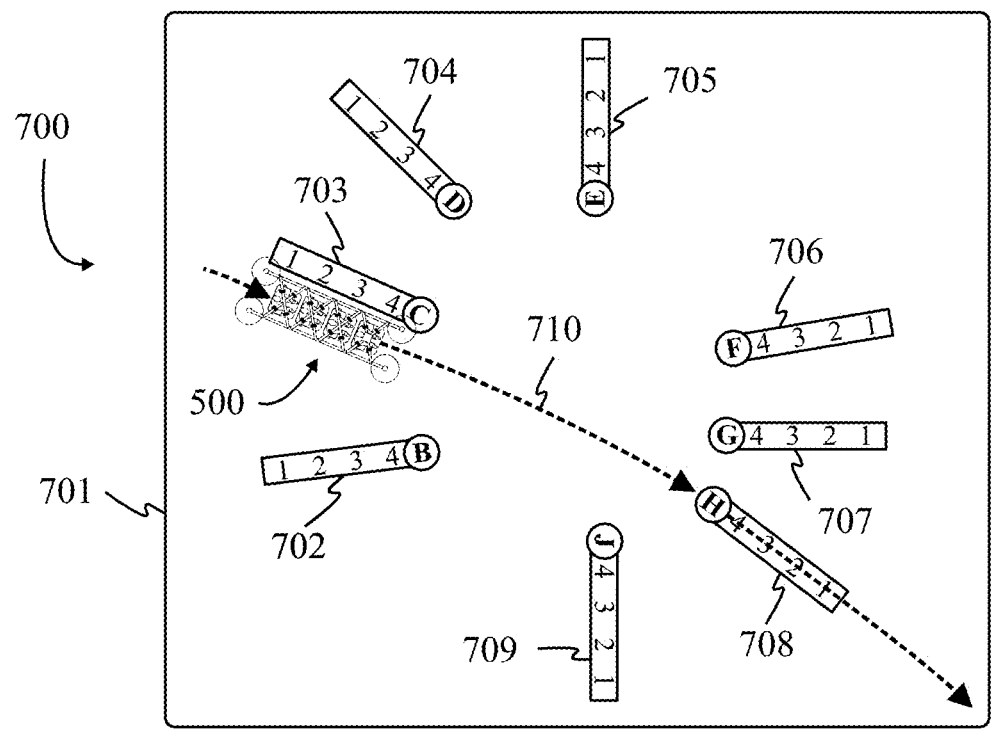
FIG. 7A is an illustration of an exchange stations with a plurality of loading bays and one potential flight path when wind is negligible of a transport drone according to one embodiment of the present invention.

FIG. 7A is an illustration of an exchange station 700 using 4-pod drones 500 with an example travel route 710 according to one embodiment of the present invention. Although only a single 4-pod drone 500 is shown, it should be understood that there may be a plurality of drones, both 1-pod drones and other 4-pod drones, flying in or around the vicinity of exchange station 700 throughout usual operation. This embodiment comprises eight loading bays 702 to 709, but it may be possible to have exchange stations of various numbers of loading bays, for example an exchange station in a low traffic area may have fewer loading bays and vice versa. Although exchange station 700 in this embodiment is circular in shape, as shown by illustrated boundary 701, in some cases it may take other shapes in order to fit in a particular space or to maximize efficiency. Each loading bay 702 to 709 may have any combination of other features of an exchange station such as a passenger terminal with an associated transit bay linking it into the present exchange station, a 1-pod drone bay where both empty pods and 1-pod drones may be stored, a 4-pod drone bay for empty 4-pod drones, a charging bay which may be a part of the transit bay which may include a rest area for any passing drone that needs charging, and an optional parcel bay where parcels may be brought in or taken out at any time.

There may be a backup reserve loading bay present at each loading bay in case the primary one is still loading while another drone is instantly arriving at the same loading bay. Another example may be the primary loading bay has already been offloaded with three pods and another drone is arriving with two, three, or four connected pods going to the same exchange station.

A loading bay may face its corresponding target exchange station to eliminate any need to turn towards the target exchange station on take-off, unless there is a strong wind, such that a loaded 4-pod drone may take off without interfering with other drones which may be also taking off.

As mentioned previously, being small flying machines, drones may be affected by the weather more than other forms of transport. As drone transport gains popularity, people may still be required to get from one point to another using drones and this will put pressure on system operators to maintain a continual flow of drones in less than ideal conditions. The main constituent of weather that affects drones may be wind. It may be assumed that as machine intelligence becomes more advanced, that even the first passenger drones may be able to fly in conditions with poor visibility, such as, but not limited to, heavy rain, snow, and total darkness. However, they may still be affected by wind. Up to a certain wind speed, drones may simply fly at an angle relative to the direction of travel to maintain the correct course. As drone technology progresses, this minimum safe wind speed may increase. Gusts of strong wind may make flying even more difficult, and in some extreme conditions, a system shutdown may be unavoidable.

Figure 7B:
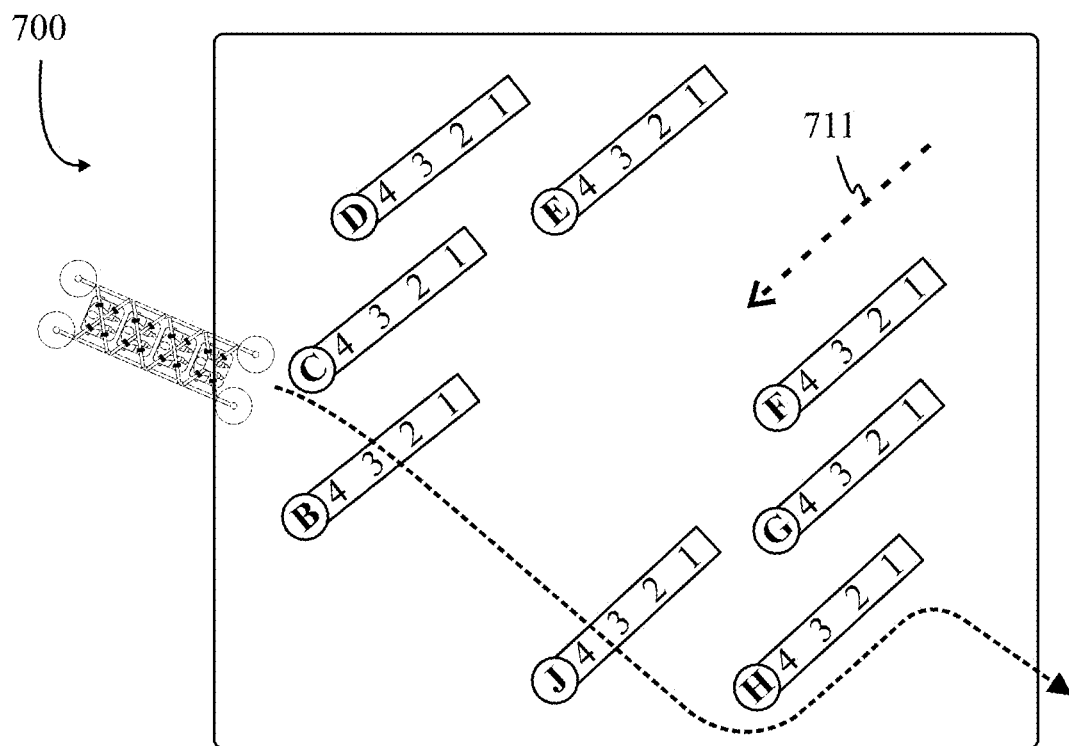
FIG. 7B is an illustration of an exchange stations with a plurality of loading bays and one potential flight path with significant wind according to one embodiment of the present invention.

Landing and taking off may be the most dangerous part of flying and may also be the part that is most impacted by strong, gusty crosswinds. For this reason, it may be necessary to allow loading bays 702 to 709 to be rotatable into the wind. FIG. 7B shows an embodiment of the present invention in which loading bays 702 to 709 are rotatable relative to wind 711 indicated by a dashed arrow so that impact of the wind on drones taking off or landing is lessened and more easily manageable.

Other embodiment examples of potential exchange station types and layouts are presented and explained in greater detail below.

Drone Transport System

Figure 8:
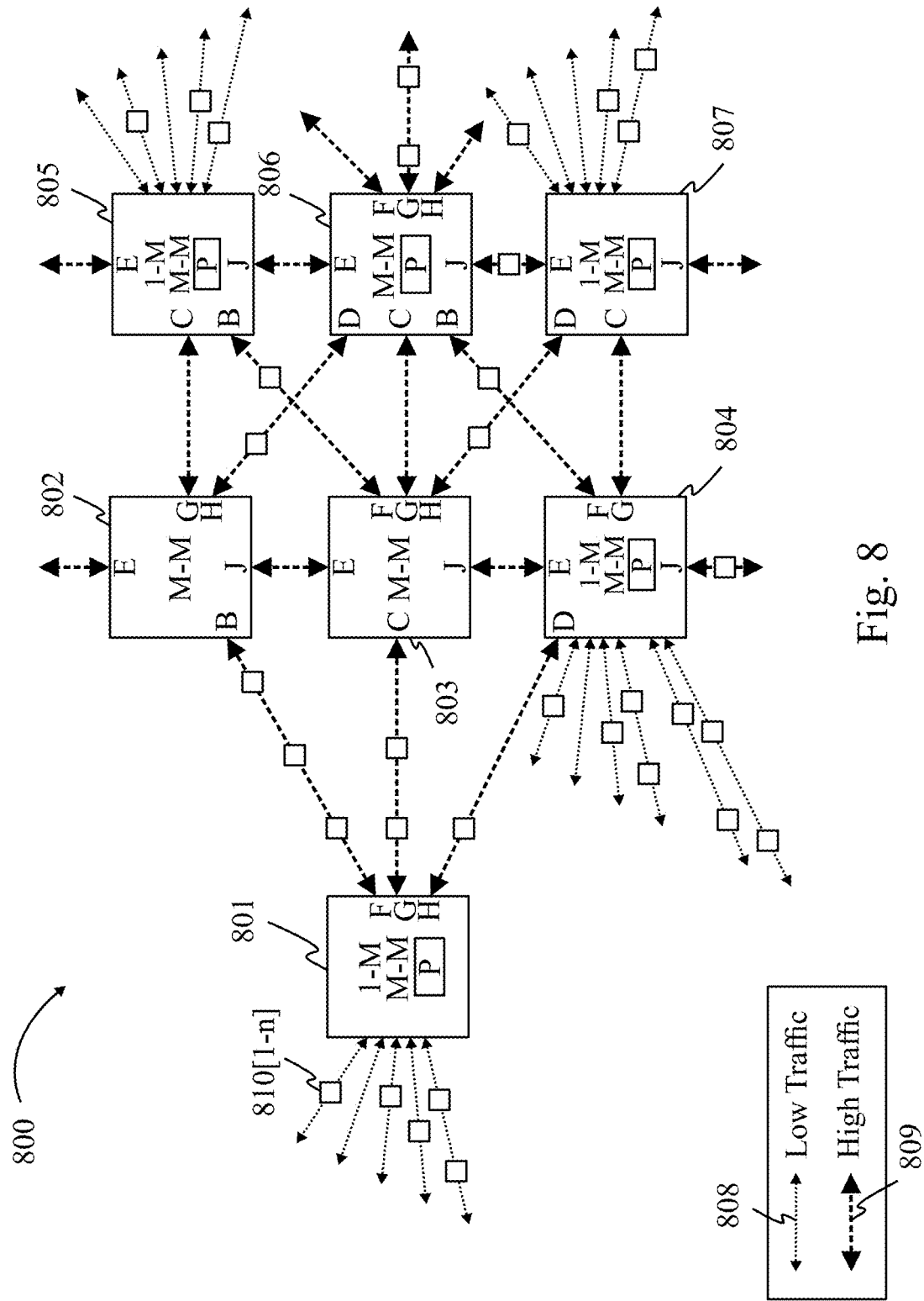
FIG. 8 is an illustration of a segment of a wider system with a plurality of exchange stations interconnected by various flight paths according to one embodiment of the present invention.

FIG. 8 illustrates an example segment 800 of a wider system of stations in which 1-pod drones and 4-pod drones may be interconnected in a typical city according to one embodiment of the present invention. System segment 800 comprises a plurality of exchange stations 801 to 807, which are explained in further detail below, interconnected with drone pathways denoted by arrows. A smaller, dotted arrow 808 may be lower traffic volume, and more regulated drone flight paths, intended mainly for 1-pod drones. A thicker, dashed arrow 809 may be higher traffic volume, with a higher speed limit for drone flight paths that may be utilized by any drone type.

Exchange stations may not necessarily be capable of accepting all types of drones. In example segment 800, exchange stations are annotated with their capabilities. A "1-M" indicates that that particular exchange station is capable of accepting 1-pod drones, and may transfer the pod carried by the 1-pod drone to a loading bay with other pods to be picked up by a multi-pod drone. A "M-M" indicates that that particular exchange station has facilities to accept multi-pod drones and can transfer pods to various different multi-pod drones. A "P" indicates that that particular exchange station has facilities for parcel pods. Letters around the inner edges of each exchange station indicate loading bays.

This embodiment of segment 800 employs multi-pod drones up to 4-pod drones 500. It may be that 1-pod drones 200 and 4-pod drones 500 will be introduced first into the system, and as technology, reliability, and experience improves, drones of increasing size and complexity may be introduced and may utilize the same system and infrastructure.

Along the way, between exchange stations 801 to 807, a plurality of charging stations 810[1-n] may be strategically placed in order to allow drones to travel longer distances between exchange stations 801 to 807 or between residences or offices and other exchange stations.

It is not required for drones to stop at any particular exchange station if a drone has enough charge to venture to a next exchange station on a pre-determined path. For example, a 1-pod drone may decide to bypass an exchange station if its occupant wants to travel alone or owns a private pod or even a private drone. Or instead, the occupant may want to stop and just take a break, while charging the drone's and pod's batteries in a charging bay. Similarly, a 4-pod drone may decide to bypass an exchange station if its occupants are all heading to a common next exchange station. Because the drone system knows the drone does not need to visit the upcoming exchange station, occupants may receive a prompt on the screen in their pods to check whether or not they wish to stop to just take a break and charge the drone's and pod's batteries in a charging bay.

Exchange Station Types

There are two basic types of exchange station proposed here where incoming drones may offload their occupants at each pre-determined target loading bay, or incoming drones may offload their pods at a pre-determined arrival bay dock, from which the pods may be directed automatically to transfer along pre-determined transfer paths to their target loading bays. These are just a few potential embodiments, and it should be understood that various types may be mixed and used in a single system.

Drone Offload Exchange Station

Figure 9:
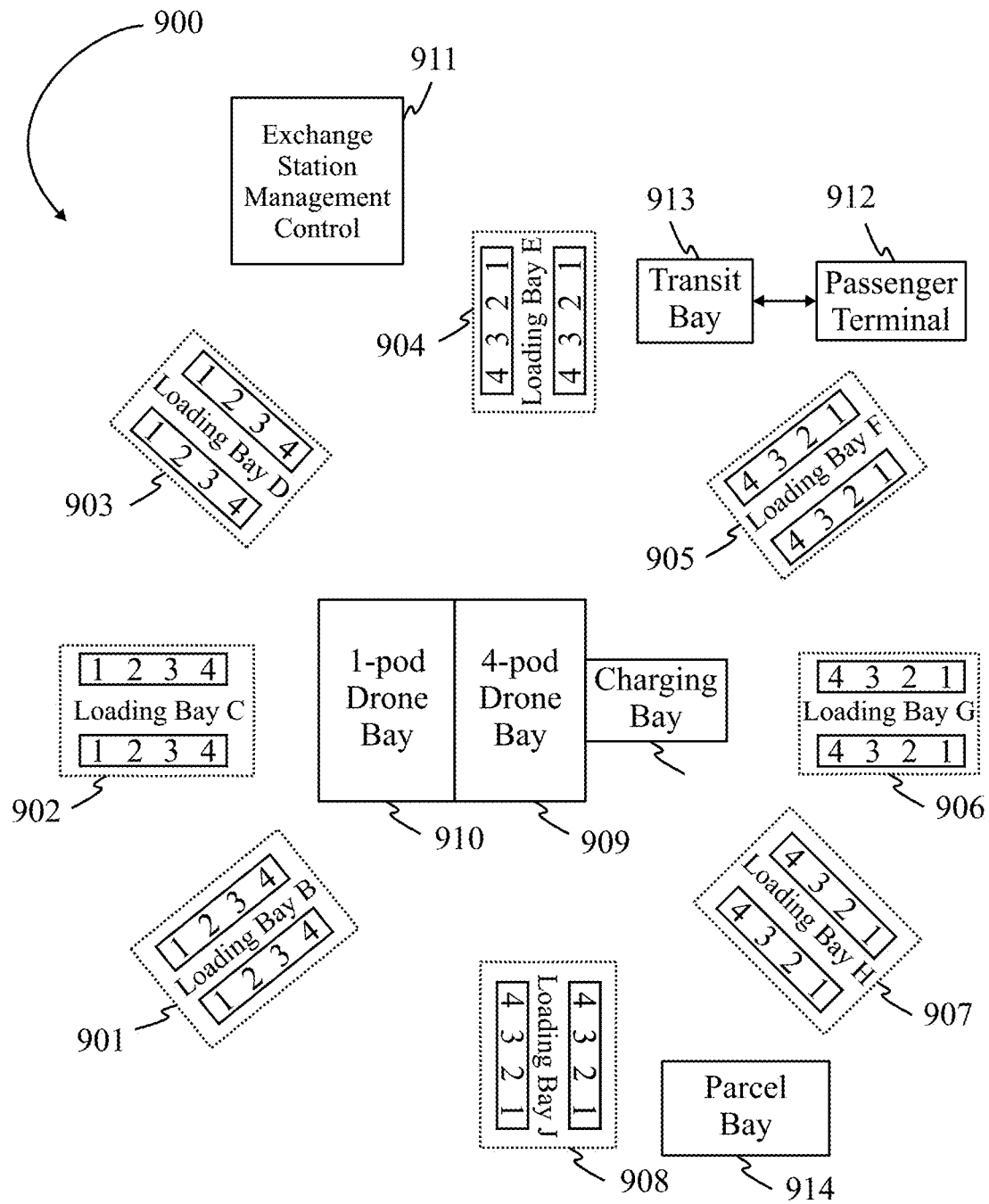
FIG. 9 is an illustration of a drone offload exchange station according to one embodiment of the present invention.

FIG. 9 shows a drone offload exchange station 900 according to one embodiment of the present invention. Drone offload exchange stations may be smaller, less complex exchange stations for drone and pod pickup and drop-off. They may be located on the periphery of a city, such as in the suburbs, or just a small town where there may only be few connecting exchange stations.

Drone offload exchange stations comprises a set of loading bays, eight are illustrated in FIG. 9, loading bay B 901, loading bay C 902, loading bay D 903, loading bay E 904, loading bay F 905, loading bay G 906, loading bay H 907, and loading bay 908. Each loading bay 901 to 908 may have one or more separate loading docks for drones to drop off pods. Backup docks may be implemented in exchange stations that expect a higher volume of drone traffic enable multiple drones to drop-off pods simultaneously. It should be understood that although eight loading bays are illustrated in this embodiment, it may be possible to have as few or as many loading bays as needed as space allows. Loading bays may be arranged in such a fashion that they may be located towards the direction of respective exchange station designation. This may reduce the number of flight path crossing as drones take off and fly to their designated exchange stations. Drones may land at a target loading bay, and after offloading all pods, may park in a designated drone parking area, a 4-pod drone bay 909, or a 1-pod drone bay 910. This embodiment only utilizes one of each drone bay, but it may be possible to have as many as needed to provide space for drones that may be on standby. In a future embodiment in which drones of various shapes and sizes are introduced, there may be more parking areas designated for each drone type, or one area may be designated for mixed drone parking.

Passengers intending to commute by drone may be processed through a passenger terminal 912 where they may check-in, purchase tickets, or request any special arrangements such as having luggage they may need to transport as well. Some exchange stations may need a security check. From passenger terminal 912, a passenger enters a transit bay 913 to enter a pre-charged pod designated to them while processing through the passenger terminal, and to wait to be transferred to a loading bay with other pods heading to a similar next exchange station.

An exchange station management control system 911 may wirelessly communicate with drones flying in its vicinity and control the flow of drones to and from each loading bay as well as to and from each parking area. It may be difficult and somewhat risky to allow more than one incoming drone to be flying around offloading at the same time. A sequential method may be used to simplify logistics: only when a drone has finished offloading can a new drone enter the exchange station. Drone offload station 900 may be suited for smaller stations that are not expected to be very busy, such as in the suburbs where commuters may call up drones for transport from home to work and back to home, or for sub-exchange stations in work areas or shopping malls where passengers may enter or exit close to work or shopping areas. With careful layout of the bays etc. it should be possible to upgrade fairly easily to an arrival bay type of exchange station if for example the station gets busier over time.

As an example, an incoming first 4-pod drone from a neighboring exchange station may descend to a certain height above the ground and hover over a first loading bay, drop down to ground, unlatch the relevant pod or pods, and fly to a next loading bay, offload more pod or pods, and repeat for as many different loading bays as needed to put all pods where they are designated to go, and may finally park itself in a predesignated parking spot or may dock for charging. A second 4-pod drone, arriving while the first drone is still offloading, may have to wait until the first one finishes before it may start its offloading procedure. This is because the second drone may be arriving from a different direction and may conflict with the first drone while offloading at the same loading bay. This forces incoming drones to be only offloaded sequentially, which slows the offloading down. And offloading itself may not be quick, because each time a drone offloads it must ascend to a safe altitude, fly to the next loading bay, drop to ground level, unlatch, and ascend again, etc.

A parcel bay 914 may be present as an area accessible to only qualified staff and personnel. This area may be designated for the loading and unloading of pods carrying parcels to be transported by drones to other exchange stations in order to reach a final destination.

Figure 10:
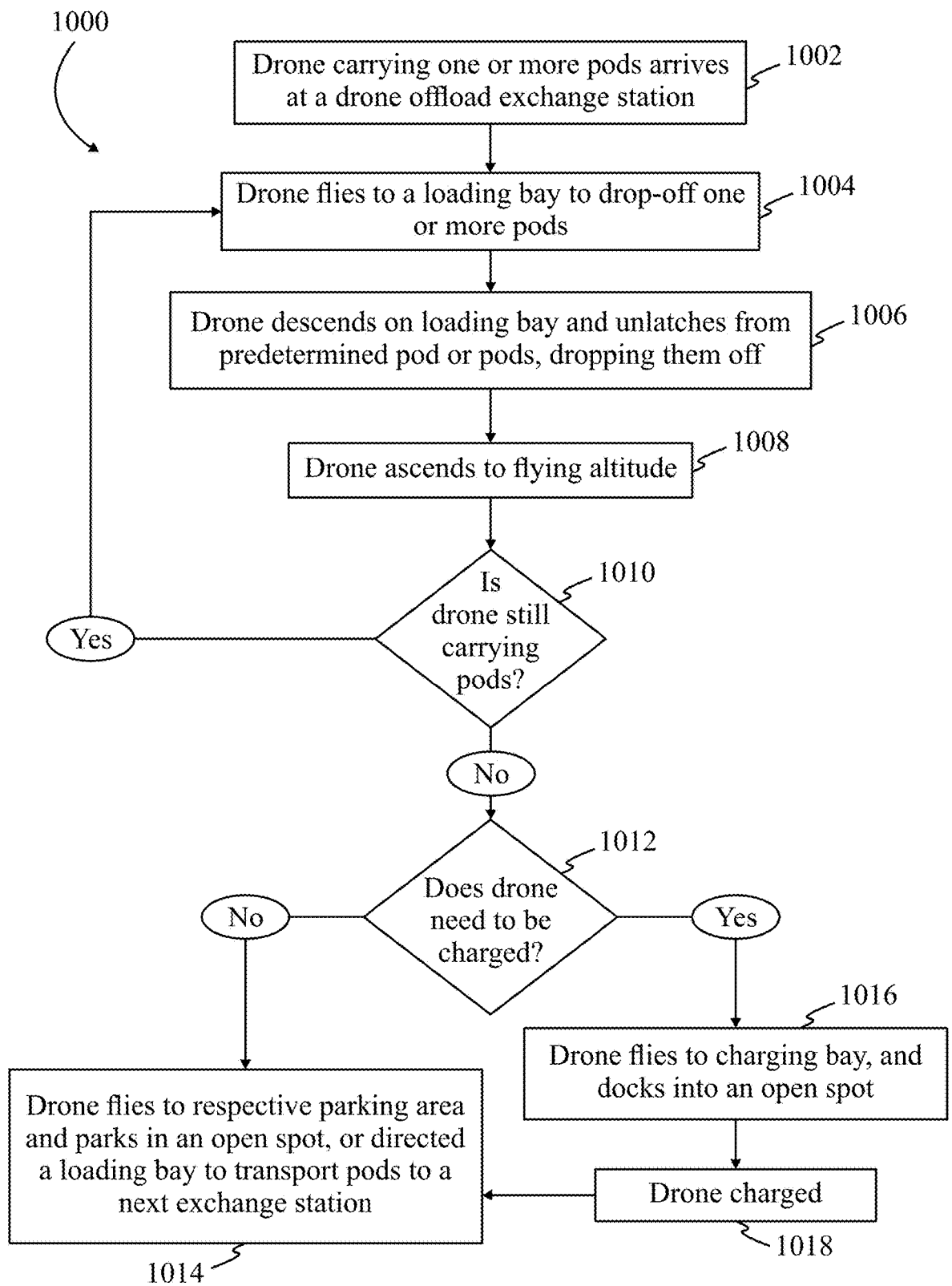
FIG. 10 is a flowchart of a method for arrival and unloading of a drone carrying pods at a drone offload exchange station according to one embodiment of the present invention.

FIG. 10 is a flowchart 1000 of a method for arrival and unloading of a drone carrying pods at a drone offload exchange station according to one embodiment of the present invention. The process is similar for both 1-pod and 4-pod drones. At step 1002, a drone carrying pods arrives at a drone offload exchange station. At step 1004, the drone flies towards a first loading bay where it may drop off one or more pods. For efficiency purposes, incoming drones may unload pods in loading bays in ascending order according to slot numbers of their respective loading bay dock as shown in FIG. 9. In some cases, drones may drop off pods at a transit bay instead of a loading bay if a passenger in a pod has this exchange station as their final stop. In another case, if a passenger is flying to their final stop after the present exchange station, the pod may be dropped off at a 1-pod drone bay to catch a drone to their final stop.

At step 1006, the drone descends on the first loading bay and unlatches from pods that are designated for drop-off at the present loading bay. At step 1008, after unloading of pods is completed at the present loading bay, the drone ascends to a safe flying altitude. At step 1010, if the drone is still carrying pods, the process may return to step 1004 and repeat steps 1004 to 1010 for as many different loading bays as necessary to drop off all pods. Once pod drop-off has been completed, step 1012 is reached, and a quick analysis is performed to decide whether the drone needs to be charged. If the power supply is at sufficient levels, the drone may be directed to park in a respective drone bay. In the case in which no other drone is available, the drone may be directed by exchange station manage control to a loading bay to pick up pods to fly to a next exchange station.

Returning to step 1012, if a charge is needed, step 1016 is reached, and the drone may be directed to a charging bay, and docks into an open spot to receive a charge. Step 1018 is reached when the drone has received a sufficient charge, which leads back to step 1014.

Figure 12A:
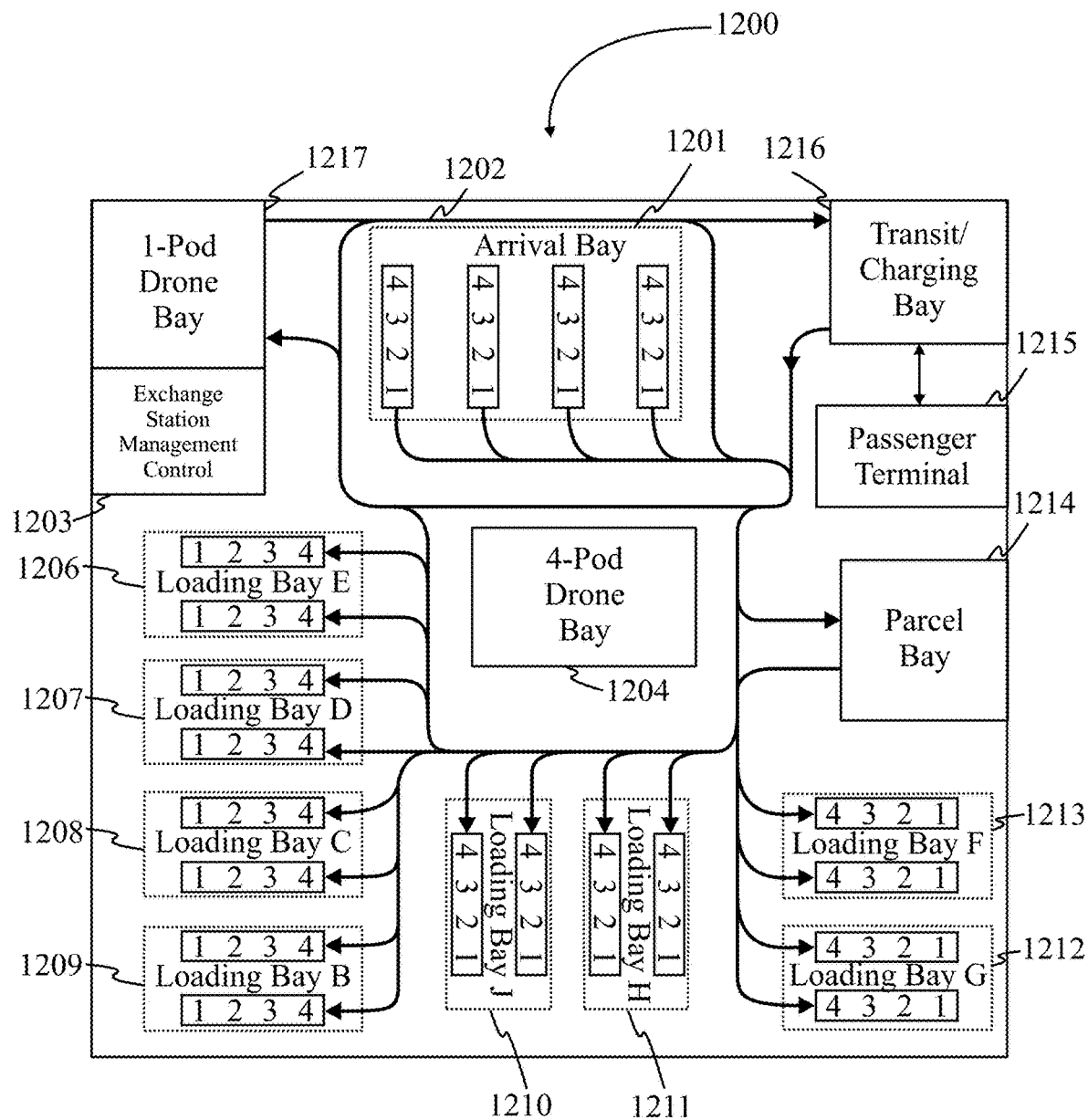
FIG. 12A is an illustration of an arrival bay exchange station 1200 according to one embodiment of the present invention.
Figure 12B:
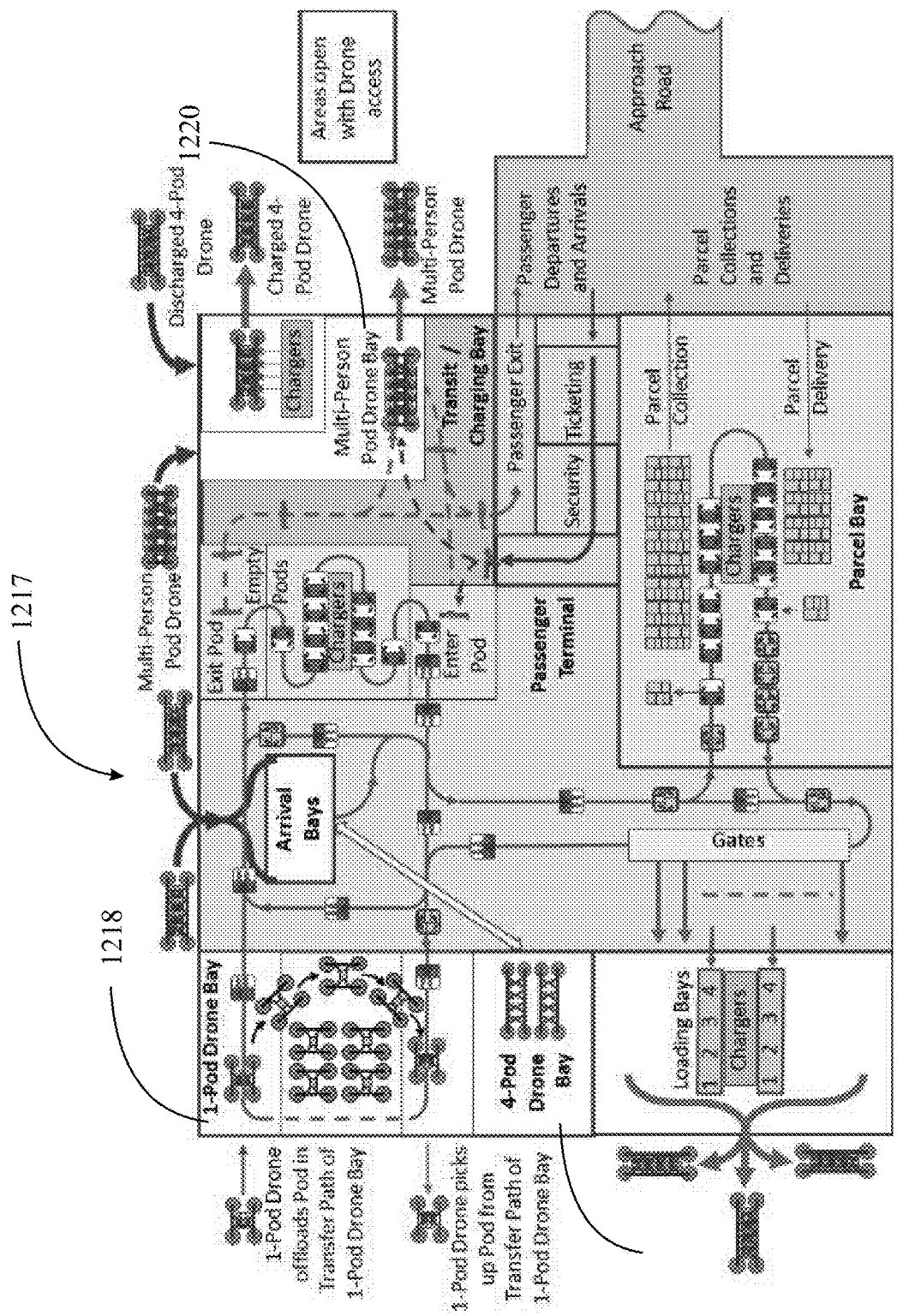
FIG. 12B is an illustration of an arrival-bay exchange station in another embodiment of the invention.

In another embodiment of the invention, pods waiting in loading bays may be charged there, and each loading bay pair will have a quad charger in this variation, similar to that in the charging bay. Charging will take a few seconds at most to fully charge. This is a convenient and fast way to fully charge a departing drone. Pod batteries if already partially charged, recharge until full then charging stops, so it doesn't matter if all four discharged pods have different charges. This is also valid for arrival bay exchange stations. Also, for 1-pod drones departing, charging the pod batteries should be done in the 1-pod parking bay as shown in FIG. 12B. Pods may also be charged in the parcel bay. Control of drones throughout the process may be handled by communications between the controller of the drone, as explained above, and an exchange station management control system that may be present at all exchange stations.

Figure 11:
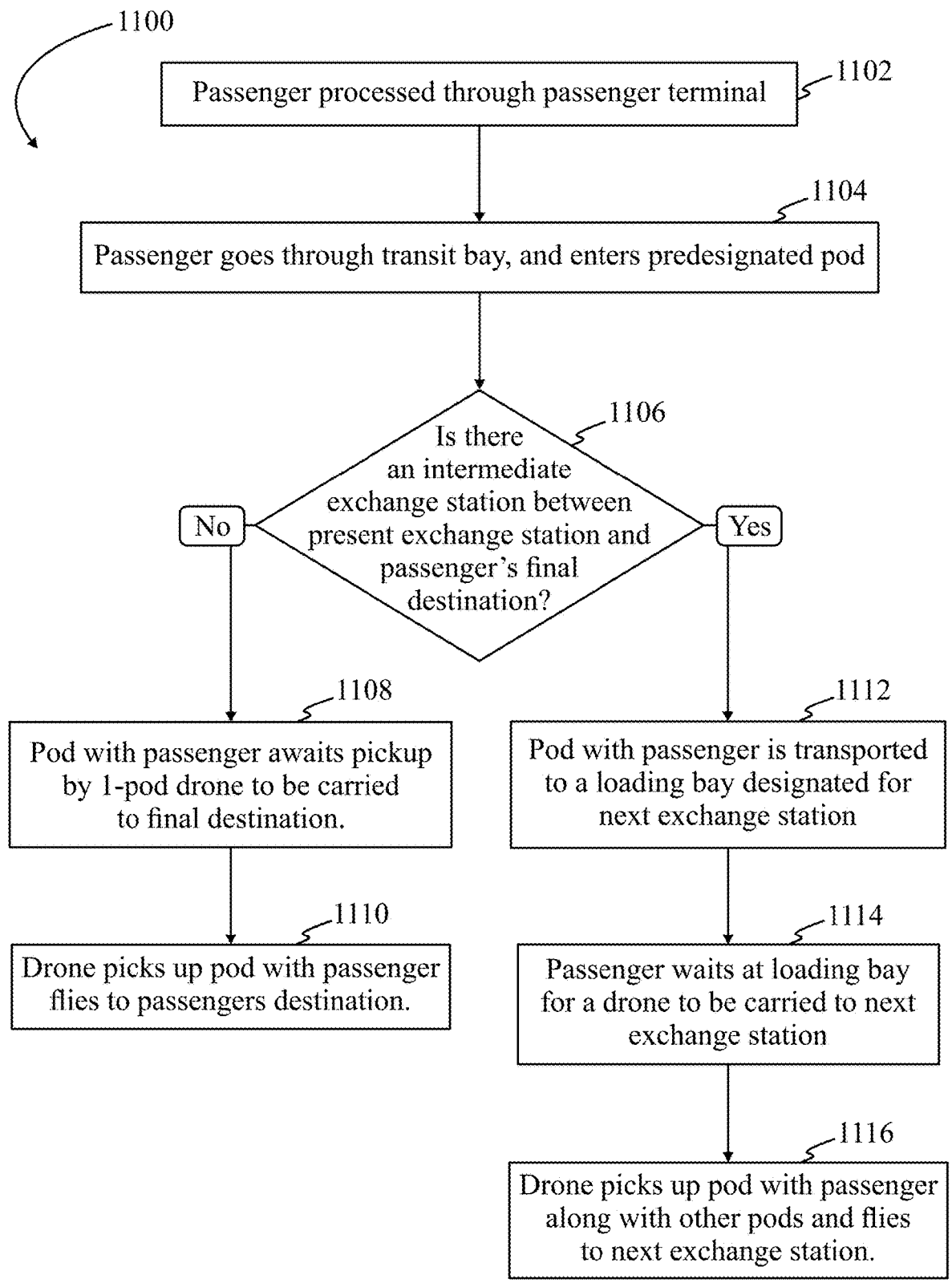
FIG. 11 is a flowchart of a method for new passengers entering a drone offload exchange station through a 1-pod drone bay or a passenger terminal according to one embodiment of the present invention.

FIG. 11 is a flowchart 1100 of a method for a new passenger entering a drone offload exchange station according to one embodiment of the present invention. The steps detailed herein are in the case of a passenger using a public pod, and may not cover the case in which a personal pod is used. At step 1102 a passenger is processed through a passenger terminal. Passenger terminals may be similar to those found at airports or train stations. Tasks completed at a passenger terminal may include, but may not be limited to, purchasing tickets, checking-in if tickets have been pre-purchased, or checking-in luggage. Once processed, step 1104 is reached, and the passenger goes to the transit bay, and enters a pre-charged pod designated to them during check-in or ticket purchase. At step 1106, if there are no exchange stations between the present station and the passenger's final stop, step 1108 is reached, and the pod carrying the passenger waits at the transit bay to be picked up by a 1-pod drone. At step 1110, the pod carrying the passenger is picked up by a 1-pod drone and carried to the passenger's final stop, and the drone and pod return to the same 1-pod drone bay.

Returning to step 1106, if there is a next exchange station on the passenger's itinerary step 1112 is reached, and the pod is transferred to a loading bay designated for the next exchange station. At step 1114, passenger waits for the loading bay to fill up with other pods, or a pre-established wait interval has passed. Other pods that may fill up a loading bay may be other passengers, or pods carrying parcels. If there are not enough parcel pods or passenger pods to fill up a loading bay, a brief wait time may be implemented to prevent unnecessary delays for passengers caused by waiting for the loading bay to fill up. As explained above, a 4-pod drone may carry any number of pods up to the maximum amount of 4 in this embodiment. At step 1116, a drone comes to pick up pods at the loading bay and flies to the next exchange station.

Arrival Bay Exchange Stations

For a higher volume of drone traffic, a more complicated exchange station type may be required. FIG. 12A is an illustration of an arrival bay exchange station 1200 according to one embodiment of the present invention. Exchange station 1200 may have features and structures that may be found in a drone offload exchange station 900, such as, a 1-pod drone bay 1217, an exchange station management control post 1203, a transit and charging bay 1216, a passenger terminal 1215, a parcel bay 1214, a 4-pod drone bay, and a plurality of loading bays 1206 to 1213. Also, similar to drone offload station 900, arrival bay exchange station 1200 in this embodiment illustrates eight loading bays with a pair of docks, but it should be understood that more or fewer loading bays may be used, space permitting, and the number of docks may also be adjusted depending on usage need. The major difference, regarding features, between arrival bay exchange station 1200 and drone offload exchange station 900 may be the presence of an arrival bay 1201, and a transfer path 1202 used for transferring pods around the exchange station.

Incoming drones descend onto an available dock in arrival bay 1201 selected by an exchange station management control system 1203 and unlatch from carried pods. In this embodiment, four 4-pod drones may offload pods simultaneously in any of the four arrival bay docks of exchange station 1200. The emptied drone then takes off and may be directed to either pick up pods at a waiting, loaded, loading bay to fly to a next exchange station, or, if none are waiting, to a 4-pod drone bay 1204 where they may be on standby to be activated to pick up pods at a waiting loading bay. The offloaded pods are then individually and automatically carried along transfer path 1202 to their target loading bays. The path from arrival bay to loading bay may be as fast as the exchange station requires. For example, larger and busier exchange stations may need a faster transfer rate to cut down on wait time for incoming drones and pods.

Once an incoming drone has taken off from the arrival bay 1201, the pods may be shifted forwards out of arrival bay 1201 onto the transfer path 1202. The occupants may face their direction of travel down the transfer path which may minimize discomfort during pod transferring. Once the pods have left arrival bay 1201 they then are guided by open and closed gates or some other method to a target loading bay. The pods may use an on-board collision avoidance system to indicate to its own controller that ensures a safe distance is maintained from either the pod in front, or from a pod joining the path. It is likely the local exchange station management control 1203 may also be involved in ensuring safe conditions are maintained. There are a variety of arrangements that may be incorporated to facilitate movement of pods along transfer paths. In some cases, the pods may have wheels, which may or may not be retractable. In other embodiments, there may be rails similar to narrow gauge trains, and the pods may be enabled to ride on the rails and be gated through intersections along the transfer paths. In some embodiments, pods may be self-powered, and in others, there may be means external to the pods to move the pods along the transfer paths.

This embodiment utilizes an architecture designed so that no transfer path crosses another, which allows for the terrain to be flat, as well as to minimize delays. It may be good planning to have arrival bay 1201 on slightly higher ground so that gravity can be utilized to assist in guiding pods to a respective target loading bays further down a slope, similar to a bobsleigh ride.

Once a loading bay has one last pod incoming to fill it or a pre-established wait time has passed, and in either case the pods are fully charged, an empty drone from 4-pod drone bay 1204 takes off and flies to above the present loading bay. The empty 4-pod drone descends to the pods, latches onto them and ascends, flying on to the designated next exchange station.

In addition, passengers may enter exchange station 1200 via passenger terminal 1215, where after being processed through passenger terminal 1215, they are led to transit bay 1216. The passenger enters a designated pod and may be transferred by transfer path 1202 to a target loading bay, or may be taken by a fully charged pod from the transit bay to 1-pod drone bay 1217, where a 1-pod drone may transport the passenger to the next exchange station, or final destination. Fully charged parcel pods may also transfer by transfer path 1202 to a target loading bay. At all times the pods and drones may be under the control of exchange station management control 1203.

With four arrival-bay docks active, there may be sixteen pods traveling from their arrival bay docks to their target loading bays along transfer path 1202. This total does not include pods that may be entering from parcel bay 1214 or 1-pod drone bay 1217, or the transit bay 1216. It should be understood that a busier exchange station may need more arrival-bay docks, so it is well within the scope of the present invention to scale exchange station 1200 and utilize as many arrival-bay docks, and loading bays as needed to cut down on backlog and maintain efficiency, and vice versa if a smaller exchange station is required.

FIG. 12B is an illustration of an arrival bay exchange station 1217 with expanded functionality and flexibility over that described for the exchange station of FIG. 12A. The exchange station of FIG. 12B has at least one 1-pod drone bay 1218, at least one 4-pod drone bay 1219, and at least one multi-person pod drone bay 1220, with pods as seen in FIGS. 6A and 6B. Note FIG. 12B shows a common point of entry for 4-pod drones from the top, whichever direction they may came from. This is to avoid collisions.

In addition, FIG. 12B shows multi-person pods arriving at and departing from the transit bay, where passengers can enter from or exit into the passenger terminal or enter into or exit from the 1-pod drone bay or enter into the transfer path to a loading bay or exit from a transfer path to an arrival bay. The multi-person pods may be charged while in the transit bay by chargers next to the charging bay.

In addition to differences and functions described above, FIG. 12B shows integration of an approach road with portals for arrival and departure of passengers, and for arriving and departing parcels.

In addition, FIG. 12B shows battery chargers that will charge four pod batteries simultaneously in the charging bay, the transit bay, the parcel bay and between each pair of loading bays, to ensure a quick and convenient way of ensuring only fully charged drone exit the exchange station. But also, 4-Pod Drone batteries will sometimes have a need to be charged, and this may be done in the 4-Pod Drone Bay by a smaller charger, and 1-Pod Drones in 1-Pod Drone Bay by an even smaller charger, with both possibly using the same receptacle as the 1-Pod chargers.

Figure 13:
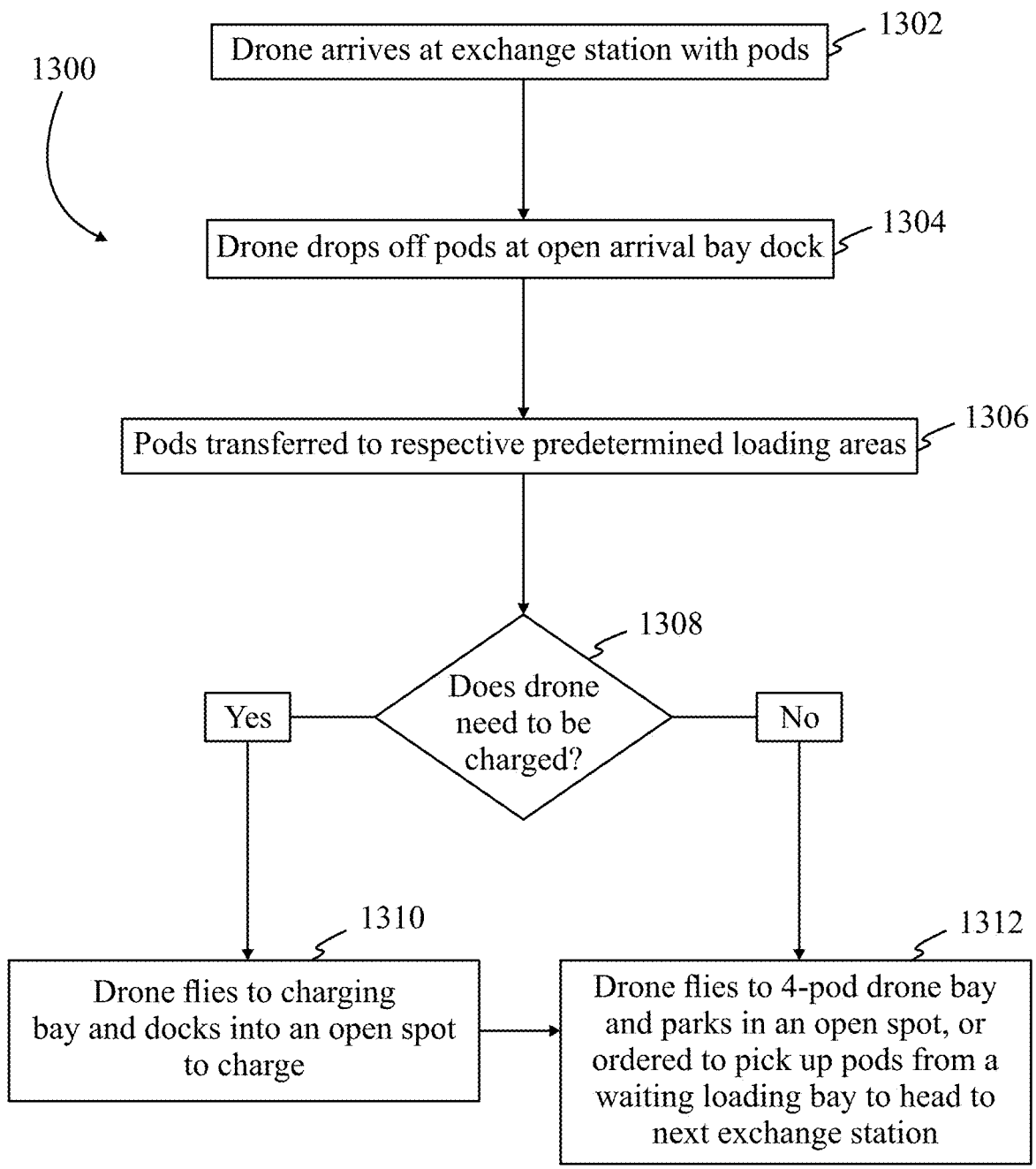
FIG. 13 is a flowchart of a method for arrival, unloading, and transferring of a 4-pod drone carrying pods according to one embodiment of the present invention.

FIG. 13 is a flowchart 1300 of a method for arrival, unloading, and transferring of a 4-pod drone carrying pods according to one embodiment of the present invention. At step 1302, a 4-pod drone carrying pods arrives at an arrival bay exchange station. The 4-pod drone may be carrying between 1-4 pods in this embodiment. At step 1304, the drone flies to an open arrival bay dock and drops off all the pods it is carrying. At step 1306, the pods are transferred via transfer paths to each pod's respective designations. For example, a pod flying to a final stop may be transferred to a 1-pod drone bay to catch a drone to the final stop, while a pod with parcels may be transferred to a parcel bay for processing, or a pod heading to another exchange station may be transferred to a designated loading bay. Or a passenger departing the exchange station will exit their pod in the transit bay and exit via the passenger terminal.

After the drone drops off all pods at the arrival bay, step 1308 is reached, and an analysis of drone power level is done to see whether the drone needs to be charged. If power levels are not sufficient, step 1310 is reached and the drone flies to a charging bay and docks into an open spot to charge. After charging, step 1312 is reached. If there are no drones ready to transport waiting pods, the drone may be directed to a 4-pod drone bay to park itself in an open spot. Otherwise, the drone may be ordered by exchange station management control to pick up fully charged pods from a loading bay to transport to a next exchange station. Returning to step 1308, if a charge is not required, step 1310 is skipped, and step 1312 is reached directly.

In alternative embodiments, chargers may be provided in different bays in the station, and charging may be done, as described above, for example, in loading bays.

Figure 14:
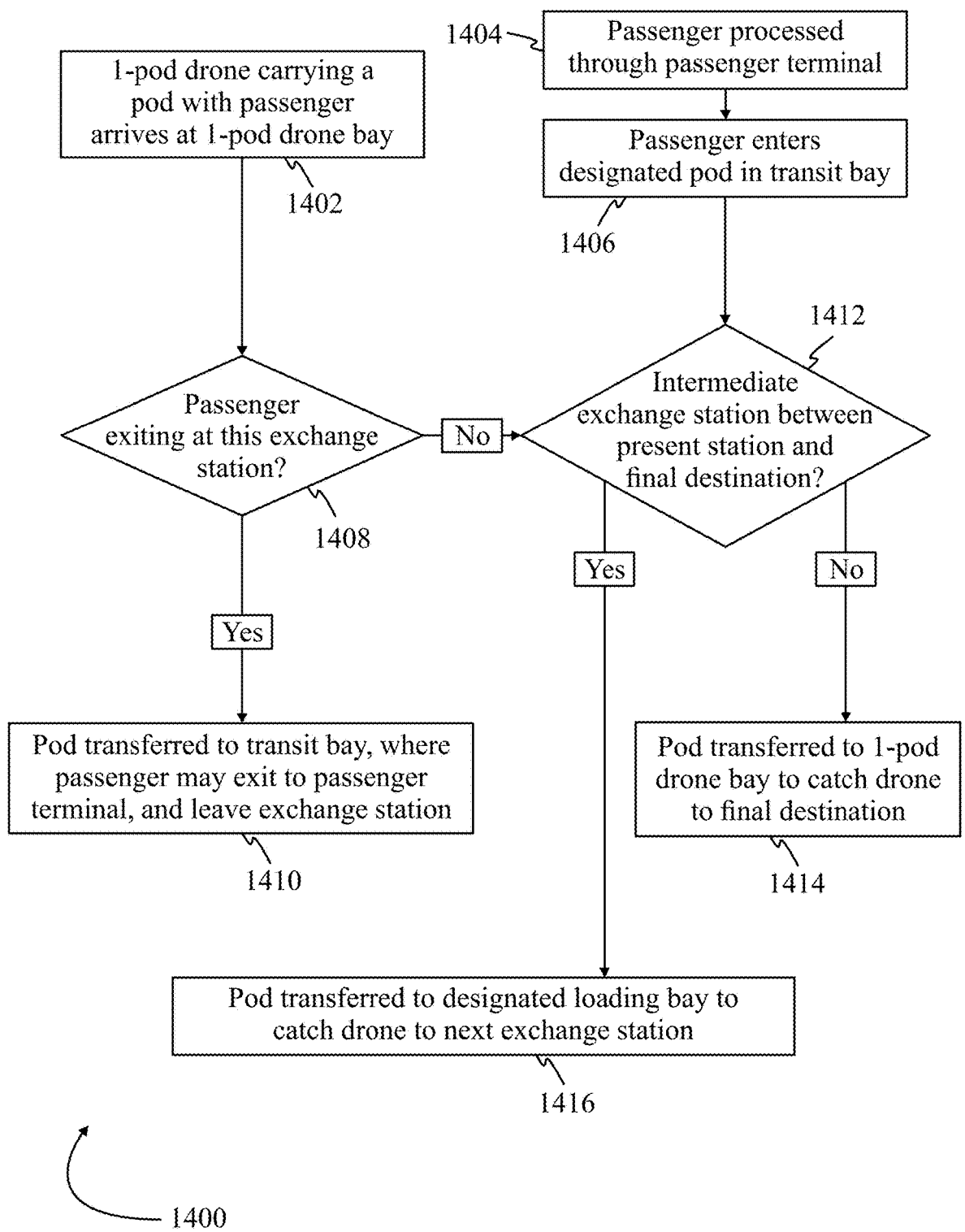
FIG. 14 is a flowchart of a method for passenger pods entering into an arrival bay exchange station system from sources other than the arrival bay according to one embodiment of the present invention.

FIG. 14 is a flowchart 1400 of a method for passenger pods entering into an arrival bay exchange station system from sources other than the arrival bay according to one embodiment of the present invention. At step 1402, a 1-pod drone may carry a pod with a passenger from areas such as shopping, home, or office to a 1-pod drone bay at the present exchange station. At step 1408, if a passenger is leaving the present exchange station, step 1408 is reached, and the pod may be transferred to a transit bay where the passenger may exit the pod and may exit the exchange station through the passenger terminal. Returning to step 1408, if the passenger is headed to a different exchange station, step 1412 is reached. At step 1412 if there is no intermediate exchange station between the present exchange station and final stop, step 1414 is reached. At step 1414, the pod may wait at the 1-pod drone bay for a drone to transport it to the final stop. Returning to step 1412, if there are one or more intermediate exchange stations, step 1416 is reached. At step 1416 the pod is transferred to a loading bay heading to the passenger's next exchange station.

On the passenger terminal side, which may be occurring simultaneously, at step 1404 a second passenger is processed through the passenger terminal. At step 1406, the second passenger may enter a fully charged pod in the transit bay designated to them during processing in the passenger terminal. After which, step 1412 is reached. At step 1412 if there is no intermediate exchange station between the present exchange station and final stop, step 1414 is reached. At step 1414, the pod may be transferred to the 1-pod drone bay to catch a drone to transport it to the final stop. Returning to step 1412, if there are one or more intermediate exchange stations, step 1416 is reached. At step 1416 the pod is transferred to a loading bay heading to the second passenger's next exchange station. For parcel pods, a pod from a parcel bay may enter the transfer path and be transported to a designated loading bay at any time, or to the 1-pod drone bay to be transported to an office or residence.

Figure 15:
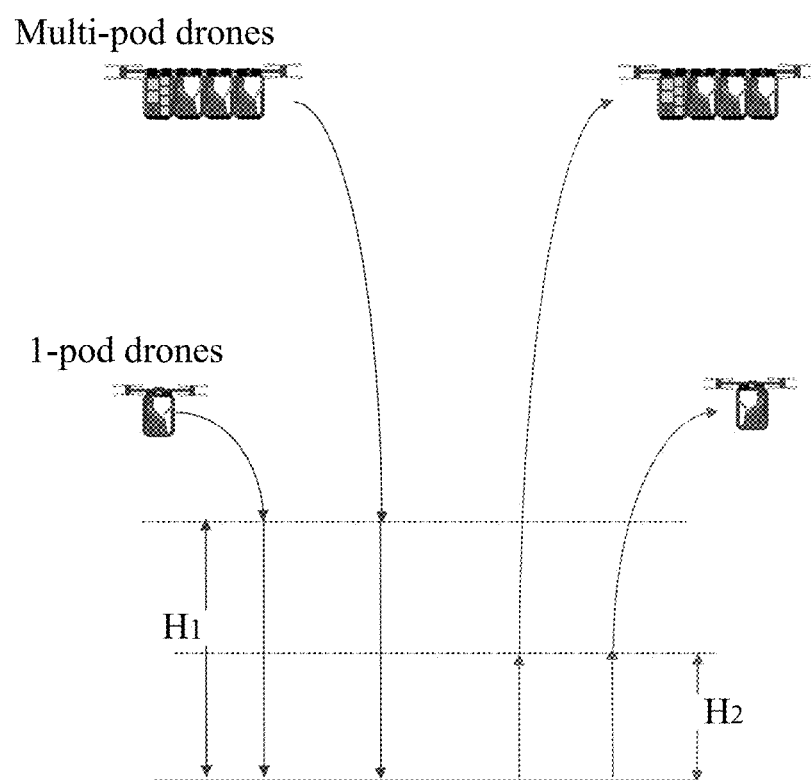
FIG. 15 illustrates preferable operating altitudes for drones relative to exchange stations.

FIG. 15 illustrates preferable operating altitudes for drones relative to exchange stations. Exchange station control checks arriving 4-Pod or 1-Pod drones for routing information to verify Pods should be landing at a particular exchange station. If not, or if a Passenger wishes to change route mid-flight, that Pod will instead transfer out of arrival bay into the transit bay, where it is re-programmed and transferred via a transfer path through transfer path to the new target loading bay.

Height H2 is minimum height to clear all ground obstacles. This is height drones must attain ascending vertically, then drones may stop climbing vertically and begin to travel towards destination. H1 is height above ground when descending drones start to descend vertically to ground. Heights H1 and H2 are initial safety heights to clear the Exchange Station. Once clear, the drones may ascend to their traveling altitude in their directed droneways, the height depending on their direction.

It will be apparent to one with skill in the art, that the embodiments described above are specific examples of a single broader invention which may have greater scope than any of the singular descriptions taught. There may be many alterations made in the descriptions without departing from the spirit and scope of the present invention.

Self-Navigating Pod-Chassis Assemblies

FIG. 16A is a perspective view of an intelligent pod chassis according to one embodiment of the present invention. FIG. 16B is a perspective view of a passenger pod seated and latched to the chassis of FIG. 16A. Referring now to FIG. 16A, a pod chassis 1600 is provided by the inventor to enable a passenger or a parcel (freight) pod to be seated thereon and latched thereto, such that the chassis may drive the pod under remote control from and to one or more control stations, or by overriding control by a human operator on the ground or by a passenger sitting in the pod.

Chassis 1600 in this exemplary embodiment includes a frame incorporating a rear axle 1601, a front axle 1602, and a pair of fixed side struts 1603*a* and 1603*b*. Each of the axles supports a pair of drive wheels 1604*a* and 1604*b* attached to rear axle 1601, and drive wheels 1605*a* and 1605*b* attached to front axle 1602. In one implementation, there are four motors (not specifically illustrated) provided one each per wheel, wherein the chassis is an all-wheel drive, or each wheel may be powered by a single motor. Motors may be co-located next to each drive wheel and may be housed within each of the axles.

In the above implementation, smaller motors or other actuators may be provided to enable control for turning of at least the front wheels. The front wheels may be linked in tandem such that two servo motors may control turning, one motor for turning right and one motor for turning left. The servo motors (not illustrated) may be co-located next to drive motors within the front axle and may control movement of the turn linkage connecting the wheels through the axle. There are a variety of ways that turning may be accomplished.

Chassis 1600 includes in this exemplary embodiment inwardly-facing latches 1606 that accept and latch onto the bottom frame of a pod. Chassis 1600 may also include a small rechargeable battery and a small computing processor unit (CPU) including a wireless modem for remote control and power lines to power the motors. Power connectors are integrated into latches 1606 that connect to terminals in the interface hardware of the pod so that the chassis may be powered by a larger pod battery. Hosting electronics and a smaller battery in the chassis frame enables the chassis to be remotely driven with or without a pod, such as for parking or positioning for pod installment. However, in one implementation the chassis may be a dumb chassis until a pod is attached. In this implementation, power cables and control signal lines may be routed through the latch connections from the pod battery and control module to the motors.

Chassis 1600 may include outwardly-presenting tongue latches 1607 to enable several chassis to be linked together linearly. In a further implementation, chassis may also have outwardly-presenting tongue latches (not illustrated) at the center of each side strut so that they may be connected laterally such as four chassis two side-by-side in front and two side-by-side behind.

In a preferred implementation chassis 1600 includes a plurality of sensors, such as a combination of or single technology grouping of proximity sensors, cameras, lidar sensors, and infrared sensors. These sensors may be disposed along the front and rear axles and along the left and right struts of chassis 1600. Wiring from deployed sensors may be routed through the axles and struts to the CPU and through latches 1606 to a control device on the pod (a separate CPU), such that remote control of the chassis may be initiated through a module on the pod architecture. Further, such bridging may be made through drone to pod attachment interfaces as described above referencing the description of FIGS. 3*a*, 3*b*, 3*c*, and 4.

In a preferred embodiment, the sensors work in conjunction with a controller and command instruction including GPS location information to enable the chassis to self-pilot within a building such as an exchange station or out on a street or pathway. Also, in this embodiment at least two upper limit latches 1616 may be provided to accept drone latches. It is noted herein that the pod described above includes as many as four latches for drone hookup, in addition to the latches for connecting to a chassis. In this example there are two such latches one at each side of the pod.

Referring to FIG. 16B, a pod 1608 is provided somewhat analogous to pod 100 described with reference to FIGS. 1A-C. Pod 1608 may be seated onto chassis 1600 and latched thereto enabling the chassis to drive the pod both inside and outside of designated buildings that may be exchange stations, charging stations, etc. Chassis 1600 enables passengers, referenced herein as a passenger 1615, to proceed from an exchange station on to a workplace or other destination making the transport system complete and relieving drones of a requirement to fly the pods to final destinations or picking them up from original starting locations.

It is an important aspect of the present invention in many implementations that pods are standardized and are compatible for engagement and transport by either intelligent, wheeled chassis, as described herein, or by pickup and transport by flying drone as described in enabling detail above.

There are a variety of ways a pod may be moved to and mounted on a chassis. For example, a pod may be picked up by a drone, and lowered to and engaged to a chassis. Pods may be suspended as well from some other apparatus, and a chassis may drive under the pod, with the apparatus lowering the pod to the chassis. In another variation the chassis drives under the pod and slides it along over small rollers in the struts. In some embodiments, windows of pods may be covered by a computer-generated display, for games or movies using AR/VR technology.

As describe previously, in one embodiment pod 1608 includes at least one door 1609, a front panel 1610, a rear panel 1611, a roof and a floor and three or more windows 1612. Windows may be fabricated of plexiglass, automotive window glass, or of other suitable transparent materials. In one embodiment, windows 1612 may include coatings or materials that provide UV protection for passengers and tinting for passenger convenience.

In one implementation each pod has at least one CPU controlled display and an input interface for passenger use and for technical access to pod chassis components. Each pod has a battery that may be the primary battery powering drones or chassis when either is engaged in carrying one or more pods. The pod battery (not illustrated) may reside beneath the passenger bench. A charging access port to the battery is provided at least on one side of the pod passenger seat and is designated by an access relief opening 1614 made through the panel of door 1609, that aligns with a charging port built into the passenger seat when the door is closed.

Figure 17:
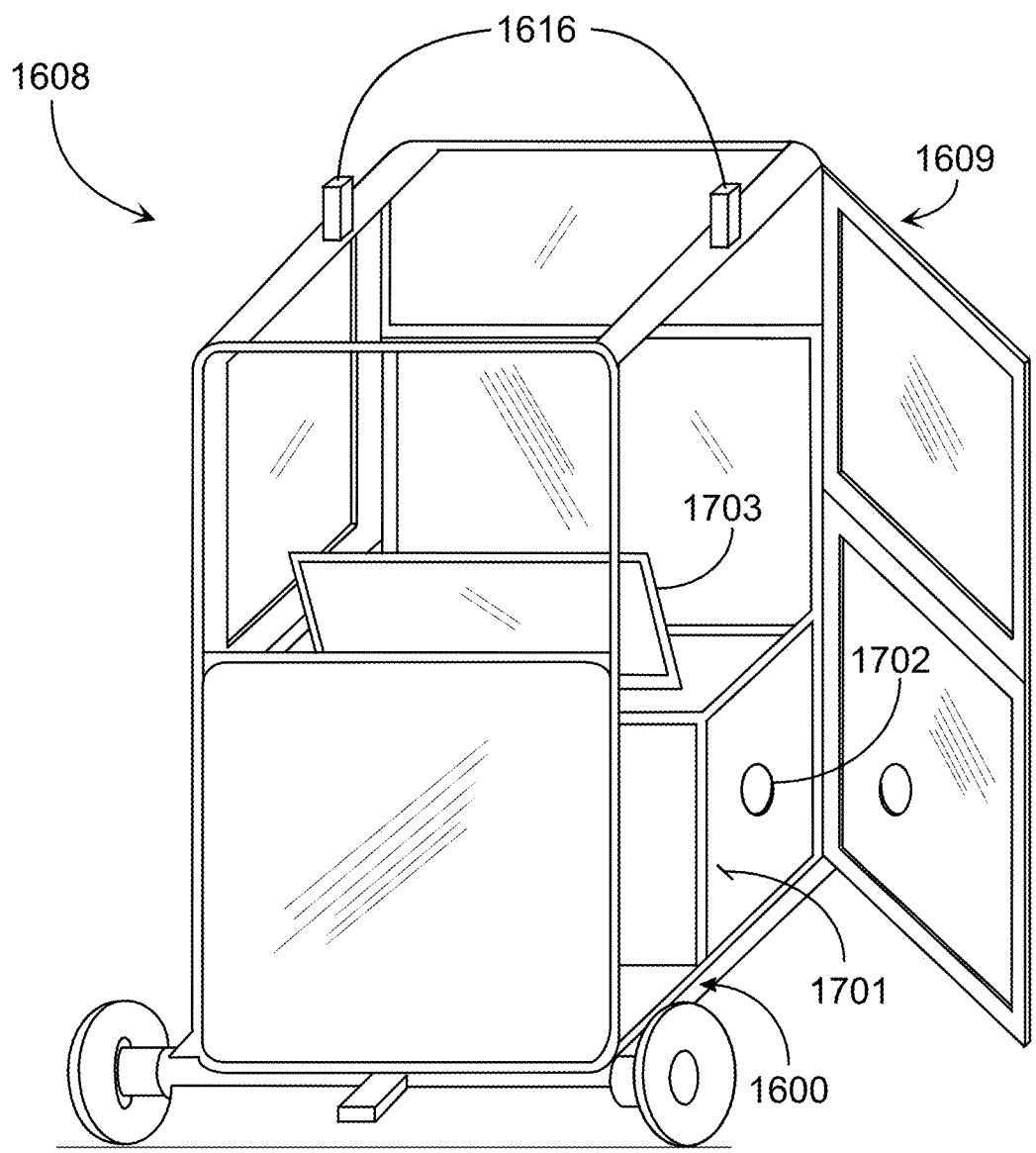
FIG. 17 is a perspective view of a pod with an open door.

FIG. 17 is a perspective view of pod 1608 and carrier chassis 1600 of FIG. 16B showing the pod with an open door, to better illustrate other elements of the pod, such as charging access port 1702 through bench seat 1701, which, in freight configurations may be a battery cover rather than a seat. In this view door 1609 is open to enable passenger ingress and egress or loading or unloading of parcels. In one implementation where the car delivers parcels there is no passenger seat or bench, but a cover for the battery. Parcels may be loaded into a shelf type encasement that may be unlocked using a code provided to a parcel recipient by the retailer or company shipping the parcel.

A code, for example, might be used by an intended parcel recipient to open door 1609 and then to open a compartment of the parcel shelf to retrieve the correct parcel. In other implementations parcels may simply be stacked for general shipment to a drop off point or shipping station where they may be unloaded and sorted for local delivery by mail truck, UPS, or another carrier. In one implementation a passenger may override automated navigation and drive the chassis through a computerized display interface 1703 that accepts passenger input. Steering, braking, and speed selection may be affected manually through operation of the display interface via touch screen controls, for example.

In this implementation there are only two drone latches 1616 on top of the car. However, there may be other architectural patterns of latches and the exact mechanics of latch hardware may vary depending upon design. Latches may be magnetized and coupling to a drone may be initiated by drone control instructions. When a drone latches onto pod 1608, it may then switch over to draw power from the pod battery. The chassis may be released for use by a next arriving pod. Chassis 1600 may also be driven without the pod attached.

It may be important to note here that drones are controlled by a portion of the navigation system to pick up pods, transport them, and to release them at programmed locations. Pods on chassis may be controlled by the same navigation system or by a separate system than the drones without departing from the spirit and scope of the present invention.

Figure 18:
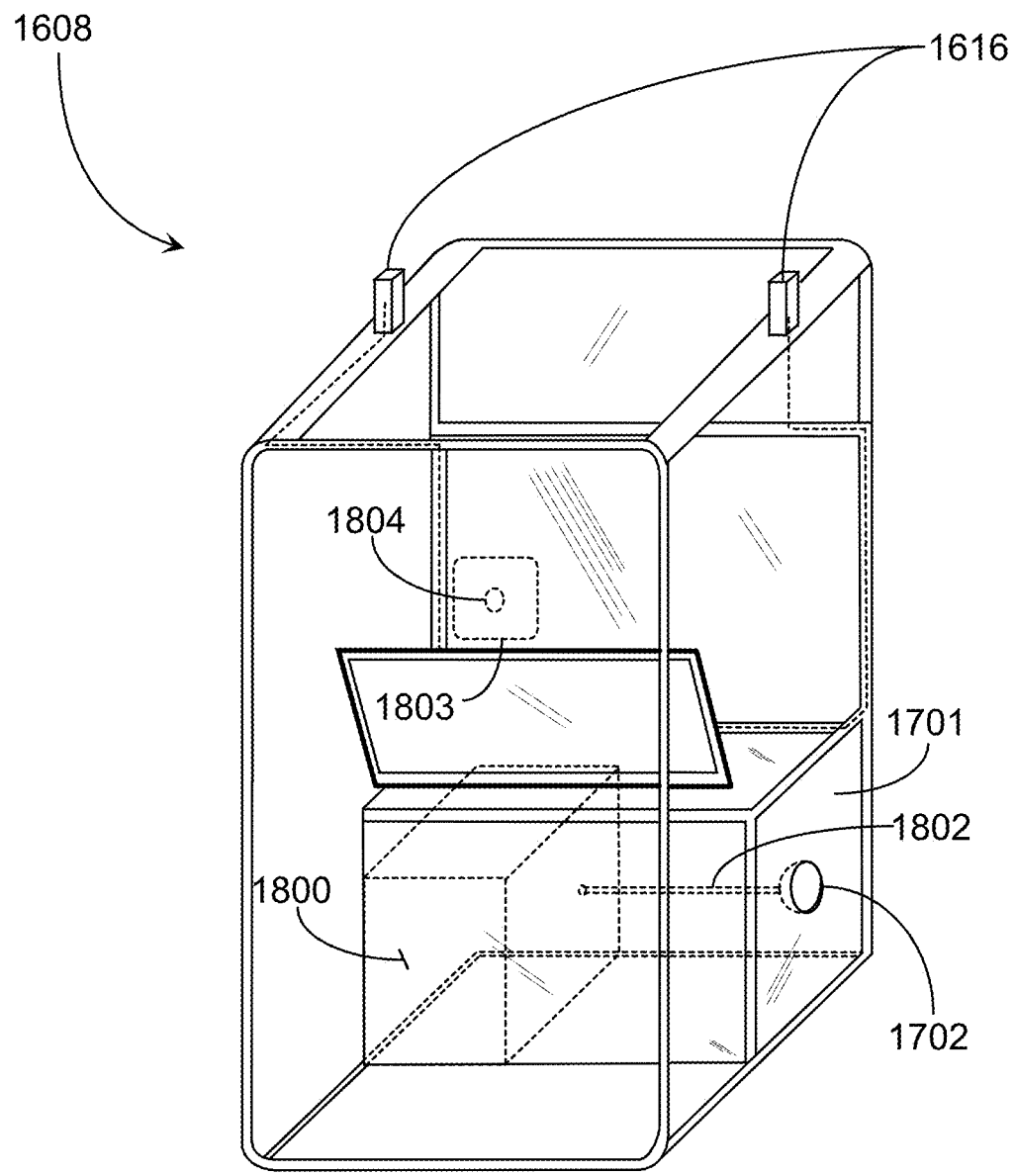
FIG. 18 is a perspective view of the pod passenger carrier of FIG. 17 with exterior doors and panels removed depicting inner components.

FIG. 18 is a perspective view of passenger pod 1608 with exterior doors and panels removed to better illustrate inner components. Pod 1608 in this embodiment includes a primary rechargeable battery 1800 located beneath passenger seat 1701. The battery size may vary, and the battery may be located anywhere within the passenger seat box. Battery 1800 is accessible for charging through a charge port 1702 and charge line 1802 connected between the port and the battery. Battery 1800 may also power a drone through latch points 1616.

Power lines from the battery are illustrated by dotted lines extending up through the pod architecture to the drone latches. An electrical contact seat is formed between the pod and drone at the latch architecture, enabling the pod battery as a source of power for the drone. Power lines from the battery may also extend below the pod floor into the pod chassis through a plug connection or automatic coupling hardware. In one embodiment, while a pod is seated in a chassis and or a drone is attached for flight, the computer processing may be assigned to any one of three CPUs, these being the chassis CPU, the drone CPU or the Pod CPU, to avoid computing redundancy. In one implementation, pod 1608 may have a rechargeable auxiliary battery 1803. Battery 1803 may be mounted to or otherwise fixed to pod 1608 for charging, and a charging port 1804 may be provided and dedicated to charging battery 1803 from outside of the vehicle. Battery 1803 may be used for auxiliary purposes such as powering lights, a music device, or for emergency purposes such as emergency flashers, and so on. In one case, a passenger may switch to auxiliary battery power, such as when waiting for a primary battery to be fully charged, wherein electronics in the pod, such as a computing and display interface, are not able to draw power from the primary battery.

Pod 1608 may include other features not specifically illustrated, such as heating and air conditioning, emergency collision air bags, adjustable windows, vents, safety locks for doors, and other such features. Individual ones of these features may be initiated or otherwise manipulated by a human passenger and individual ones of these features may be fully automated upon trigger alert or otherwise initiated because of detection through sensors or communication or passenger input that an emergency is unfolding. In control systems, functionality like Alexa and gesture recognition may be implemented.

FIG. 19A is a perspective view of a train of pod chassis, joined in a series. FIG. 19B is a perspective view of a group of pods on chassis, linked to travel in line together. Referring first to FIG. 19A, a chassis train 1900 of four chassis, analogous to chassis 1600 of FIG. 16A above, are shown linearly attached via tongue latches analogous to latches 1607 depicted in FIG. 16A.

In one use-case scenario, multiple chassis may be linked together to form chassis trains such as train 1900 for receiving four pods analogous to pod 1608 of FIG. 16B, that may be delivered by drones, such that the spacing between the pods attached to a four-pod drone, and the spacing of seat latches 1606 are sufficiently the same and within tolerance to affect 100 percent latching of each chassis to a pod. There may be chassis trains of two chassis, three chassis, four chassis, etc. When chassis are connected, control and power lines of each chassis may be connected through the latching hardware, such that the lead chassis may become a parent chassis and may override certain functions of the other chassis. More particularly, a functional network is created including the separate nodes being the chassis CPUs and the reporting sensors.

In one implementation, chassis may be remotely piloted and latched together as well as disconnected from the train remotely by a human operator or auto-pilot instruction. While not connected in a train, each chassis may be separately remotely operated to drive to designated locations for maintenance, storage, staging, etc. While connected into a train, the lead chassis may be operated as the intelligent chassis for navigation purposes, such as the turning capabilities of the chassis further back in the train being overridden by the lead chassis, whereas the motors on all the chassis may remain active in driving the train forward.

In one embodiment, a train of pods carrying passengers on chassis may proceed along a route wherein one or more of the passenger pods must depart from the train along a different route. In such cases, the train may stop and the pod requiring rerouting may unlatch from the train and embark on its own while the remaining pods on chassis re-latch to continue along the primary route.

Referring now to FIG. 19B, in one embodiment multiple separate chassis may be commanded to navigate from separate locations to a single location and form a chassis train for receiving a like number of pods. Each chassis may have a unique IP address or machine address for identification by commanding SW. Chassis train 1900 includes four chassis in this example and carries four pods 1608. In one embodiment, all four pods may be placed onto chassis train 1900 by a drone at the same time and in the same programmed action. In another embodiment, pods may be separately delivered to a chassis train by successive single-carrier drones. Optical and proximity sensors on the pods and on the chassis may aid in proper seating and latching of the pods to the chassis.

FIG. 19C is a perspective representation of a compound chassis in another embodiment of the invention. In the circumstance represented by FIGS. 19A and 19B, four separate chassis are linked together to carry four separate pods. In FIG. 19C, a single chassis 1901 is provided and enabled to carry either four separate pods, or in another circumstance a single pod developed to carry four passengers. FIG. 19D illustrates four pods carried on a single chassis 1901.

Chassis 1901 in this example has axles and wheels just on the ends of the length of the chassis. Both sets of wheels may be powered and may be controlled to steer. There are, in this example, latching supports 1902 for accepting and supporting separate pods or a multiple-passenger pod. Pods latch to supports 1902. Cross members 1903 are provided to strengthen the chassis structure.

Given the figures and description herein, it should be apparent to the skilled person that carriers may be designed and provided to carry single pods, and single pods in arrays, as well as to carry multiple-passenger pods, wherein passenger compartments may be arranged in essentially the pattern that single pods would follow for a particular carrier.

Given the descriptions above regarding exchange stations, it is important to understand that passenger pods as described being carried by drones from above, and passenger pods being carried by intelligent chassis carriers, may be exchanged from one carrier to the other in exchange stations, such that a passenger in a passenger pod may be at different times transported by a chassis carrier or a drone, and theoretically, any number of exchanges may be made without a passenger required to leave one pod for another. A passenger, once in a pod, may stay in the same pod throughout a journey, regardless of exchanges in mode of transport.

POD Charging

Figure 20:
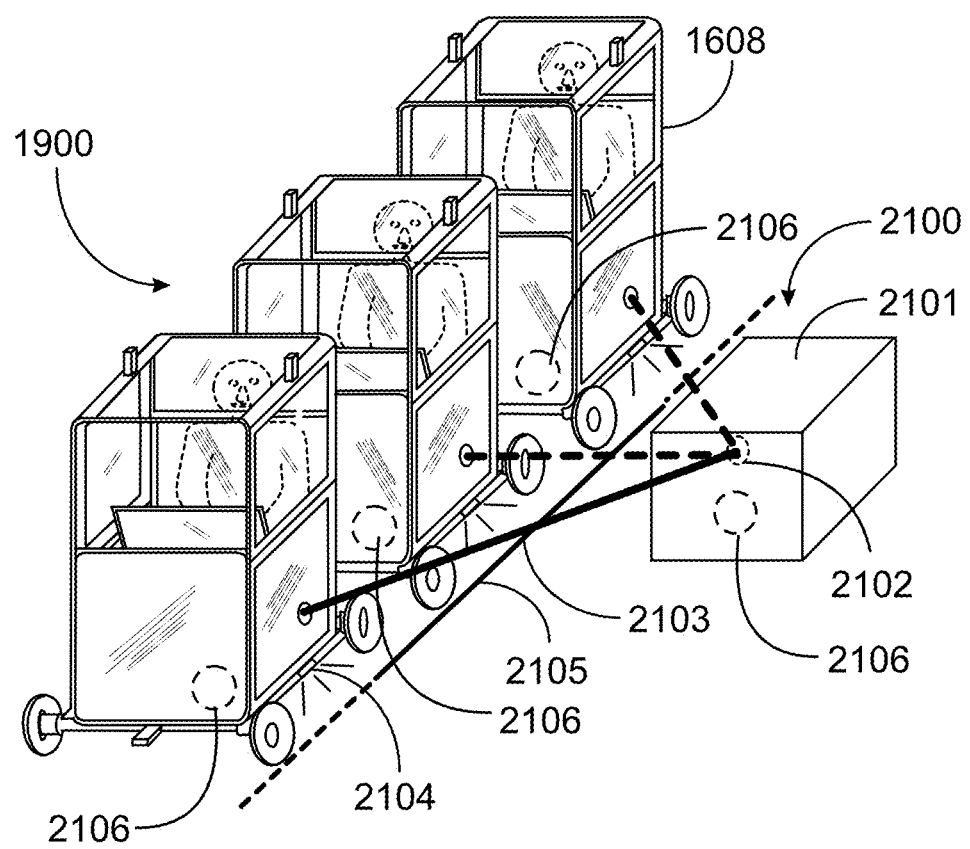
FIG. 20 is a perspective view of a charging bay where charging occurs via mechanized charging cable according to one embodiment of the invention.

FIG. 20 is a perspective view of a charging facility 2100 where charging occurs via one or more mechanized charging cables according to one embodiment of the invention. Charging facility 2100 may include a charge terminal 2101 having at least one charge cable 2103 extending from a terminal outlet 2102 that may connect to a charge port on a pod 1608.

Charge facility 2100 may be guided as far as charge position and speed by a physical charge line 2105, in one embodiment embedded in a floor structure, that can be detected by side-presenting sensors 2104, which may be lidar or infrared, or optical, or a combination of these, one of which may be a camera. A cable or cables 2103 may be mechanically operated and may adhere to an extension limit. The charge plug, or terminal end of a charge cable, such as cable 2103, may include at least one sensor for detecting position of a pod for charge.

In one implementation the charge cable has a maximum and a minimum extension range that covers a rough 45-degree articulation range of the cable. For example, if a single pod on a chassis uses the facility, side-presenting sensors 2104 may detect line 2105 and may provide feedback to the navigation module to align with that line for charging, including adjusting the speed of movement to a speed conducive to receiving a full charge within the range of the cable. Therefore, a pod 1608 approaches line 2105 and slows down to charge speed and proceeds along the line until in position for cable connection at the cables maximum extension at forty-five degrees from center (first dotted cable line position).

As the pod moves forward along the charge line, the cable is connected, and charging is accomplished, and then the cable automatically retracts to minimum extension distance roughly at center (second dotted cable line position). The pod car proceeds along the charge line to the maximum extension again at the end of the forty-five-degree range within which charging may occur. At this point the charging is complete and cable 2103 may decouple from the charge port and may be maneuvered to accept a next pod car for charging.

In an embodiment with more than one cable, a train 1900 (three or more pods latched linearly) may be charged while still latched together wherein three or more mechanized cables are made available, one for each pod in the train. In such an embodiment the dotted cable lines may represent additional cables 2103, one for each pod in the train. In this case the lead pod is fully charged and about to be decoupled from the charge cable while the next pod is at mid charge and the pod further behind has just been coupled to a charge cable.

The mechanics required to manipulate and direct the charge cables may vary. For example, a cable may be housed in a telescopic sheath that may be connected to a turret component that may enable the cable to be swiveled along the forty-five-degree angle defining the charge area. There may be more than one connected to an outlet on charge terminal 2101. One with skill in the art may appreciate that protective covers and components may be employed to reduce chance of shock or accidental short without departing from the spirit and scope of the invention. Drones are charged separately in different charging. Once a drone latches to a pod, the drone may switch over to main pod battery for power.

Pods seated on a chassis may be charged at a facility such as facility 2100 with or without passengers on-board and with or without parcels on-board. In one embodiment, wherein a passenger is present during charging, the system may enable a power source change for the pod from the primary battery under the seat to an auxiliary battery mounted or otherwise integrated into the pod structure. In another case a passenger may continue to operate pod features normally sourced by the primary battery during charging.

In calculations regarding a mechanized cable, the inventor has deduced that, for example, if the retracted charge cable length is five meters, and engagement of the charge plug, and disengagement occurs at plus forty-five degrees and minus forty-five degrees from center (retracted position), total distance of travel is 10 meters. The actual speed for charging may vary depending in part on the pod battery size and density, as well as the power level of the charge station.

Figure 21:
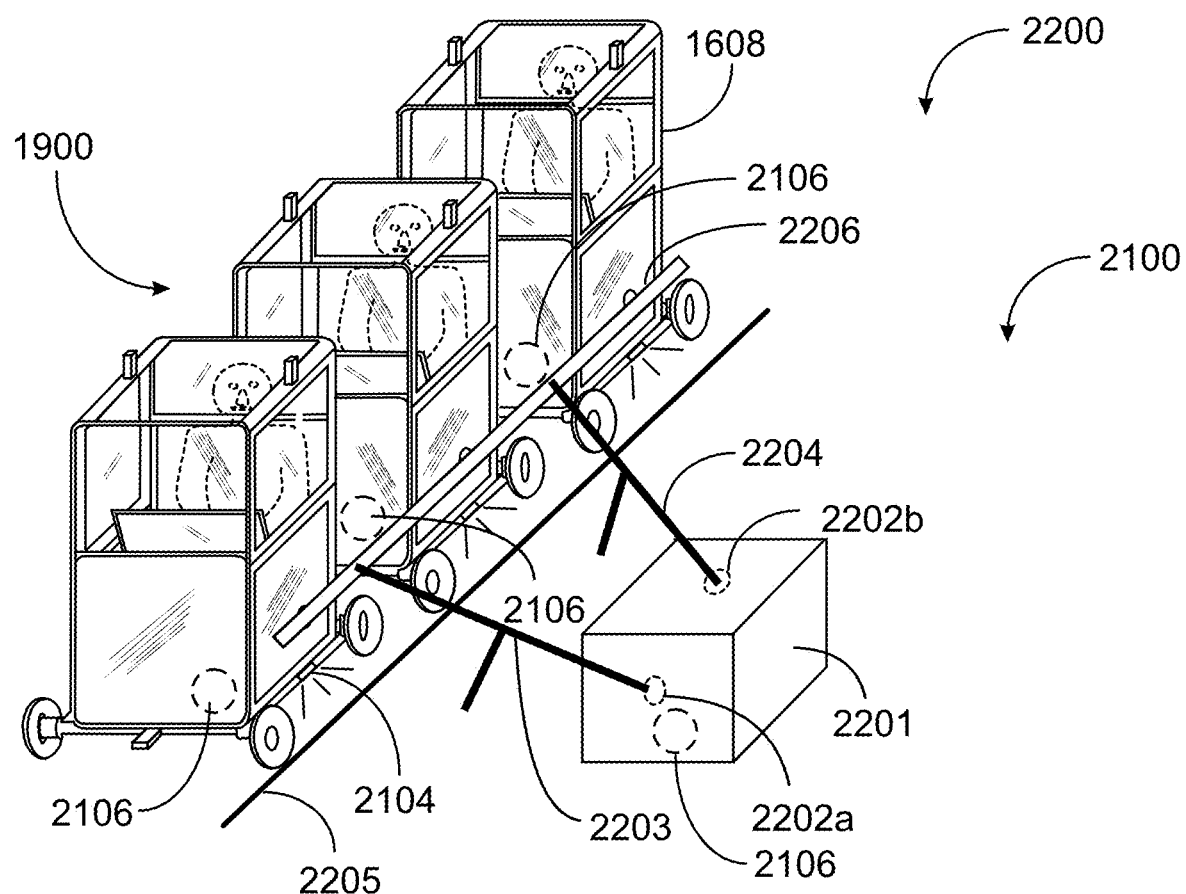
FIG. 21 is a perspective view of a charging bay where charging occurs via a fixed rail according to another embodiment of the invention.

FIG. 21 is a perspective view of a charging bay 2200 where charging occurs via a fixed rail according to another embodiment of the invention. In one implementation, charging bay 2200 is provided with a charge-guide line 2205 that may be picked up by side-presenting sensors 2104 as was described with respect to the charging bay of FIG. 20. In place of cables, charging bay 2200 utilizes a charge rail 2206 that may be fixed at the end of a pair of structurally supported charge extensions 2203 and 2204. The other ends of extension or cables 2203 and 2204 culminate at charge terminals 2202a and 2202b respectively in the example.

In this implementation, a single pod 1608 or a train of pods cars 1900 may be charged by making contact between the charge port on the side of the passenger bench and the fixed rail, such as by a brush mechanism that may remain in contact with the charge rail while the pod car or train is moving forward. In another implementation a fixed charge pad or series of pads might be used in place of a fixed charge rail, wherein a pod or pod drives directly over the pad(s,) and a wireless power transfer to a charge receiving unit at the bottom of the pod battery occurs as the pod car moves over the charge pad(s).

Sensors may detect a charge guide line as described further above and forward-facing sensors may detect approach to the beginning of the charge pad(s) and may signal the charge-receiving receptacle to prepare for wireless charge. In another implementation, contacts may be provided and presented beneath the pod battery that make physical contact with the charge pad(s). A charge pad or charge rail may be linear and of a prescribed length to enable a full charge in a single pass.

Charging stations may be placed spaced apart in a covered region whereby a fully charged pod battery may enable distance that exceeds the distance between stations, assuming as well that the pod is not carried by a drone but drives the distance. In a preferred embodiment, charging may be optimized though use of high voltage capacitors, such that a full charge occurs along the charge angle limit (cables) or rail or pad length.

It is apparent that charging cannot be instantaneous, and that relatively quick charging is desirable, as time taken in the charging cycle is time when transport is delayed. In one embodiment of the invention, referring to both FIGS. 21 and 22, high-energy capacitors, referred to often as ultra-capacitors or super capacitors, are incorporated both in the charging station and in the battery systems of the pods, and other devices to be charged in operation of the overall system. Such capacitors are capable of quickly transferring large quanta of energy at high voltage (to keep amperage requirements low).

In FIGS. 20 and 21, ultra-capacitors 2106 are illustrated as a part of both the charging station 2101 and 2102, and also of the pods 1608, in this example. In the charging process in one embodiment, using ultra-capacitors, the primary power source in the charging bay, either 2100 or 2200, charges the ultra-capacitor 2106 in that charging bay, between instances of charging pods or carriers. When the carrier or carrier train engages with the charging bay, the ultra-capacitor 2106 in the charging bay charges the ultra-capacitors in the pods or carriers as they pass. After leaving the charging bay the energy imparted to the ultra-capacitors is used to charge the batteries of the pods or carriers, which is slower process than passing energy between the ultra-capacitors. Ultra-capacitors may also be incorporated in charging drones.

Figure 22:
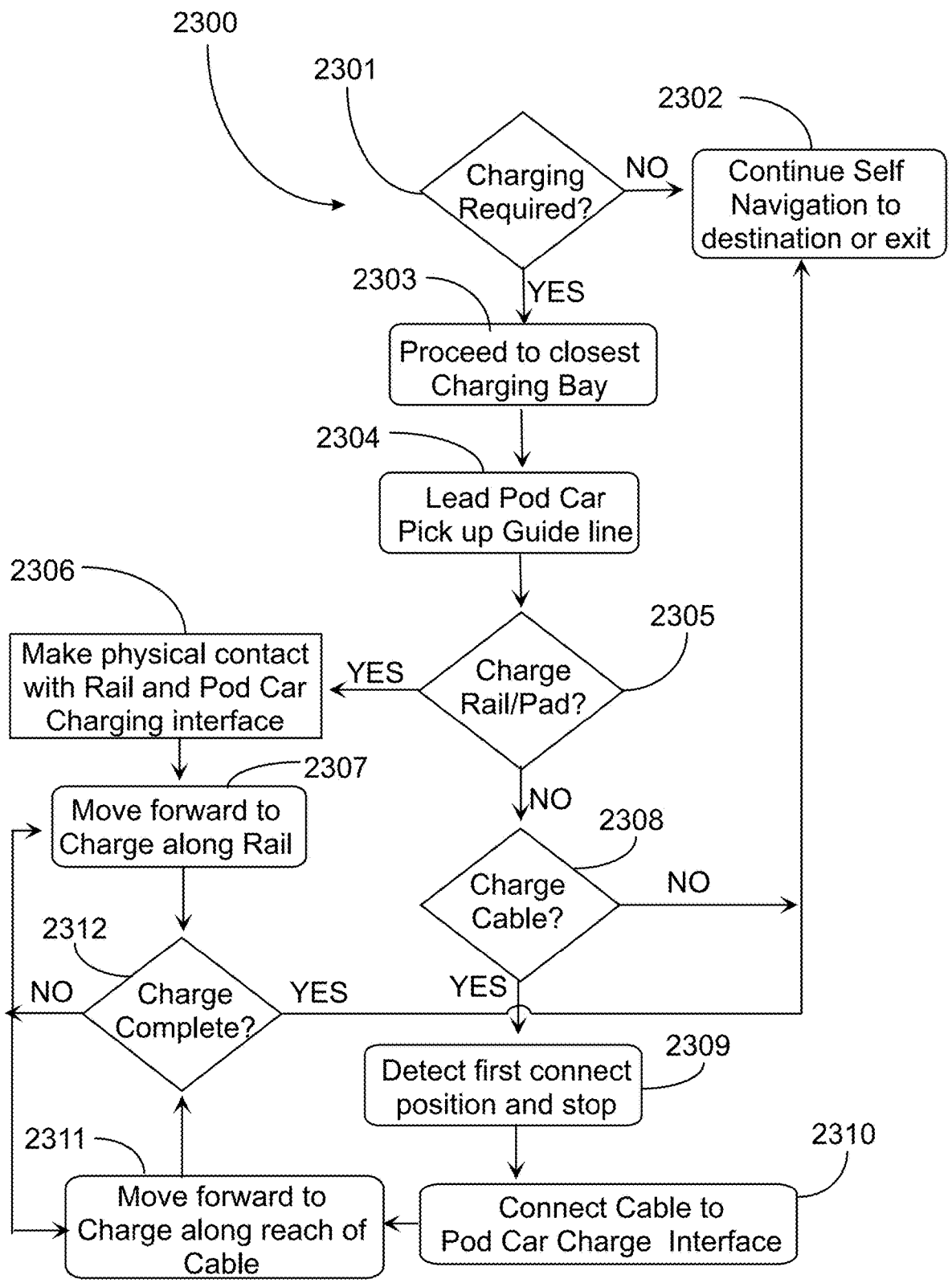
FIG. 22 is a process flow chart depicting steps for charging a pod battery according to at least one embodiment.

FIG. 22 is a process flow chart depicting steps for charging a pod battery according to at least one embodiment. At step 2301 a determination may be made whether a pod car requires charging. Indication of a requirement for charging may be communicated from a pod car to a remote navigation control network entity that subsequently provides navigation instruction to the pod car. In one embodiment, location of and subsequent navigation to a charging bay may be a function of the pod, wherein self-piloting to the charge location is automatic or scheduled in with other tasks or navigated destinations if the pod indicates a need to charge.

In the case of a train of linked pods, it may be that one or a few of the total linked pods require charging, while other pods linked together in the train do not. If a determination is made that charging is not required for a pod at step 2301, the process may move to step 2302, and that pod may continue self-navigation or commanded navigation toward a planned destination or an exit.

If it is determined that a pod requires charging at step 2301 (confirmation), that pod may proceed to a nearest charging bay at step 2303. If it is determined that one or more pods in a train of pods requires charging at step 2301, then all the linked pods may be subjected to entering the pod charging bay, so that the pods requiring charging may be charged without requiring de-latching from the train.

At step 2304 a pod car requiring charging or a lead pod car in a train of pod cars, where one or more of the pod cars requires charging, may detect a charge line in the road or pathway with forward and side presenting sensors, and may steer along the charge line and reduce speed to a preset charging speed.

At step 2305 a determination may be made whether the charge facility uses a fixed charge rail or fixed charging pad running adjacent and parallel to the charge line. If it is determined that the charging facility uses a fixed rail or charge pad(s) in step 2305, the pod or pod train may align to the charge line and make physical contact with a fixed rail and pod charging interface (terminal contact), to initiate charging at step 2306. In the case of a linear charge pad(s) the interface for charging on the pod or pod train may be wireless or a physical contact and the pod or train may follow the charge line adjacent to the linear pad or pads in step 2306.

At step 2307 in the case of a rail or charge pad (s), the pod or pod train may move forward making sliding contact along the rail or linear pad or wireless contact along the linear pad. The pod or pod train will slow down to charge speed so that fast charging may be accomplished along the length of the rail or linear charge pad (s).

At step 2305 it may be determined that the charging facility does not include a rail or linear charging pad (s). If it is determined that no rail or pad is available a determination is made at step 2308 whether the facility is equipped with a mechanized charging cable or charging cables. If it is determined at step 2308 that the facility is not equipped with rail pads or cables, then the charging process may not be performed at that facility and the pod car or pod train may continue self-navigation to a destination or exit. It may be that the facility is not in use at the time or down for maintenance, etc. A possible next destination may be to a next nearest charging station. It will be apparent to one with skill in the art that a single pod car may have more than one contact type for more than one type of charging apparatus that may be available. It may also be apparent that only one type of facility may be available requiring only a single and standardized contact type on a pod battery for charging.

If it is determined that the facility uses a charging cable or cables at step 2308, the lead pod car (train) or single pod car may detect a first cable contact position and may stop momentarily at step 2309 allowing the mechanized cable to connect to the charge receptacle through a relief opening the pod door at step 2310. Once connected, the pod may proceed forward at a prescribed charging speed while the cable is connected until the cable again reaches maximum extension at the end of the charge zone and detaches from the charging interface at step 2311.

In the case of a train of three pods, a second and a third cable may be employed to charge the following pods if charging is required for those pods as well. When the first cable detaches after a lead pod is finished charging, it may position itself to connect to another pod in a train of pods that reaches the start angle position of the cable at maximum extension length of the cable. In one embodiment the connection is a magnetic connection.

In one embodiment, the connection is a quick-connect and quick-release mechanical connection. In one embodiment the lead pod is not required to stop for the cable to connect if the speed is slow enough for allowing the contact connection to be established. At step 2312 a determination may be made as to whether charging is complete for the single pod or for any pod in a train of pods. In all cases, if it is determined that charging is not complete on a first pass, a single pod or train of pods may navigate to take another charging pass along the rail, pad(s), or along the cable reach at steps 2307 and 2312, depending on type of charge facility. At step 2312, if charging is determined to be complete the process may move to step 2302 to continue self-piloting to a destination or an exit.

In one embodiment any pods in a train that do not require charging may disable or otherwise override a charging receptacle contact apparatus, so that charging does not occur for that pod battery, and so dissipation of current charge in the pod battery does not occur. In one embodiment drones have a separate charge routing and facility dedicated to charging drone batteries. In one implementation a drone may also receive charge through a pod battery charge station if charge lines are routed through the latch mechanisms to a drone battery. For example, the drone battery may receive a charge if the pod battery is fully charged and the pod car or train is still in contact with the charging apparatus.

In one embodiment, chassis battery charging may also be performed if charge lines are routed through the internal latches connecting the pod to the chassis. A drone battery and a chassis battery may be assigned priority such that, first the pod battery is fully charged and then the drone battery and then the chassis battery is charged. In other embodiments separate facilities might be maintained for the three dedicated battery types, whereas a drone will fly to a charging station dedicated for drone charging and a chassis may drive to a charging station dedicated for chassis battery charging.

At risk of redundancy, the following paragraphs summarize material described in an enabling manner above, with reference to the several drawing figures, that the inventor considers to be new, not obvious, and patentable subject matter.

In a broad sense the inventor is providing a transport system, which has a wheeled, steerable, self-powered, self-navigating carrier vehicle, that exhibits a substantially planar support frame, an on-board, rechargeable, battery-based power system, control circuitry, including GPS circuitry, on-board the carrier vehicle, adapted to drive and steer the carrier vehicle, and an upward-facing carrier interface adapted to the support frame, the carrier interface having first physical engagement elements. There is in the system, additionally, a passenger pod adapted to carry both packages and persons, the passenger pod having a structural framework, a rechargeable, battery-based power system, and a downward-facing pod interface adapted to the structural framework, the carrier interface having second physical engagement elements. In implementations of the transport system, the passenger pod, placed upon the carrier vehicle, engages the downward-facing pod interface to the upward-facing carrier interface by the first and second physical engagement elements.

From the just-described transport system, other versions have additional elements and functions, such as, for example, in which the control circuitry comprises wireless communication circuitry, enabling navigation and loading and unloading pods to and from carrier vehicles to be remotely-controlled. Another addition to the system described has the pod interface and the carrier interface each having electrical and electronic engagement ports that engage and disengage when a pod is engaged and disengaged from a carrier vehicle, enabling carrier power and control signals from the pod.

Another version has physical controls accessible by a passenger in the passenger pod, enabling the passenger to navigate the carrier vehicle with the pod supported and engaged. And still another version has additionally an upward-facing physical attachment interface as a part of the passenger pod, the upward-facing physical attachment interface compatible with a downward-facing physical attachment interface on a drone, enabling the passenger pod to be carried by the drone, to be deposited by the drone on the carrier vehicle, and to be picked up by the drone from the carrier vehicle.

Further to the above, in describing different versions of the transport system provided, the carrier vehicle may be configured to carry a passenger pod carrying a single passenger. In another version the carrier vehicle has fore and aft-facing latches, enabling carrier vehicles to be joined end-to-end, and to be navigated as a single vehicle. In still another version four carrier vehicles may be joined in a column, enabling four single-passenger pods to be placed and carried on the joined carrier vehicles, which is enabled to be navigated as a single carrier vehicle.

In still another version of the transport system, the carrier vehicle has fore and aft-facing latches, and left and right-facing latches, enabling carrier vehicles to be joined in rows and columns to carry passenger pods placed on the joined carrier vehicles in the rows and columns. IN another innovation, carrier vehicles may be joined by the fore and aft-facing latches and by the left and right-facing latches, forming a 2 by 4 array of carriers, enabling placement and transport of a single passenger pod on each of the joined carrier vehicles. And in yet another version, the carrier vehicle's substantially planar support frame is sized and enabled to carry four single-passenger pods in a row, with one set of wheels fore and aft.

In yet another somewhat different version of the transport system, the carrier vehicle's substantially planar support frame is sized and enabled to carry eight single-passenger pods in two columns, four pods per column, with one set of wheels fore and aft. In another, the passenger pod is a four-person pod, and the carrier vehicle carries one four-person pod. In yet another, the passenger pod is an eight-person pod in two columns and four rows, and the and the carrier vehicle carries one eight-person pod.

Finally, facility for charging batteries of passenger pods and carrier vehicles is made by providing charging stations. In one version, the transport system has a charging station for charging batteries of pods and carriers, the charging station having a power supply and a conductor element enabled to connect to charging circuitry in passenger pods or carrier vehicles, as the carrier vehicles and pods pass the charging station, power being transferred from the charging station to the batteries in the pods or carrier vehicles. In one version with a charging station, the conductor element comprises a cable connected to the charging station, and controllable to connect to a charging port on a carrier vehicle or a passenger pod, and to stay connected while the carrier vehicle or passenger pod moves by the charging station. In another the conductor element comprises a rail presented along a direction of travel of a passenger pod or carrier vehicle, and the passenger pod or carrier vehicle comprises a sliding contact element enabled to contact and slide along the rail while passing the charging station, power being transferred from the charging station through the rail and the sliding element to a battery of the carrier vehicle or passenger pod.

In either version of charging stations and operation, there may be a first ultra-capacitor in the charging station, and a second ultra-capacitor in charging circuitry of a passenger pod or a carrier vehicle, and wherein the charging station charges the first ultra-capacitor between charging cycles involving passenger pods or carrier vehicles, and during a charging cycle, the first ultra-capacitor charges the second ultra-capacitor, and the second ultra-capacitor charges the passenger pod or carrier vehicle battery after leaving the charging station.

Pod/Rail System

In this aspect of the invention the inventor provides an above-ground, rail-based transport system for transporting parcel or passenger pods or a mixture of both on a rail set via a trolley-type vehicle riding on the rails, with pods suspended below the rail set, in addition to drone transport of a pod and ground transport of a pod on the ground via a smart chassis.

Figure 23:
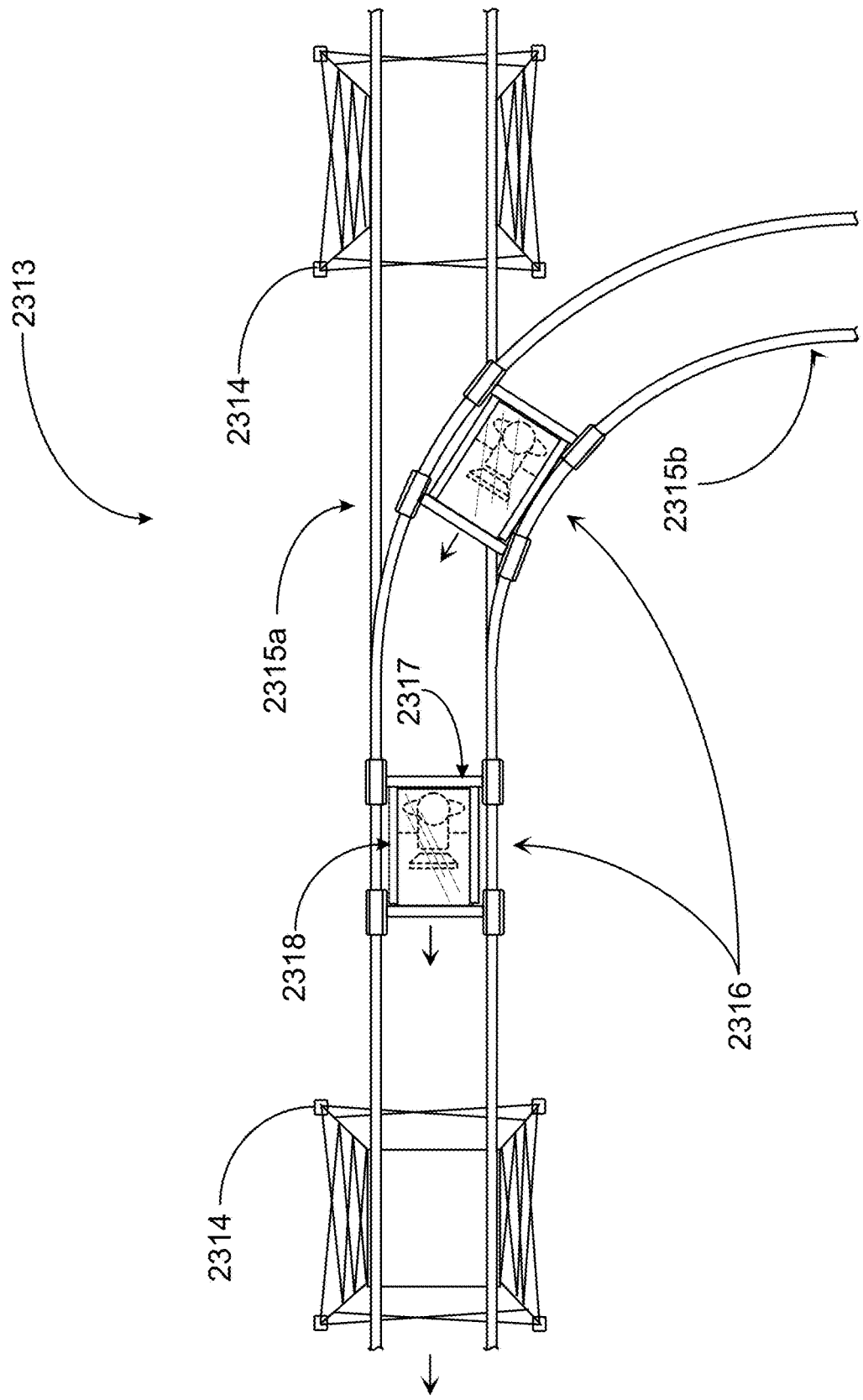
FIG. 23 is an overhead view of an above ground rail transport system for transporting pods according to an embodiment of the invention.

FIG. 23 is an overhead view of a portion of a rail transport system 2313 for transporting pods according to an embodiment of the invention. System 2313 is a partial view of the potential architecture that may be in place to support a robust rail transport system architecture that is mainly supported above ground but may also include junctions where the rails are low enough to ground level to support pod exchanges, passenger/parcel drop offs and pickups, pod charging, transfer areas where one mode of transport may be substituted for another. Therefore, it may be assumed that there are various types of stations generally associated with buildings and services located along a rail route.

A straight set of two parallel rails 2315a is depicted in FIG. 23, held substantially parallel in a relative planar relationship, whereby the rails are spaced evenly apart to accept the wheels of a smart trolley 2317 adapted by mechanical attachment hardware to carry a pod. A curved rail set 2315b is depicted for loops and turns that are required in the rail architecture. Rail sets 2315a and 2315b are employed over a large built up region such as an urban area, for example, to enable travel of persons and shipped parcels over areas that may be, for example, traffic congested for surface vehicles.

Rail sets 2315a, b may be solid metal extruded rails, such as steel rails, that may in some cases be conductive for powering drive motors, or may be nonconductive, such as reinforced polymer rails strong enough to support the weights involved with transport of people and parcels. In preferred embodiments no power is supplied through the rails in the rail sets, which the inventor believes to be in the interest of safety, as an accident might otherwise expose high voltage to passengers or others in the area of the supports and rail sets. A pod/trolley combination is depicted herein as pod/trolley combination 2316. Pod/trolley combination 2316 comprises a pod analogous to pods 1608 of FIG. 19B above attached to a trolley depicted herein as trolley 2317, by an automated mechanical latching system comparable and compatible to attachment interface described above, by which pods may be attached to drones. The broken lines within the pod depict a user seated and a computer interface and display as previously depicted relative to pod 1608 of FIG. 19B above.

Trolley 2317 is adapted in this example to drive in an autonomous fashion on top of rail set 2315a or 2315b on a set of wheels, in this case four wheels at two per rail. Trolley 2317 comprises at least two axles supporting the wheels, further described below, and a lower carriage that extends below the rail plane and attaches to the top surface of pod 2318, employing hardware that is the same used for attaching to a drone. In this way a pod containing a passenger or parcels may be autonomously transferred from a rail transport to a drone transport or from a drone transport to rail transport and may also be transferred from rail transport to smart, surface driving, carrier vehicles as also described above.

Trolley 2317 may be manufactured of steel or other materials that may be reinforced such as plastic or fiberglass reinforced by steel. Rail set 2315b in this example, intersects and merges with rail set 2315a to enable redirection of vehicles. Intersection points where curves and straight tracks meet may be enhanced by rail-switching hardware to enable both straight line traffic to pass and to merge traffic from one set of rails to another.

Rail sets 2315 a and b may be supported off the ground and at specified heights including grades of angle by a rail support structures 2314. Rail support structures 2314 may include a variety of designs and heights and may be erected anywhere along the rail routes to both support the rails off the ground and reduce vibration and potential bowing of rails under the weight of carried pods. In this example, structures 2314 are tower-like structures constructed of steel rails and vertical supports like a cell tower. Structures 2314 include a ledge for physically supporting the rails. The rails may be attached to the ledge in a manner that does not obstruct travel of a trolley on the rail set. Support structures 2314 have throughways beneath the rails to allow sufficient space for pods attached to the trolleys to pass unobstructed.

Trolley 2317 in embodiments of the invention is an intelligent vehicle having a computer processing unit (CPU) in control circuitry, an auxiliary battery for power, and wireless communications circuitry enabling communication between a trolley and a transport control system similar to what is described above for drones and ground chassis' that enable the pods to be autonomously flown to destinations or driven to destinations on the ground. In this example, the rail transport system along with the drone transport system and the ground transport system are adapted to facilitate multiple differing modes of transport in specific areas of the transport topology. Trolley 2317 is a motor-driven vehicle that may comprise one or more motors. For example, each wheel of a front axle may be motorized, or each wheel of a back axle may be motorized. In one embodiment there is a motor near each wheel, and the motors may receive power from a pod battery or from an on-board auxiliary battery.

Trolley 2317 may include various sensors for detecting objects in front or behind while in transportation on a rail set. Acceleration, deceleration, and average speed over the rails may be calculated for each pod/trolley combination 2316 by a local transport control system that may monitor an entire segment or a local area of a transport architecture for traffic, and for any problems, such as a compromised section of rail for example. In one embodiment, a small computer within trolley 2317 may also be GPS enabled, and that trolley may be tracked through GPS as to position in the transport environment, direction of travel, and so on.

Pod/trolley combinations 2316 may travel to a charging station for pod and/or trolley charging. Power for charging trolleys and pods may be generated in some instances using solar panels, windmills, or other sources of generated power that are typically off the electrical grid. Grid-delivered power may be the main source of power for pod and trolley charging, whereby off-grid generated power may augment and lower utility costs. There may be no need to generate alternating current (AC) voltages. The inventor deems that high voltage direct current (DC) is more efficient in that DC to DC converters can be used to derive the DC voltage for the motors.

Trolleys are enabled to navigate the system without a pod attached, and so they may require charging. In one embodiment charging bays may be provided at some support structures 2314 or the trolley might be driven into a charging station on the ground such as a charging station centrally located in an area of transport architecture. In a preferred implementation however, a battery from the pod or the trolley provides power.

Trolley 2317 may include tongue latches at the leading and trailing ends as described further above relative to smart chassis 1900 of FIG. 19A. In this way a trolley may latch to another trolley and so on to form a train. Moreover, any trolley on the rail set that becomes inactivated due to a dead battery or other failure may be retrieved by another working trolley whether or not that trolley is attached to pod. In one embodiment, a trolley may be specialized as a track-monitoring trolley that does not carry a pod, but rather sensors and video equipment to run the rails and detect any problems or anomalies with the rails themselves, or debris that may have fallen on the rails.

There may be rails sets designed to park trolleys that are not in service, or that are being rotated in and out of service. Such a rail set may be a side rail set that intersects a main rail set at a first point and then later at a second point where trolleys may turn off the main rail set to be serviced and charged whether attached to a pod or not.

Figure 24:
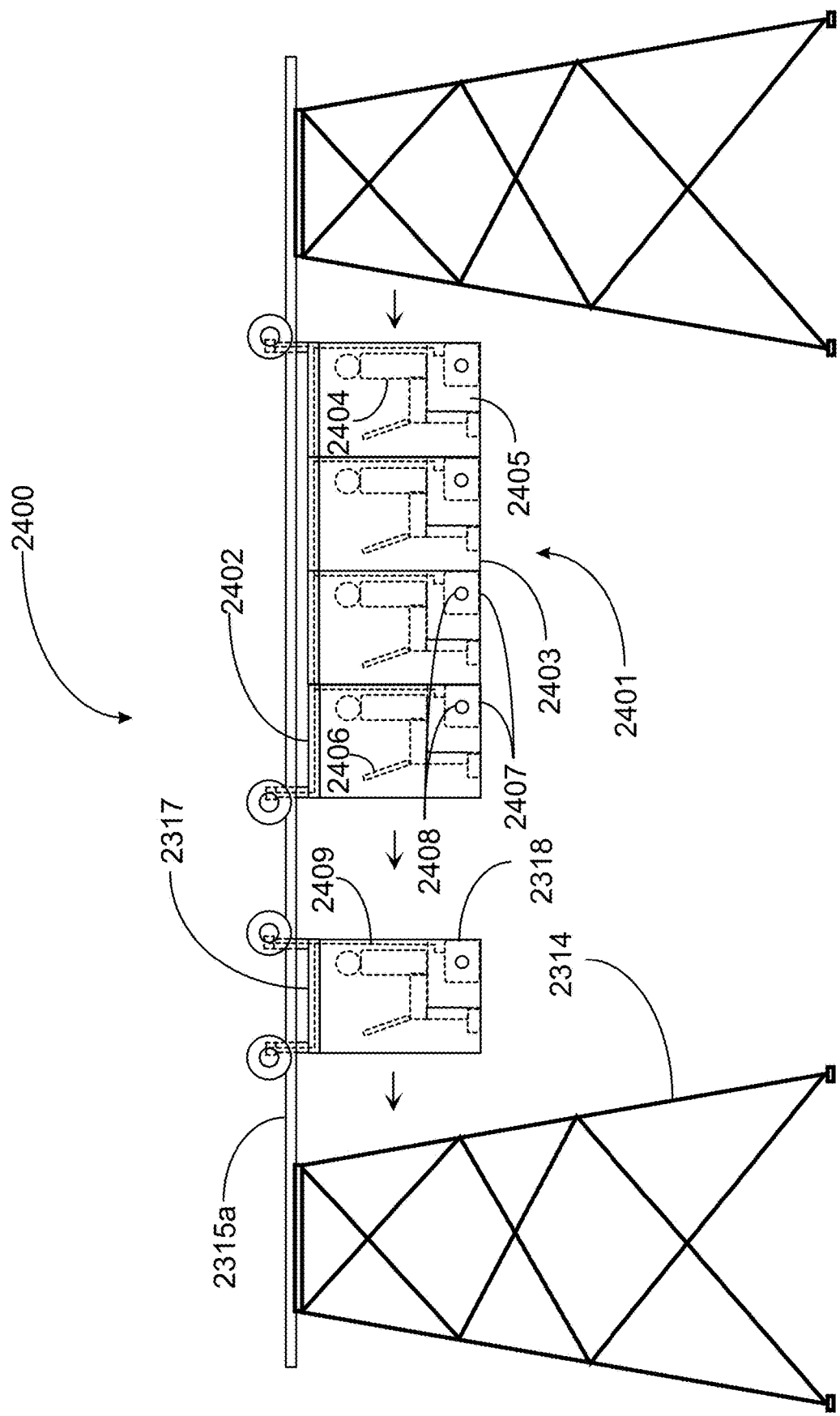
FIG. 24 is an elevation view of a single pod trolley and a multiple pod trolley traveling on a rail set between two support structures.

FIG. 24 is an elevation view 2400 of a single-pod trolley and a multiple-pod trolley, with pods attached, traveling on a rail set between two support structures. FIG. 24 includes two support structures 2314 supporting straight-rail set 2315a. Structures 2314 contain throughways to allow trolley 2317, with attached pod 2318, through the structure in the direction of the arrows. Pod 2318 includes a pod battery (under seat) and charge port as well as a passenger and computing interface. Of importance to the invention is that an electrical power and control line connection may be accomplished simply through the latching of a pod to a trolley in much the same fashion as is described above with respect to drone attachment and smart chassis attachment.

A power/control line 2409 extends from the pod battery to and through one or more points of attachment of pod 2318 to trolley 2317, wherein automated attachment of the components completes a circuit so that the battery may power the trolley motor(s). A battery of a trolley attached to a pod may be charged in addition to the pod battery through a charging port of the pod in one implementation. In another implementation a charge port may also be provided on the trolley. The equivalent of power/control lines 2409 are also depicted within pod shuttle 2401 and long trolley 2402. In the case of a shuttle, each of the pod compartment batteries might be tapped for driving trolley 2402. Moreover, trolley batteries may be charged simply through connection to one or more pod batteries. Therefore, if a trolley is carrying a pod, the trolley is fully charged if the pod has been charged. When a trolley drops of the pod or pod shuttle the trolley may have a full charge to drive to a next destination if required.

Trolley/pod combination 2401 is depicted in this example and comprises a long trolley 2402 and a pod shuttle 2403. Pod shuttle 2403 is four pods long in this example but may include fewer or more pods than are illustrated here without departing from the spirit and scope of the invention. In this case pod shuttle 2403 may be a single structure having four pod compartments with doors seats batteries, windows, and other amenities, or the trolley may be enabled to attach and carry four individual pods. A passenger 2404 and computer interface 2406 will be present in each compartment, if the pods are separate, but there may be just one computer interface in a pod shuttle.

Trolley 2402 may share the same design and functionality described relative to the short trolley but is extended in length to accommodate the shuttle pod, or multiple pods, and latches to the roof of the shuttle pod in the same way as the single pod is latched. In another embodiment single or short trolleys may be latched together as previously described to form longer trains of trolley/pod combinations while traveling over the rails as was described further above relative to chassis train 1900 of FIGS. 19A and 19B.

Trolley wheels are fabricated and shaped to ride over and follow rails, and are swivel attached to the trolley axles, so they may have independent turn ability at an angle sufficient to allow the trolley to navigate curved rails. A longer trolley such as trolley 2402 will navigate curves in the same fashion as trolley 2317 but the shuttle pod will extend into a curve a certain amount until the last wheeled axle has passed the curve. The extent that the body is carried into the curve depends on the sharpness of the curve.

Support structures 2314 may vary in height and in practice may be gradually reduced or increased in height along a route to produce a grade such as up from near ground, perhaps in an exchange station to a level travel height and then back down to near ground at a next facility along the route. Rails may be lowered to a point where they may enter a single-story building on the ground, travel through the building and exit the building at another point, or to travel through tunnels. A straight rail may have a grade that lowers it to ground level and curved rails may spiral down in elevation until they reach ground level. In some cases, taller buildings might also be constructed so that passenger/parcel drop off or pick up areas, mode of transport exchange, and battery charging may be performed at the same height or level as the main transport rails.

Figure 25:
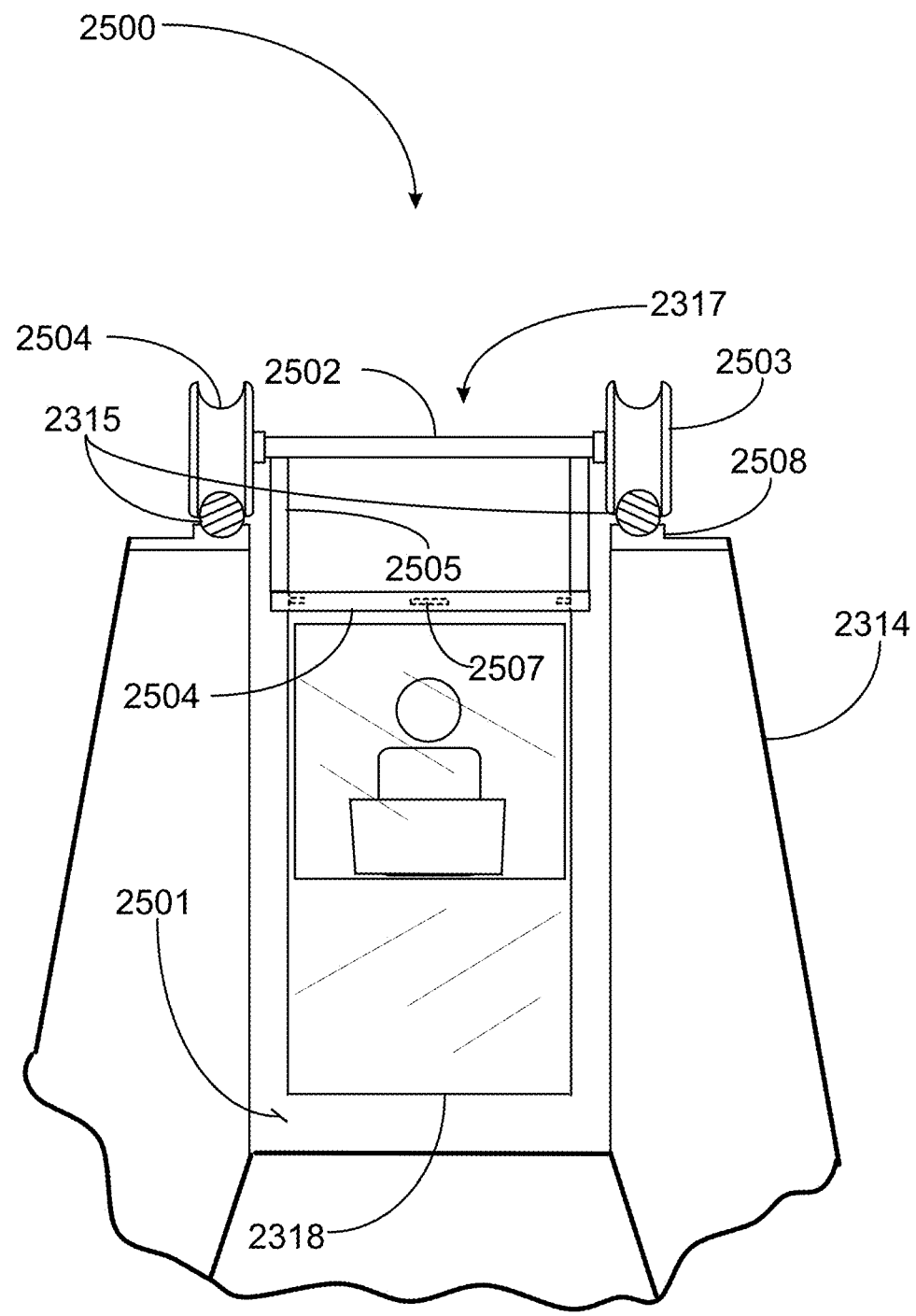
FIG. 25 is a front elevation view of a trolley carrying a pod through the open space of a support structure.

FIG. 25 is a front elevation view 2500 of a trolley carrying a pod through the open space passage of a support structure 2314. FIG. 25 depicts trolley 2317 connected to a pod 2318 on rails 2315. Trolley 2317 includes trolley wheels 2503. Trolley wheels 2503 may be fabricated of a metal such as stainless steel or of reinforced polymer or fiberglass composite. In this embodiment, rails 2315 are round rails and the intersecting wheel surfaces are radiused to snugly fit over the diameter of the rail, such that the wheel firmly positions on and follows the rail with which it is interfaced. Other geometric profiles might also be used, such as if the rails are rectangular and the wheels are formed with rectangular interface to fit just over the rectangular rails. In one embodiment, the wheels may be formed to lock on to rails.

In another alternative embodiment the wheels may be like the wheels described for smart chassis carriers described above, that is, simply conventional disk-shaped wheels, and the rails may be U-shaped, such that the wheels of the trolley fit into the u-shaped channels and follow the rails.

In this view support structure 2314 has a platform 2508 for supporting the rails. Platform 2508 may include a radial indention for securely seating the rails. Support structure 2314 includes a through-way 2501 that is wide and deep enough to allow pods to pass through beneath the rails. Trolley axles 2502 are fixed axles in a one embodiment and have vertical supports 2505 welded or otherwise fixed thereto that extend some distance below the axles to a lower carriage 2506 that includes latches 2507 for connecting pod 2318 to trolley 2317. In this example, there are four vertical support extensions that connect to a rectangular frame that comprises the lower carriage that connects to the pod. The pod and carriage are dimensionally smaller in width then the axles are long, so the components are presented within the internal space between the rails.

Figure 26:
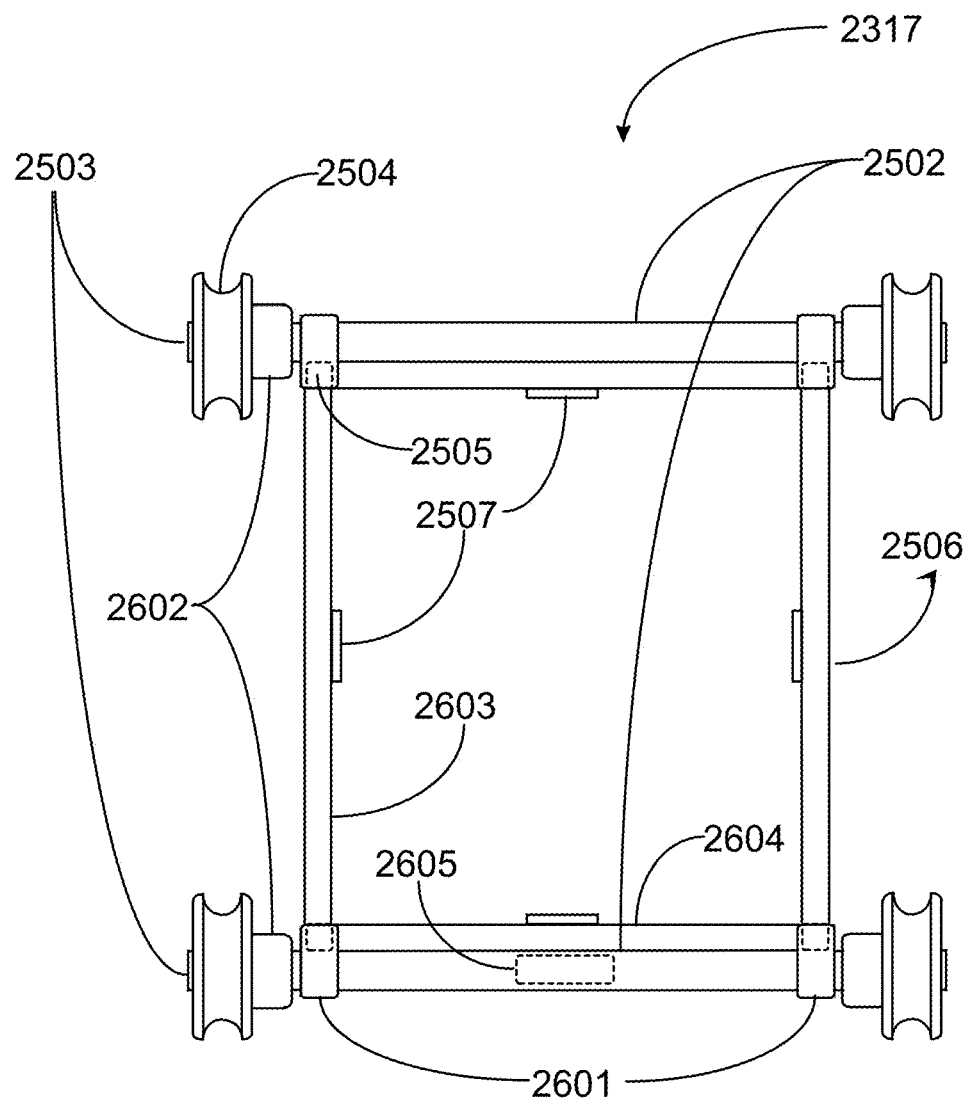
FIG. 26 is an overhead view of a pod trolley chassis according to an embodiment of the invention.

FIG. 26 is an overhead plan view of pod trolley 2317 according to an embodiment of the invention. Trolley 2317 in this example has four wheels 2503. Each wheel may be independently mounted to a respective axle 2502, such that the wheel may articulate independently from the other mounted wheels enabling the wheels to follow the rails. Trolley 2317 in this example includes rubber boots 2602 to cover and protect hardware for wheel mounting and wheel articulation. In one implementation trolley 2317 is an all-wheel drive system. All four wheels may be drive wheels powered by one or more than one electric motor. In other embodiments there may be two-wheel front drive or two-wheel rear drive or single wheel drive versions without departing from the spirit and scope of the invention.

Axles 2502 may include mounting collars 2601 welded to or otherwise fixed to the axle for the purpose of mounting to the lower carriage 2506. Lower carriage 2506 is suspended below the trolley axles in a parallel planar relationship via vertical supports 2505. In this implementation, carriage 2506 fits over a pod roof and automatically latches to the pod via latches 2507. Pod latches 2507 may also be retracted to release a pod. Latching onto a pod may be performed automatically, such as by aligning carriage 2506 over a pod and making contact sufficient for latching to occur.

In one embodiment, latching to a pod with a passenger or parcels may occur at a pickup or embarking station. There may be a designated bay inside a building where the rail set descends into the building and to the bay section where riding on the rails may pick up waiting passenger or parcel pods. In one circumstance, a floor lift might be provided to lift one or more pods up to trolleys stopped on the rails overhead. Before latching, the trolleys may make final positioning adjustments for latching position based on optical components or other visual sensors. A robotic alignment component or a human operator may also manage alignment to ensure trolleys and pods are connected securely and safely.

Lower carriage 2506 in some embodiments comprises a welded or bolted frame having frame members 2603 latching onto the sides of a pod and frame members 2604 latching to the front and rear of the pod. Other latching hardware might also be provided and incorporated, such as post-locking mechanisms, magnetic locking mechanisms, and so on. The security of a trolley pod attachment is paramount, as trolleys are elevated off the ground during main travel and inadvertent release of a pod would likely result in injury or death of a passenger or parcel destruction. Therefore, releasing a pod may be made essentially impossible until the trolley passes a certain point in the rails that indicates, via sensor and SW, that the trolley is in a drop off or disembarkation area or bay, and the pod has been connected to a smart chassis or is otherwise resting on a platform raised up to interface with the pod.

Axles 2502 may be hollow tubes that may be up to 20 cm. or so in diameter in one embodiment. Axles 2502 may be rectangular tube or other shape without departing from the spirit and scope of the invention. An axle 2502 may house components such as one or more motors, one or more batteries and one or more processing and communications components. A compartment 2605 may contain a battery, a computer processor, and a modem for communicating with a local or central control system via a wireless network. Axles 2502 may also contain one or more motors for driving wheels 2503. Wheels 2503 may be coated for gripping rails to prevent slippage. Magnetic elements might also be used to secure wheels onto the rails to reduce slippage.

Figure 27:
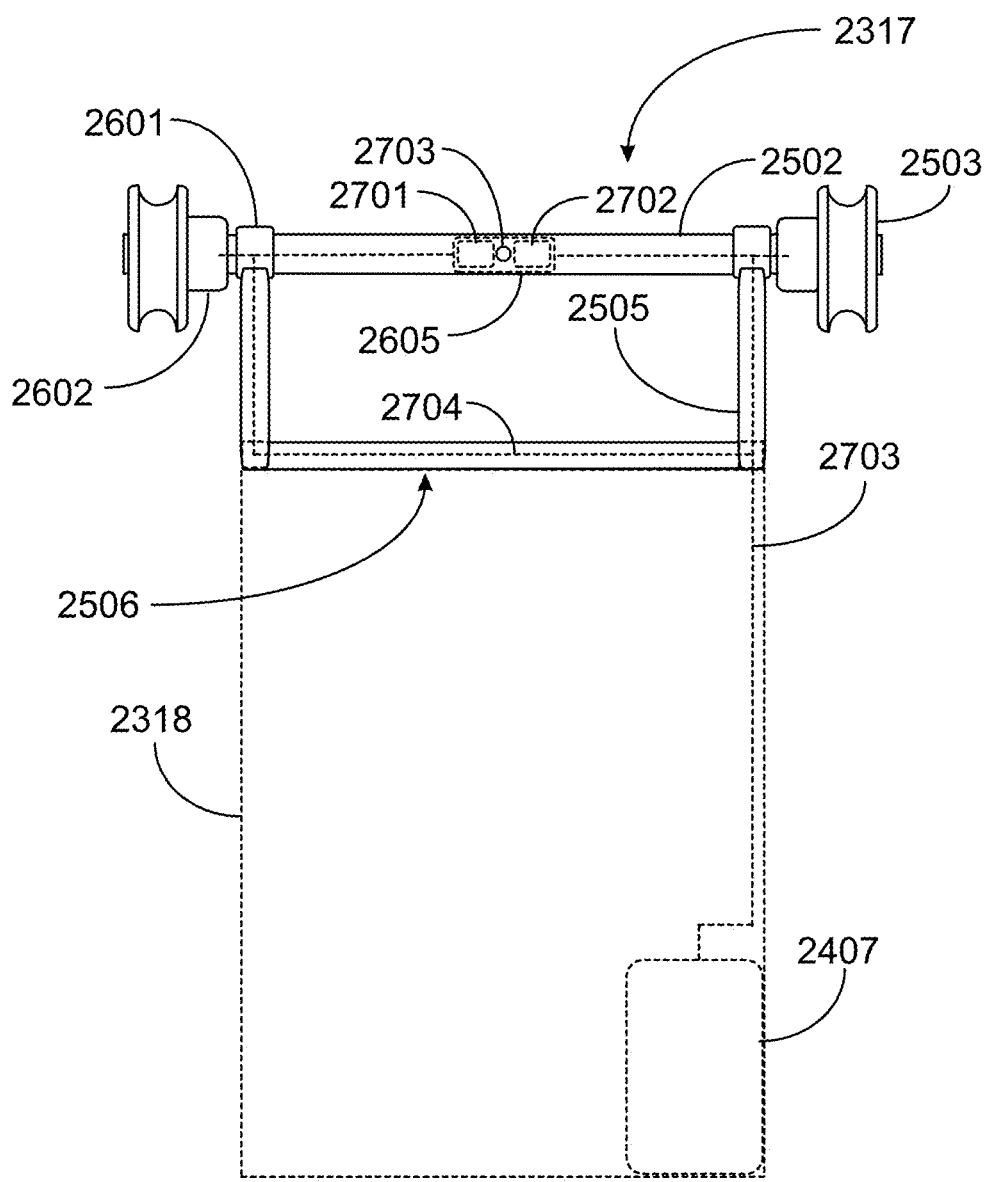
FIG. 27 is a front elevation view of the trolley of FIG. 26.

In some embodiments, sensors might be provided on axles 2502 that may extend to the sides and may be focused on the respective rails, wherein the sensors may detect mile markers, distance markers, speed limit markers, or other meaningful indicia that may be permanently or semi-permanently marked at points along the rail route. Software executing on the trolley CPU may interpret sensor readings and make adjustments such as changing speed, slowing and stopping, turning off at a specific juncture, calculating trip time remaining (for passenger notification), and so on. The same sensor might also be used to identify rail markers for charging bays and a charge position for the trolley or pod, or to identify markers for passenger disembarking and embarking areas, and markers for parcel loading and unloading areas, and finally areas for exchange of transport modes. Such autonomy may be available in certain operational areas that may not be the norm for main travel routs in between stations or destination points. More autonomy dedicated to task operation such as embark/disembark, load/unload, charging, transport exchange, allows the transport network to focus on overall traffic management load management, and so forth FIG. 27 is a front elevation view of trolley 2317 of FIG. 26. Trolley 2317 is depicted with pod 2318 referenced by a broken rectangular boundary. In this example, lower carriage 2506 may attach to the top surface of pod 2318 at four corners generally aligned to vertical supports 2505. In one implementation each wheel includes an independent motor concealed in this view by rubber boots 2602. In another implementation there may be two drive wheels, one on the front axle 2502 and one on rear axle 2502.

In this frontal view, the front axle 2502 includes battery and component compartment 2605 that contains a battery and may also house a CPU 2701 and a communications modem or circuitry 2702 adapted to communicate with a transport controller system. CPU 2701 may include software or firmware including autonomy-centered task instructions for the trolley to operate in an intelligent autonomous manner relative to specific navigation and positioning tasks and latch release operations as described further above. A charge port 2703 may be provided on the front axle to enable charging of the trolley battery independently.

Pod battery 2407 may include power bus/line 2703 up to a latch point connecting to a carriage power bus 2704 through the carriage up to the axle 2502. When a pod is connected, the trolley may derive power from the pod battery and accept a battery charge from the pod battery. When trolley 2317 is not connected to pod 2318, the trolley must rely on its own on-board battery. In one embodiment, a trolley battery may be charged through a pod battery charger, for example, switching charge connection out and through paths 2703 and 2704 to the battery in compartment 2605. Control line and switching components may be provided wherein switching is controlled by the software on the pod or trolley.

Figure 28A:
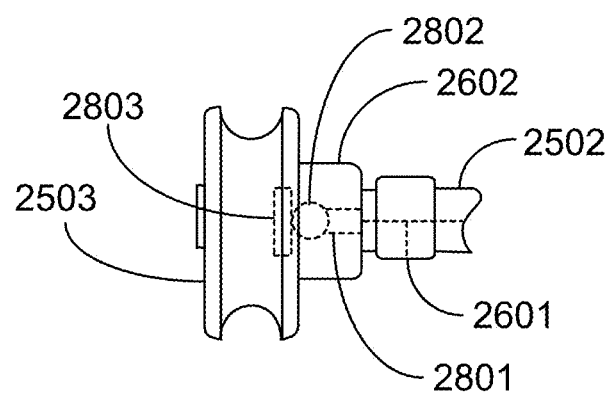
FIG. 28A is a detailed view of the trolley wheel of FIG. 27 aligned straight according to an embodiment of the invention.

FIG. 28A is a detailed overhead view of trolley wheel 2503 of FIG. 27 aligned at a right angle to the direction of the axis of the axle. Trolley wheel 2503 is the left front wheel in this example. Wheel 2503 may be mounted to a bearing plate 2803, which in turn, is mounted to a swivel joint, which in turn, may be mounted to a wheel motor 2801. Swivel joint 2802 provides a flexible connection that enables the wheel to turn when the rails turn left or right. The flexible connection may be limited in axis such as allowing horizontal flex (turning ability) but not vertical flex. The shaft that drives the wheel may be a flexible steel shaft that articulates through the swivel joint from the motor. In another embodiment the motor and wheel mount are on the wheel side of swivel joint 2802.

Figure 28B:
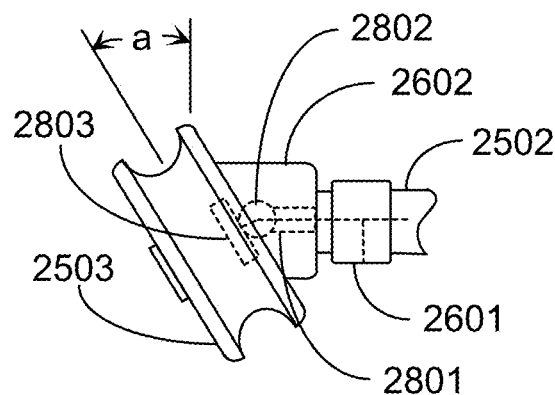
FIG. 28B is a detailed view of the trolley wheel of FIG. 27 turned to the left.

FIG. 28B is a detailed overhead view of trolley wheel 2317 of FIG. 27 turned to the left. In this view wheel 2503 is turned to the left as it would follow a left curve in a rail. Boot 2602 is flexible rubber in this example and collapses and expands with each articulation. The amount of articulation depicted here may be expressed by angle a which may represent a maximum degree of turn.

Figure 28C:
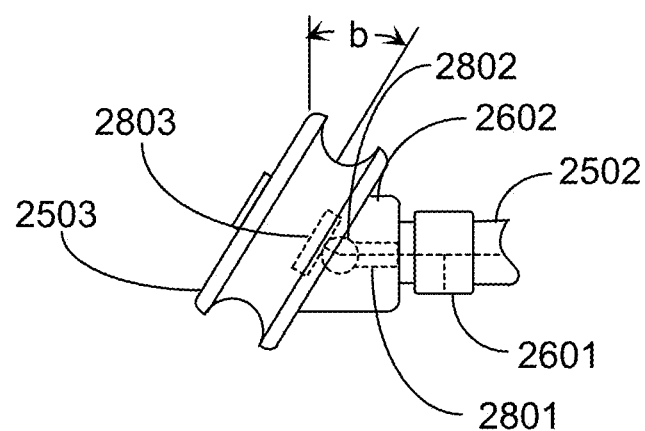
FIG. 28C is a detailed view of the trolley wheel of FIG. 27 turned to the right.

FIG. 28C is a detailed overhead view of trolley wheel 2317 of FIG. 27 turned to the right. In this view the maximum right turn angle is expressed as angle b. In one embodiment, the maximum turn angles about 30 to 40 degrees. Curves, off ramps, loops, etc. in the rails may be held to a standard radius so that maximum turn angle is not actually reached in practice. In main travel mode, the transport controller system may manage speed for a trolley and control wheel motors. In autonomous mode, the local SW on the trolley CPU may take local control of motor speed. A wheel motor may have different speeds and may be slowed to a stop and accelerated from a stop. In one embodiment a trolley may be enabled to park using one or more parking brakes and to drive in reverse.

Figure 29:
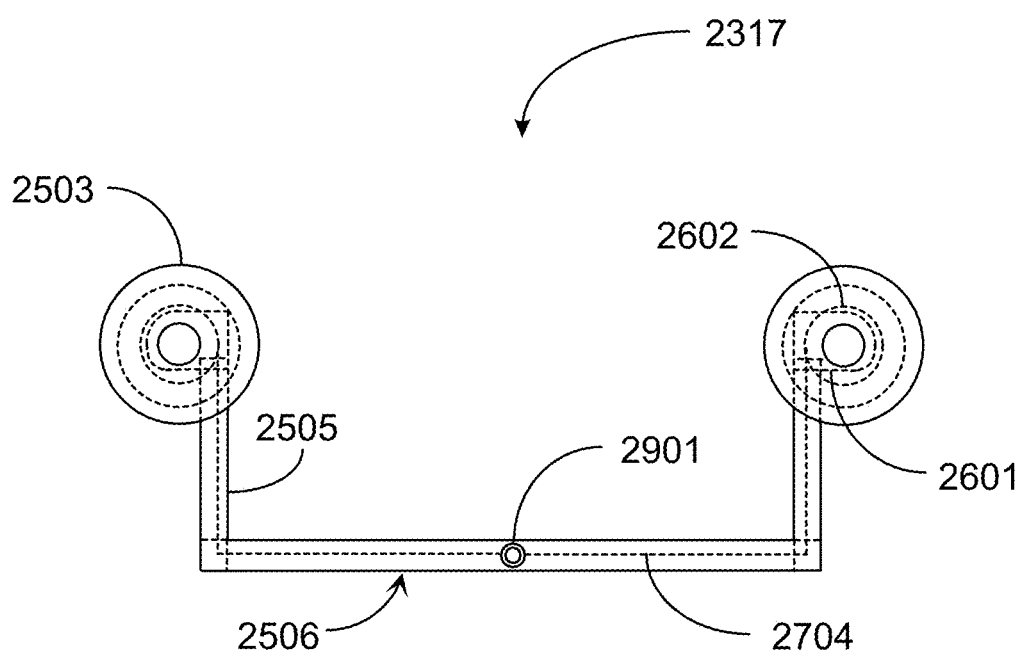
FIG. 29 is a side elevation view of the trolley of FIG. 26.

FIG. 29 is a side elevation view of trolley 2317 of FIG. 26. Trolley 2317 is depicted in this side view exhibiting lower carriage 2506 depended down from the axle collars 2601 via vertical supports 2505, one at each corner of frame. Boots 2602 are flexible rubber boots used to protect internal articulating components connecting the wheels 2503 to the axles. In one embodiment, the boots are stable and are connected to a fixed axle and a fixed plate supporting the wheel bearing plate providing rotability to the wheels. In another embodiment, boots 2602 may be connected to a rotary component such as the wheel and a drive shaft. In either embodiment, the boot flexes with the articulation of the wheel when the wheel turns left or right.

Carriage 2506 is rectangular in this example, however other geometric profiles for the carriage might be provided without departing from the spirit and scope of the invention. For example, carriage 2506 might be a triangle, an ellipse, a diamond, or another geometric shape. A charge port 2901 may be provided in carriage 2506 and connected to line or bus 2704 as a primary or optional secondary charge port for charging the trolley battery contained within the axle component. A trolley such as trolley 2317 may be charged by connecting to a charged pod. Also, the trolley battery might be a secondary target for charging through the pod charging port.

In an alternative embodiment, vertical supports 2505 that allow the carriage to have a latching interface below the level of the rails are not implemented, and the trolley frame is much the same as the intelligent chassis, described above, that navigates on surface streets and roadways. In this implementation the wheels are like the smart chassis wheels, and ride in u-shaped rails. In one implementation the trolley that rides on the elevated rails and the smart chassis that carries pods, latching to a lowermost interface of a pod, may be the same apparatus, the difference being that the apparatus that does double duty has a latching interface both above and below.

Given the descriptions of trolley 2317 referencing FIGS. 25 through 29, an important aspect not discussed above is the overall weight of a trolley. The inventor desires that trolley weight be kept to a minimum, as long as integrity is not compromised. This is accomplished by selection of strong, yet lightweight materials for the trolley, and by design to minimize size and weight of structural elements. A lighter trolley will consume less power to drive and may allow a wider spacing of support structures as well.

In addition to the need to keep the trolley weight at a minimum, consistent with strength, reliability and safety concerns, there is also a need to keep weight of the rail sets at a minimum as well. Heavier rails would require additional effort to erect and would also require larger and heavier supports. Weight may be addressed for the rails by selection of materials, and sizes, including composite materials.

In some circumstances a trolley may require charging when it is not connected to a pod. Port 2901 enables charging of the trolley from one side of the trolley similar to location of the charge port on the pod. Therefore, similar charging equipment used for pod charging may also be used for trolley charging. There may be separate dedicated charging bays for pods, smart ground chassis, drones, and trolleys. There may also be a charging station or stations that might accommodate the drone transport, ground transport, and rail transport systems.

Figure 30:
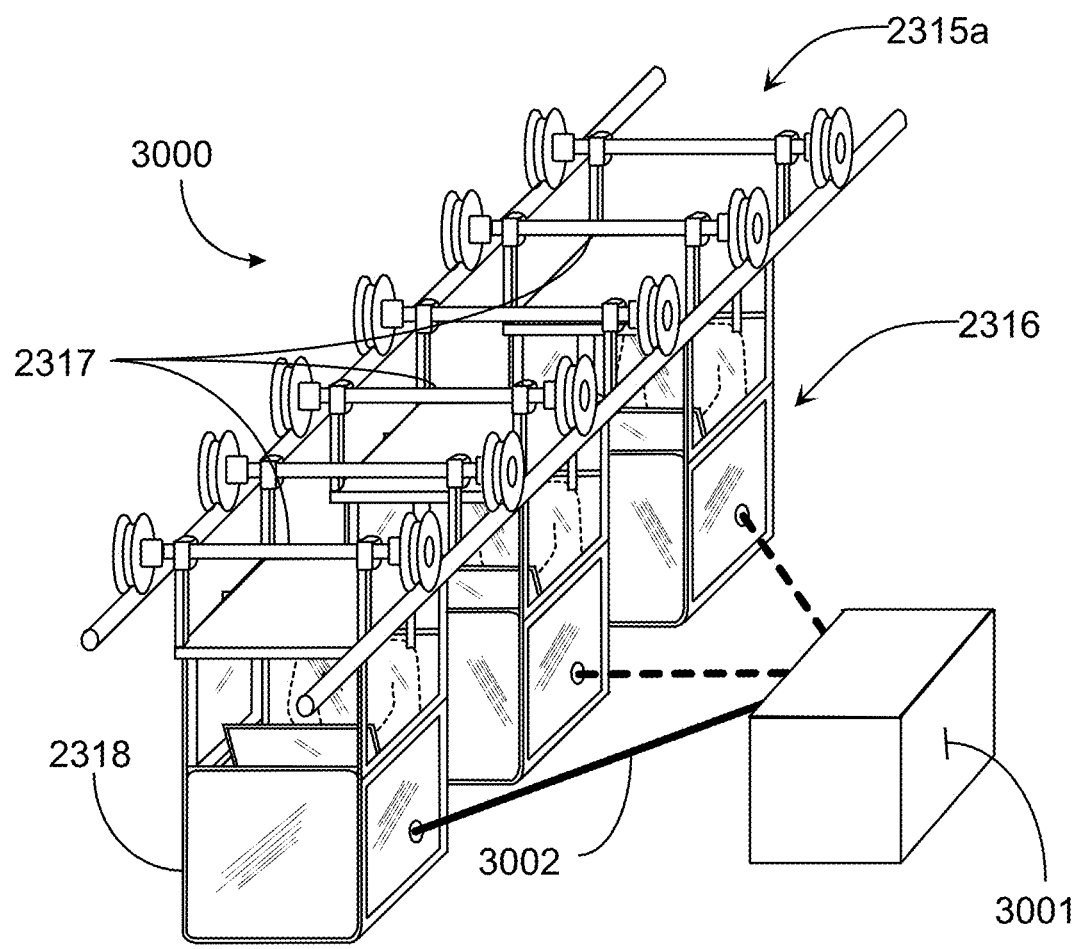
FIG. 30 is a perspective view of trolleys parked at a charging station for pod charging according to an embodiment of the invention.

FIG. 30 is a perspective view of trolley/pod units passing a charging station for pod charging according to an embodiment of the invention. In one embodiment of the invention a trolley derives power from a pod battery through the connected pod 2318 architecture and trolley latching hardware. In one embodiment, trolleys 2317 also have batteries that may be charged when connecting to a charged pod. In such an implementation, the trolley is brought up to a full charge every time it is connected to a pod having a fully charged battery or even one that is partially charged. This assumes that the pod battery has more capacity then the trolley battery. Trolley routes between expected pod connections may be managed by the transport controller not to exceed the power capacity of the trolley battery relative to travel distance on the rail system.

Charging unit 3001 may be analogous in description to charging unit 2201 of FIG. 20, described in enabling detail above. Rail set 2315a may be constructed to descend from a main travel height supported by tower, down along a prescribed grade into a single-story building hosting a trolley/pod charging station of charging bays. Trolleys 2317 may enter such a station on rails carrying pods 2318 near to, but just above ground level so that pod charger 3001 has access to the pod charge ports via a at least one charging cable 3002 adapted to connect to a pod charge port in an automated fashion.

Charge cable 3002 extending from charge unit 3001 may be analogous to cable 2103 of FIG. 20 in description. In this implementation the trolleys may negotiate speed reduction while entering a charging station and sensors on the trolley may detect specific rail markers for pausing or moving very slowly while a cable is connected. In a preferred embodiment charging is very quick. In one embodiment, charging unit 3001 includes at least a charge meter to determine the existing charge state of the battery before charging and the full charge state of the battery during charge.

The pods, carried by trolleys on rails may be presented to, and processed by, charging stations in much the same manner as described above for pods charged on smart carriers, described above with reference to FIGS. 20 and 21.

A metering component (not illustrated) may also identify a defective or weak battery (one that does not hold a charge). A charge capability test might be undertaken during charging attempt of a pod battery whereby if a defective battery is identified, the trolley may be instructed to another part of the building to swap out the pod. If the pod is a parcel pod the parcels will require unloading and reloading into the new pod.

Supports for rail sets have been described above as towers 2314, structured much like cell towers, but it was also described that the supports might take a number of other shapes and structure. In one such alternative the support for the rail set may be central pole, much as was described for charging stations in U.S. Ser. No. 15/260,670, for which priority is claimed above. In an embodiment wherein the supports are poles, the rail sets may be depended from horizontal structures supported by the pole. Further, the pole may be connected to power for charging, and at different levels charging of drones, trollies, pods, and smart chassis may be implemented from the pole structures used as support for rail sets, in any and all of the various ways described in enabling detail in this specification, and in parent cases to which this specification claims priority.

Figure 31:
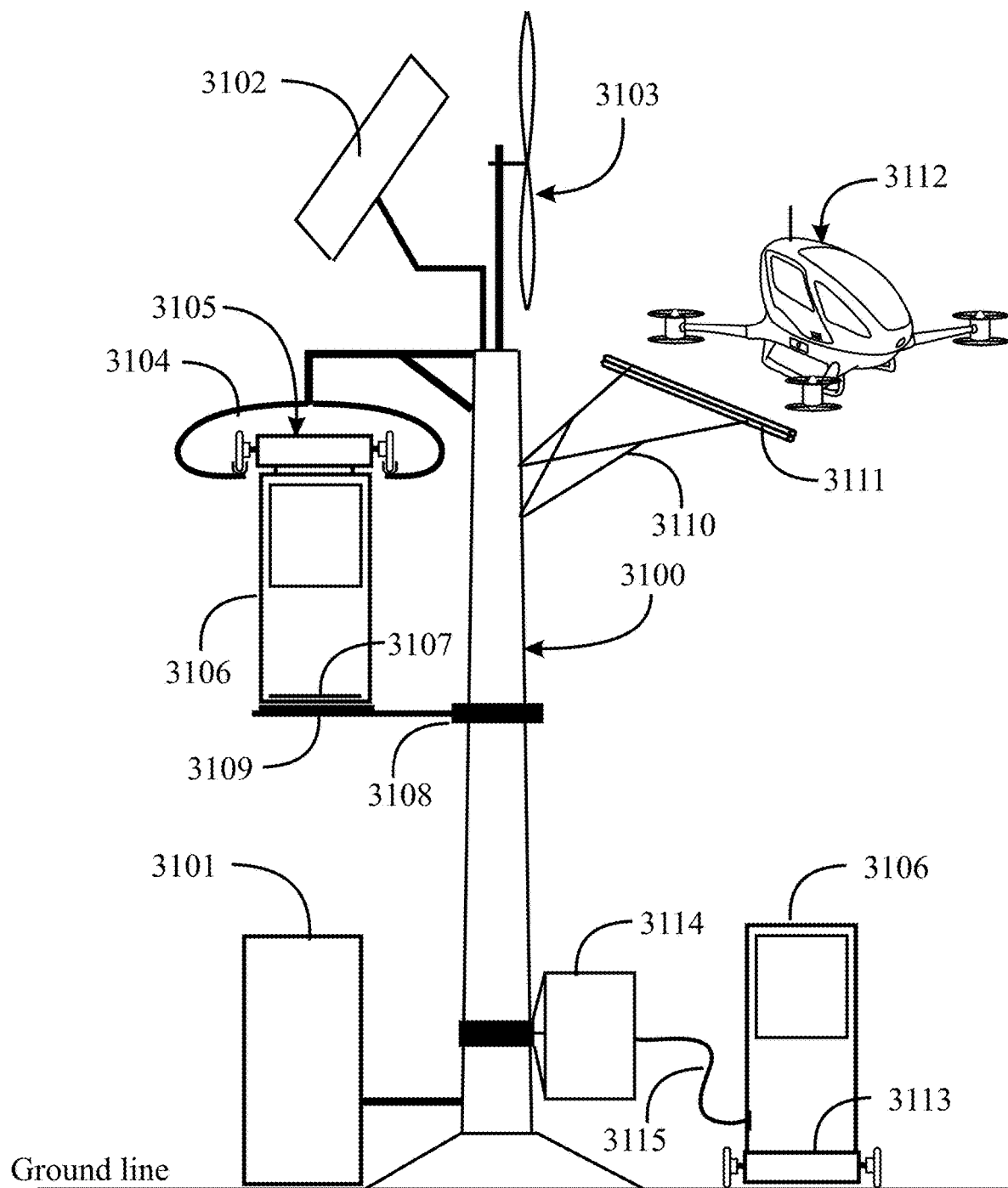
FIG. 31 illustrates a pole support for rail sets and charging of each form of transport.

FIG. 31 is an elevation view of a pole 3100 as a support for a rail system. In this example, pole 3100 supports, on a structure 3104, a set of rails upon which a trolley 3105 travels with wheels engaged in the u-shaped rails. Trolley 3105 carries a pod 3106 capable of carrying passengers or parcels. Pole 3100 also is a part of charging apparatus for charging trollies, drones, pods and ground-traveling smart chassis.

Power for various charging apparatus and systems may be from the general grid, or may have a local battery system 3101, that may be charged by solar panels 3102 and/or wind system 3103. In one circumstance a pod 3106 carried by trolley 3105 may pass over a charge pad 3109, and the pod battery may be charged by a receiver pad 3107 in the pod passing over charging pad 3109, supported by structure 3108.

In another circumstance, a drone 3112 may have batteries charged by passing in proximity of a charge rail 3111 supported on structure 3110. Control circuitry, not shown, is operable to signal and control the passage of the drone.

In yet another circumstance, a charging station 3114 is provided nearer ground level with cables 3115 for connecting to a charging port of a passing pod 3106 carried on a smart chassis 3113. In each instance described with respect to FIG. 31 details of apparatus and method may be any described above and in parent application to which priority is claimed above.

In one embodiment, a floor lift may be provided that is hydraulically operated to lift a smart ground chassis up to auto connect to a pod that is connected to a trolley. The platform may have alignment and or position-relative indicia that is detectable by sensors operating on the ground chassis. Such indicia may be a mark, a stamp, a notch or other indicia that may be detected by sensor. The indicia might also be a chipped device capable of communicating with the trolley sensor or a readable bar code. The trolley may also position itself according to indicia on the rail above the floor lift.

The floor lift may be considered a "transport exchange platform" from trolley to ground chassis or from ground chassis to trolley. SW on the trolley may detect when a ground chassis is connected and then may authorize and initiate trolley release. The platform may then lower back to ground level with the pod connected to a ground chassis that may then drive the pod out of the station to another destination. A ground chassis may detect connection to a trolley and then may authorize and initiate ground chassis release. Then the platform may lower, and the chassis may drive off to another destination.

One with skill in the art of autonomous transport methodology will appreciate that rail transport of passenger and parcel pods may be integrated with drone transport and ground transport systems where the pod is interchangeable among all of the transport modes. One with skill in the art will also appreciate that, of the available modes of travel, one mode will not conflict or interfere with another mode.

Exchange Stations

The inventor provides a unique functional exchange station that may support at least three disparate modes of transportation and provides passenger and parcel processing services including vehicle charging and internal traffic management with respect to each of the supported transportation modes.

Figure 32:
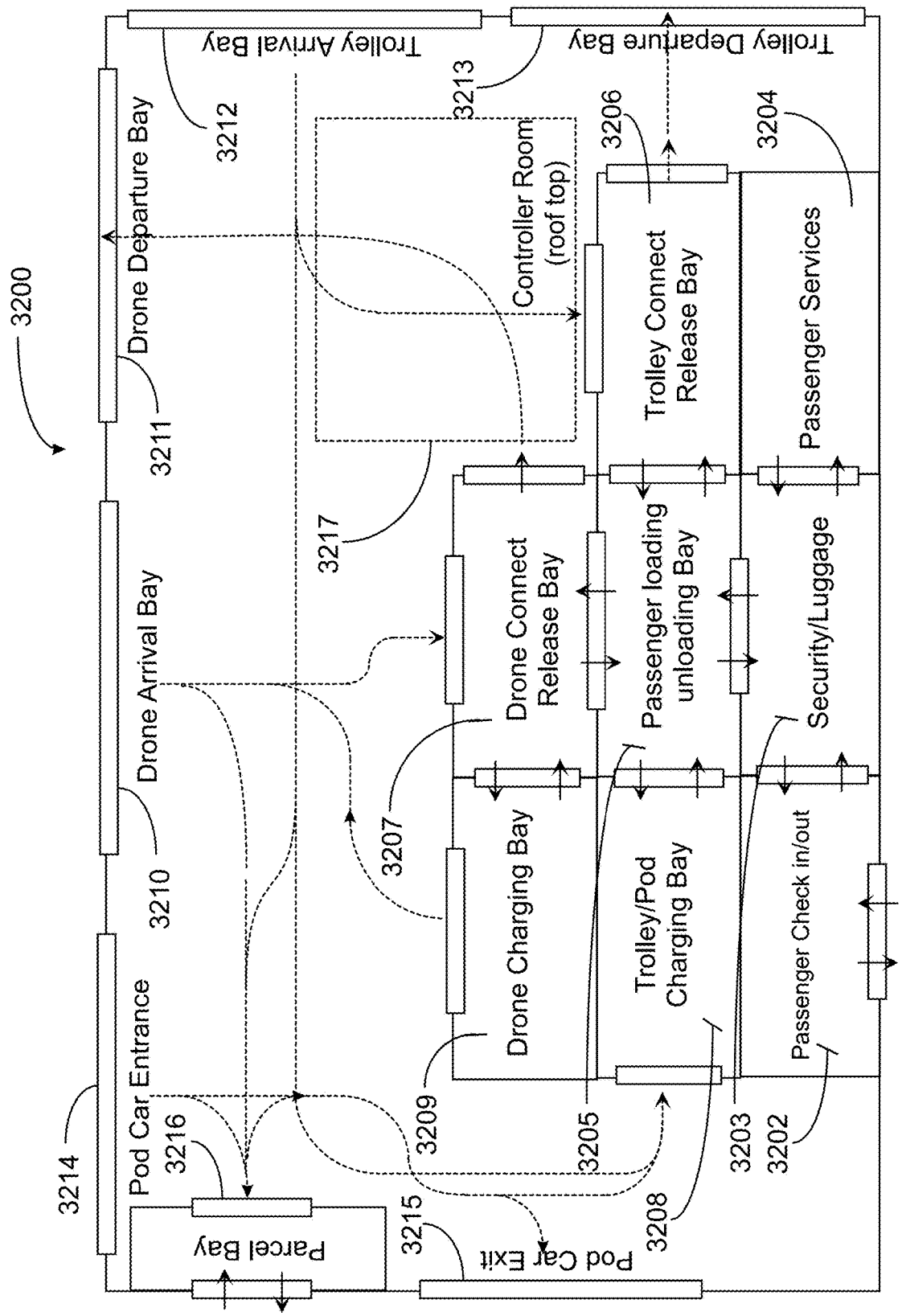
FIG. 32 is an overhead cut-away view of an exchange station supporting at least three modes of transportation according to an embodiment of the present invention.

FIG. 32 is an overhead cut-away view of an exchange station 3200 supporting at least three modes of transportation according to an embodiment of the present invention. Exchange station 3200 may be a one story physical structure and may be constructed of any suitable material. Exchange station 3200 may include multiple dedicated service bays that may take a portion of the floor space of exchange station 3200 leaving a sufficient portion of floor space for travel within the building. Exchange station 3200 may include multiple dedicated arrival bays and departure bays, each arrival or departure bay dedicated to one of the at least three modes of transport. It is noted that exchange station 3200 may be replicated and strategically distributed within a transportation network to function as stations where passengers may stop, board, disembark, exchange transport modes, and so on.

Exchange station 3200 has a passenger check in/check out lobby 3202. Lobby 3202 has an entrance way and an exit way for passengers on foot. In one embodiment, facilities are provided for passengers to purchase tickets, check luggage or parcels, and so on. In one embodiment, passenger lobby 3202 has one entrance/exit way enabling passengers to enter exchange station 3200 or to exit the exchange station on foot. Passengers may also enter exchange station 3200 using a pod car entrance 3214. Pod car entrance 3214 allows autonomously driven pods connected to wheeled smart chassis to enter the exchange station. In this description a pod carried on a smart chassis may be termed a Pod Car. Pod cars entering entrance 3214 may include passenger pods, parcel pods or pods carrying both passengers and parcels that may be entering the exchange stations for various reasons.

Exchange station 3200 includes at least one drone arrival bay 3210. Drone arrival bay 3210 may include an opening to the outside of sufficient dimensional proportions to enable a drone carrying a pod or multiple pods, for example, a four-pod drone, to arrive, rotate accordingly, and fly into the building in a non-obstructed and safe manner. The opening in drone arrival bay 3210 may be constrained to the upper portion of the building or above perhaps 6 meters in a 12-meter-high building. Exchange station 3200 also includes a drone departure bay 3211, which may include an opening to the outside of sufficient dimensional proportions to enable a drone carrying a pod or multiple pods, for example, a four-pod drone to fly out of the building in a non-obstructed and safe manner.

Exchange station 3200 includes a transportation controller room 3217 provided on the rooftop of exchange station 3200 but could be elsewhere. Controller room 3200 is responsible for monitoring and managing local traffic for the at least three modes of transportation supported by the exchange station. Controller room 3217 may be a manned control room with access to control of outside traffic within a wireless perimeter of reach of the exchange station, and of indoor traffic and exchange services occurring within exchange station 3200 and may in one embodiment have large windows or glass walls to enable controllers to see traffic readily. Exchange station 3200 may be one of multiple such stations in a larger region covered by a transportation network.

Exchange station bays may be strategically designed and constructed with entrance and exit ways to adjacent service bays, thereby supporting a logical train of processing for both passengers and parcel transportation. In this embodiment, passenger check in/check out bay 3200 is adjacent to a security/luggage bay 3203. Passengers may enter security luggage bay 3203 to be cleared for travel if departing the exchange station using one of the supported transportation modes.

Passengers may enter security/luggage bay 3203 from a passenger loading unloading bay 3205 if exchange station 3205 is their final destination. In one embodiment a passenger may claim luggage that may have been transported in a parcel pod and has arrived preferably ahead of or at the time of arrival of the passenger. Passengers entering the exchange station on foot and cleared for security in security/luggage bay 3203 may proceed into passenger loading/unloading bay 3205 to board a pod for departing under one of the modes of transport. In this embodiment, a passenger services bay 3204 is provided adjacent to security luggage bay 3203. Passengers on foot in security/luggage bay 3203 may enter a passenger services bay 3204, more fully described below, and return to board or exit exchange station 3200.

A passenger entering loading/unloading bay 3205 may board a pod of a fully-charged pod car which may then navigate to an adjacent connect/release bay for drones or trolleys. If the passenger or parcel pod is departing by drone, then the pod car carrying the passenger may enter a drone connect/release bay 3207 for connecting securely to a fully charged drone and releasing the smart chassis. The drone may depart drone connect/release bay through a dedicated fly way into the larger airspace of the exchange station and through the drone departure bay 3211.

A passenger may board a pod in passenger loading/ unloading bay 3205 and proceed into an adjacent trolley connect/release bay 3206. Trolley connect/release bay 3206 may include supported trolley rails that may extend into exchange station 3200 through passenger loading/unloading bay 3205 and through trolley/pod charging bay 3208 and back around through the exchange station open space to a trolley arrival bay 3212. Mechanical apparatus may be provided within trolley connect/release bay 3206 to engage a passenger or parcel pod onto a trolley supported on trolley rails for departure out of trolley connect/release bay 3206 and out of exchange station 3200 through a trolley departure bay 3213. More detail about trolley connect/disconnect apparatus is provided later in this specification.

Exchange station 3200 includes a parcel bay 3216. Parcel bay 3216 is an arrival/departure bay for pods carrying parcels. Incoming parcels may be loaded onto waiting pod cars. Fully loaded pod cars may then drive out of pad car exit bay 3215, or into either drone connect/release bay 3207 or trolley connect/release bay 3206 for departure. Parcel pods brought into exchange station via drone or trolley may be released in the appropriate bays and may then proceed on chassis to parcel bay 3216 for unloading of parcels.

Exact paths for drones and pod cars within exchange station 3200 may vary considerably according to the exchange station tasks under designation. For example, a drone carrying a pod with a passenger may fly from arrival bay 3210 through the exchange station air space directly to drone connect/release bay 3207. A bare drone (not carrying a pod) may arrive and fly from arrival bay 3210 directly to drone charging bay 3209 for battery charge, and then proceed into drone connect/release bay to pick up a parcel pod or passenger pod and depart the exchange station through drone departure bay 3211.

In this embodiment, it is assumed that all pods not connected to a drone or to a trolley within exchange station 3200 are carried by a smart chassis. The only exception might be when an empty pod is being serviced or stored. When a smart chassis is released during pod connection to a drone in drone connect/release bay 3207 or to a trolley in trolley connect/release bay 3206, the chassis may navigate to a position to accept a different pod being released in drone connect/release bay 3207 or in trolley connect/release bay 3206. A pod car with passenger may proceed to unload in passenger loading/unloading bay 3205 and then proceed directly to charge in trolley/pod charging bay 3208. There may be separate storage areas for smart chassis, drones and trolleys when not in use, or out of service for maintenance or repair, etc. In one embodiment, parcel pod services may be segregated from passenger services by having separate bays for drone or trolley connect/release services.

In one embodiment of the invention, exchange station 3200 may be a point where a passenger may switch modes of transportation. For example, a passenger may arrive via drone and be released onto a smart chassis in drone connect release bay 3207, wherein the smart chassis navigates to trolley connect/release bay 3206 with the passenger. In a variation of this circumstance, the passenger may unload from the pod and engage in passenger services for a period before departing by the second mode of transportation.

Exchange station 3200 may be provided as a multiple-floor building without departing from the spirit and scope of the present invention. Bays may be duplicated and repeated on different floors. Parcel and pod car elevators may also be provided to navigate vertically in a multiple-floor building. In one embodiment, pod cars and smart chassis may navigate between floors in a multiple-floor exchange station via ramps similar to multistory car garages. A single floor exchange station building may be about 12 meters high from ground to ceiling. By separating services to multiple floors of an exchange tower, the foot print on the ground may be reduced. Therefore, it is logical to assume that exchange stations in congested urban areas may be towers rather than single story buildings.

Figure 33:
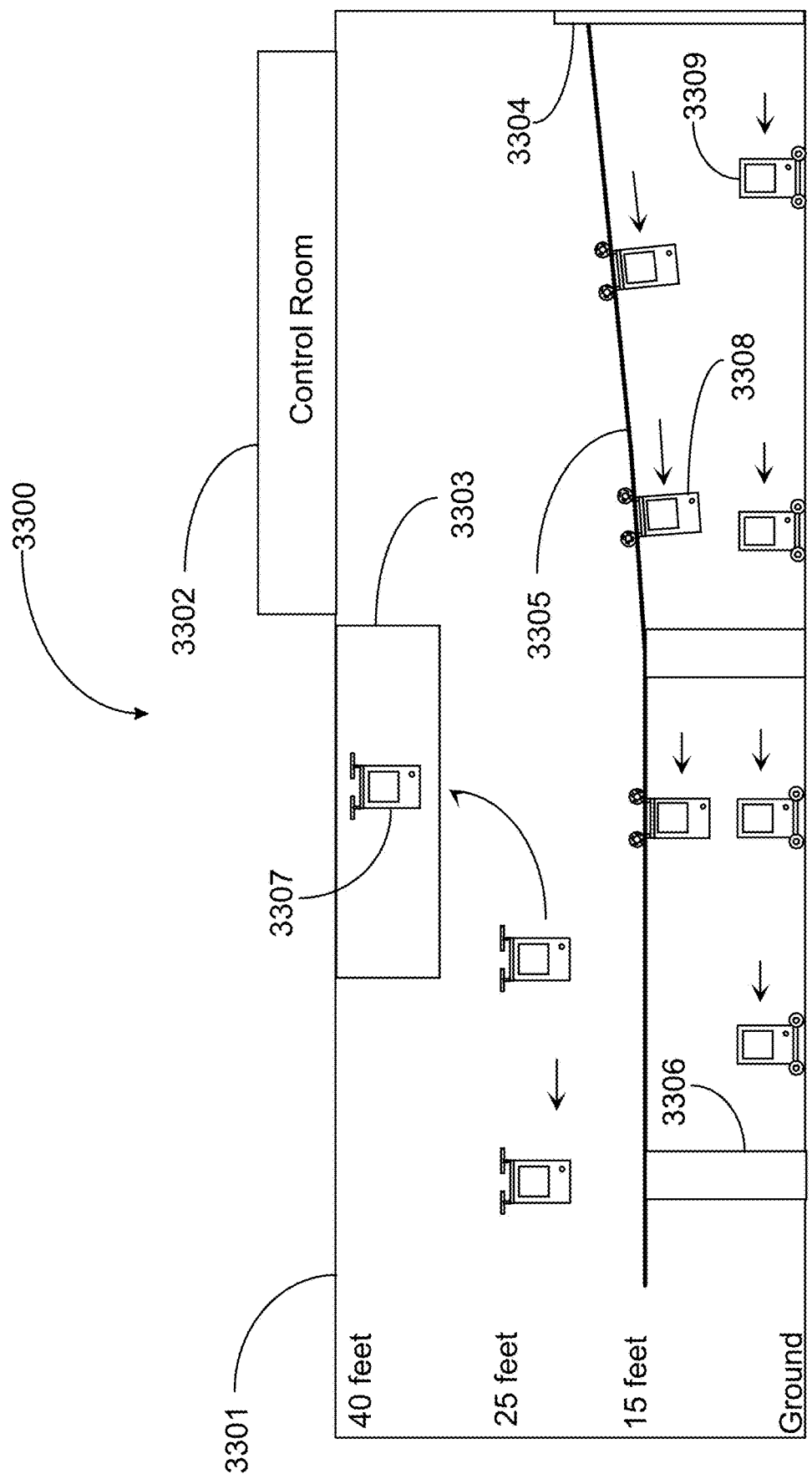
FIG. 33 is an elevation cut-away view of the exchange station of FIG. 32 depicting height constraints for the at least three modes of transportation within the building.

FIG. 33 is a diagram 3300 depicting height constraint for the at least three modes of transportation supported within exchange station 3200 of FIG. 32. Ground-to-ceiling height is approximately 12 meters represented by block 3301. Controller room block 3302 represents controller room 3217 of FIG. 32. Overall height from ground to the top of the controller room may be approximately 14 meters.

Block 3303 represents a drone arrival or departure bay analogous to bay 3210 or bay 3211. A drone-pod combination 3307 is depicted at a height of about 10 meters to enter bay 3303. This combination is termed in this specification a drone pod. Drone pod 3307 may enter through the opening into the building and may descend about 3 meters to just above 6 meters or so for regular level flight within the exchange station. A drone may only descend to charge or to pick up or drop off a pod. The height constraint on inside-building flight of a drone may ensure unfettered travel of the other modes of transport.

A trolley rail set 3305 may enter and or exit through a trolley arrival/departure bay 3304 analogous to trolley arrival bay 3212 or trolley departure bay 3213. Rail set 3305 may be constrained to a level travel height within the exchange station to about 4 meters off ground level. Rail set 3305 may be supported off ground via pillar supports 3306. Rail sets 3305 may include a ramp leading out of the building to a higher-level travel path for trolley cars 3308 outside of the exchange station. By "trolley car" is meant a trolley on rails, attached to and carrying a passenger or parcel pod. Constraining the rail set to approximately 4 meters off ground level ensures that the trolley transportation mode will not conflict with the drone mode or pod car mode.

The ground floor in this example is reserved for pod cars 3309. Each mode of transport is autonomous, and the trolley mode includes an additional constraint that limits travel to the trolley rails. Transport through exchange station 3200 of FIG. 32 may depend in part on instructions for navigation and on electronic systems that may be provided and employed within the station. For example, a trolley may recognize markings, or other indicia on the trolley rails and may align with such markings to connect to pods and to release pods, to accept charging, or to wait a period for a trolley ahead to gain some distance before departing. Drones may recognize charger pads and may observe a visible signal to maintain a hover pattern until cleared for landing on a charger pad by a different color or intensity of light.

Drones may also be equipped with collision-avoidance software enabling the drones to recognize other drones and other physical objects to be avoided. Pod cars 3309 may recognize lines in the floor, roadways, or other indicia to align with charging utilities and for connection to a drone or trolley. Exchange station 3200 passenger services may also include hotel rooms, conference rooms, restaurants, bathrooms, gift shops, and entertainment venues without departing from the spirit and scope of the present invention. Controller room 3302 may manage the intensity of the traffic arriving to and departing from an exchange station like station 3200 of FIG. 2. Issues such as low or high traffic states may be shared by a controller in an exchange station with a controller at a next exchange station and so on over a high-speed communications network.

In one embodiment passengers may load into pods while the pods are being charged in a same bay without departing from the spirit and scope of the invention. Such bays may be designed for single-pod pod cars and multiple-pod pod cars. In this embodiment charging is performed or confirmed before passenger loading, so passengers are not inconvenienced in a charging line. It may also be noted herein that a trolley may be charged on a special charge rail section maintained just outside of the exchange station building structure. Moreover, the electrical systems of each transportation component of the transportation system integrate upon connection to form a single electrical system for a pod car, a pod drone or a pod trolley.

It is possible to charge both a trolley and pod or a drone and pod, or a smart chassis and pod through a single charge port, because while charging the pod battery, the battery of the carrier is also charged. For multiple pods connected to one chassis, one trolley, or one drone, a charge line may be required for each pod port. In one embodiment a drone charging bay may be provided directly on the rooftop of the exchange station as opposed to a bay located inside the building. FIG. 32 and FIG. 33 depict exchange station 3200 as a single-story building with sufficient area and volume to provide the multiple facility bays and ample service and transportation space for the at least three main modes of transportation supported.

An exchange station may be provided in a hub location of a transport system that comprises two or more buildings, the buildings co-located on a single exchange campus. In such a circumstance, there may be separate buildings for embarking and disembarking such as a building for pod car loading and unloading (passengers/parcels), a building for trolley exchange, and a building for drone exchange. Passengers on foot may enter the pod car loading and unloading facility through check in and security and the pod cars may drive them to another adjacent building for drone or trolley connection. An exchange station facility may be powered by a mixture of an electric grid and solar and wind farm facilities without departing from the spirit and scope of the invention.

Figure 34:
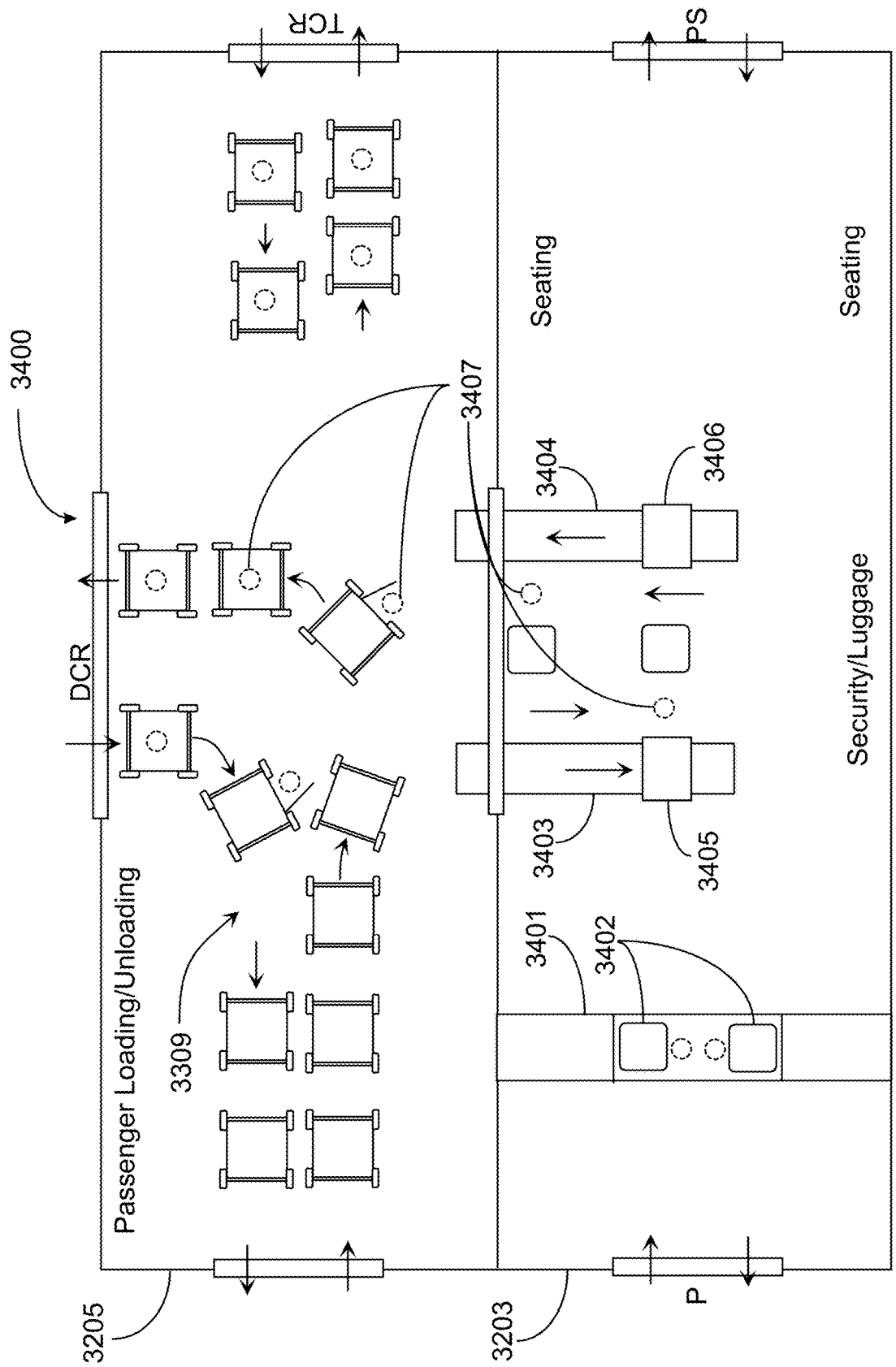
FIG. 34 is an overhead cut-away view of a security bay and passenger bay according to an embodiment of the present invention.

FIG. 34 is an overhead cut-away view of security bay 3203 and passenger bay 3205 according to an embodiment of the present invention. In one embodiment, passengers 3407 may board and disembark pod cars in passenger loading and unloading bay 3205. Pod cars 3309 (pods connected to smart chassis) are self-navigating and may drive into bay 3205 from an adjacent charging bay, like trolley/pod charging bay 3208 of FIG. 32 and may stop for a passenger waiting to board. The pod cars with passengers may then drive into an adjacent drone connect/release bay or into an adjacent trolley connect/release bay to exchange transport mode before departing the exchange station for a next destination. Likewise, pod cars with passengers may drive into bay 3205 from an adjacent connect/release bay for drone or trolley and may stop for passengers to leave the pod cars and then may self-navigate into the charging bay.

Passengers may enter security/luggage bay 3203 from a passenger check in/out bay like bay 3202 of FIG. 32. A security checkpoint 3401 may be provided with human or automated attendants 3402. Security checkpoint 3401 may verify identity, screen for metal implements including weapons, and so on. Security luggage bay 3203 may include luggage conveyors 3403 and 3404 with luggage screening machines 3405 and 3406 for screening luggage or parcels. Passengers 3407 in security/luggage bay 3203 are assumed to be on foot. All pods in passenger loading/unloading bay 3205 are assumed connected to a smart chassis until exchanging for drone or trolley connection at which time the ground chassis may be released and may self-navigate to another location, such as a charging bay or an appropriate connect/release bay.

In addition to security screening for new passengers coming into the exchange station before entering a passenger pod, which may then be joined to a bare drone or a trolley to be transported out of the exchange station and to a remote location, in some embodiments security protocol is accomplished for passengers and parcels entering the exchange station from remote locations in pods carried by any one of the forms of transport. This protocol, in one embodiment, may be implemented at points in the exchange station where passengers or parcels enter a transfer path after the pod disengages from the carrier. The passenger may at that point pass through a quick scanner while remaining in the pod, without the pod slowing or stopping.

In many embodiments this incoming security layer is not implemented, as it may be assumed that passengers and parcels entering one exchange station in a pod, likely entered that pod at another exchange station in the broader system, where entering security protocol was accomplished. An analogy is the airline security system, wherein passengers entering secure areas are carefully screened, but at the other end of a flight, passengers may exit a security area without further screening.

In this example, only single pod cars 3309 are depicted in passenger loading/unloading bay 3205. In one embodiment, pod cars may comprise multiple pods connected to one longer smart chassis, such as a four-pod chassis. This extends to four pod drones and four pod trolleys as described further above. Single pod cars and multiple pod cars may share the same facilities or may have separate dedicated facilities. In one embodiment, a passenger entering on foot into passenger loading unloading bay 3205 requires two pods, one passenger pod and one to carry luggage parcels.

In one embodiment, parcel pods with no accompanying passengers may use the same facilities or bays as passenger pods without interfering with traffic or normal operations within the exchange station. Referring back to FIG. 32, smart chassis without a mounted pod may self-navigate to parcel bay 3216 for parcel loading and unloading. A passenger or group of passengers may also commandeer a pod car or a multiple pod car and load it with items like luggage inside passenger loading and unloading bay 3205. Such requirements may be disclosed when passengers check in so that the itinerary may be uploaded and communicated to the required pod cars. Travel itineraries may be transferred automatically when a pod is exchanged between two modes of transport, such as from smart chassis to drone. Drone flight paths and routes between exchange stations may be provided by controller instruction pertinent to the passenger or shipper itineraries disclosed during check in.

Figure 35A:
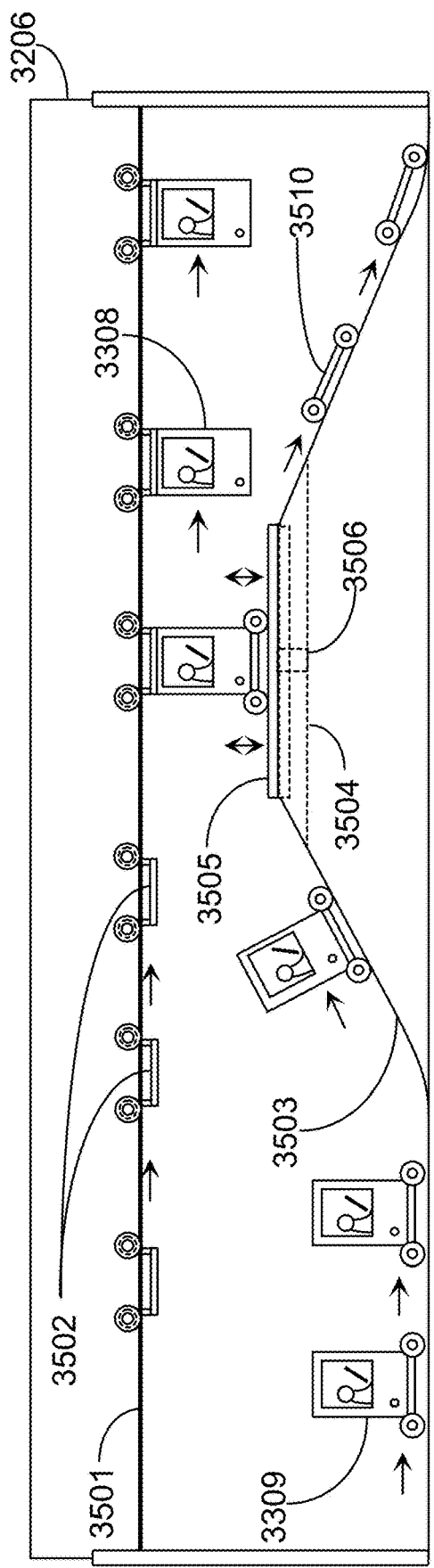
FIG. 35A is an elevation cut-away view the trolley connect-release bay of FIG. 32 depicting a trolley connect operation.

FIG. 35A is an elevation cut-away view of trolley connect-release bay 3206 of FIG. 32 illustrating a trolley connect operation. Trolley connect/release bay 3206 in this example includes a ramp 3503 and a hydraulic lift platform 3505. A set of trolley rails 3501 extends through the bay and is centered over the ramp and lift platform. Pod cars 3309 with passengers may drive up ramp 3503 and onto platform 3505.

Platform 3505 may include a line marking, or other indicia that pod cars 3309 may interpret and use to position for trolley connection. A trolley 3502 may advance on rails 3501 to a marked position just over platform 3505 to align with the chassis position. It is noted herein that a trolley 3502 may be given travel instruction and itinerary before connecting to an assigned passenger pod for travel by rail out of the exchange station. In another embodiment, the pod transfers the itinerary to the trolley after coupling.

Platform 3505 may be a hydraulic platform operated by a hydraulic cylinder 3506 mounted beneath the platform on a stable surface 3504. When recessed, platform 3505 has a top surface that is flush with the top of ramp 3503 so a pod car 3309 may drive up and on to it. Once a pod car 3309 and a trolley 3502 are in sufficient alignment for connection, the ramp may be hydraulically lifted to cause the top connector apparatus of the pod to engage with compatible apparatus on the trolley frame resulting in a pod-to-trolley coupling that includes bridging of the power and electronic systems of each device.

A pod may send a release instruction or signal to the smart chassis to cause the chassis to uncouple from the base of the pod upon successful coupling to the trolley, confirmed by the trolley. The actual height range in platform 3505 for connecting the pod to the trolley may be small such as 15 cm. or so. Trolley cars 3308 carry the passenger pods out of bay 3206 and eventually out of exchange station 3200 of FIG. 32 for travel to another destination. Smart chassis 3510 without a mounted pod may drive off platform 3505 and down ramp 3503 on the other side of the platform. The smart chassis may proceed to a point for receiving another pod from drone or trolley or may navigate to another destination if required such as one dedicated to inspection, repair, charging, or storage.

In one embodiment, platform 3505 may be sufficiently large across the top surface to accept a four-pod pod car for connection to a four-pod trolley. In this example, pod cars drive into bay 3206 from passenger loading and unloading bay 3205 immediately adjacent to trolley connect/release bay 3206. Trolley cars leaving bay 3206 are departing the exchange station and will travel by rail to another station on route. Trolleys 3502 arriving to the connection platform may include trolleys that have dropped off pods in the same bay and may loop around on rails to be immediately available for picking up pods. Trolleys may be charged when connected to a pod and therefore may not require individual charging while not connected to a pod. In one embodiment, trolleys may be charged separately or while connected to a pod by a special section of rail outside of or inside of exchange station 3200 FIG. 32.

Figure 35B:
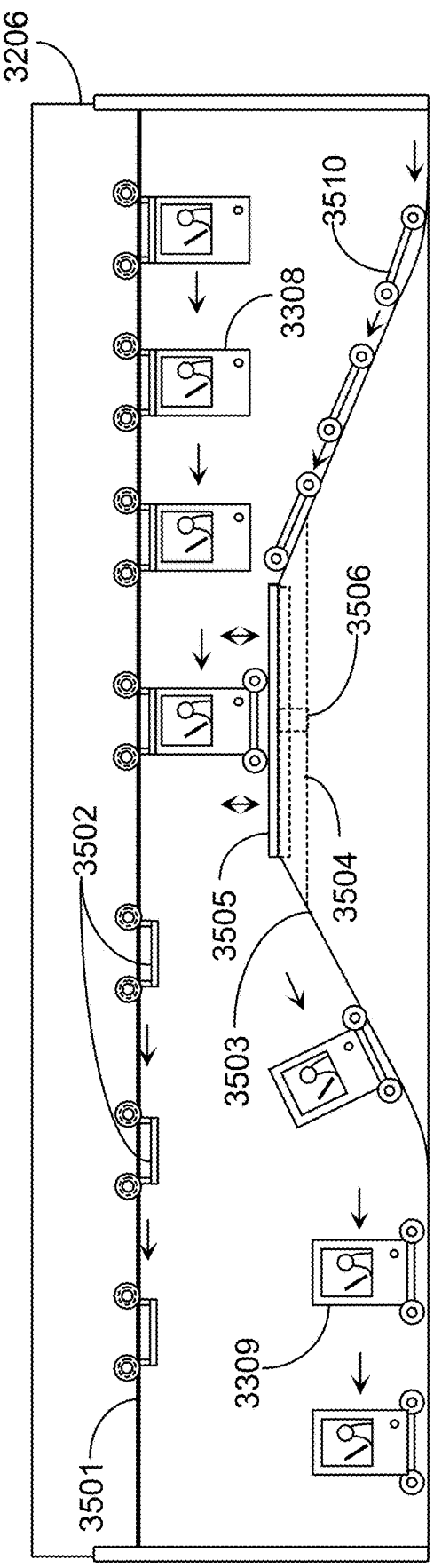
FIG. 35B is an elevation cut-away view of the trolley connect-release bay of FIG. 32 depicting a trolley release operation.

FIG. 35B is an elevation cut-away view of the trolley connect-release bay of FIG. 32 illustrating a trolley release operation. In this view, trolley cars 3308 are arriving into trolley connect/release bay 3206 on rails 3501 to drop off pods. Therefore, two sets of rails, one arriving and one departing may be provided and supported within bay 3206. A separate ramp 3503 and platform 3505 and associated equipment may be provided, such as on another side of the bay for passengers being dropped from the trolleys.

The rail set leading into trolley connect/release bay 3206 may enter the exchange station 3200 of FIG. 32 through the trolley arrival bay 3212 of FIG. 32 and through the open area of the station to the bay entrance. Rails 3501 may include a cross loop connecting parallel rail sets 3501 together, so that trolleys 3502 may loop over or around to pick up a pod after dropping off a pod. Likewise, smart chassis 3510 may self-navigate around to an arrival ramp 3503 to accept a pod after being released from a pod that was departing on rails 3501.

In another embodiment there may be only one ramp 3503 and platform 3505 and one set of rails 3501 whereby all connect-and-release operations are performed with the trolley cars moving in a same direction without departing from the spirit and scope of the present invention. Ramp 3503 may be a pyramidal structure as described with platform 3505 functioning as the top horizontal surface of the structure. Platform 3505 may take up a footprint large enough to connect a four-pod pod car to a four-pod trolley. Trolley 3502 may electronically confirm a successful coupling with a pod, and the signal may be transferred through the pod to the smart chassis 3510 prompting the chassis to release coupling to the pod, enabling the trolley to begin rail travel and the just-released smart chassis to drive off the platform and circle around to pick up a pod arriving by rail into the exchange station.

FIG. 36A is an elevation cut-away view of drone connect-release bay 3207 of FIG. 32 depicting a drone connect operation. Drone connect/release bay 3207 may be provided adjacent to passenger loading and unloading bay 3205. Bare drones 3601 may enter bay 3207 from an adjacent charging bay like drone charging bay 3209 of FIG. 32. Pod cars 3309 may enter drone connect/release bay 3207 from passenger loading/unloading bay 3205. Bare drones 3601, without a pod are self-navigating and may hover generally above entering pod cars at a height that does not interfere with pod car movement (generally 4 meters or so off ground level).

Drone connect/release bay 3207 includes a designated coupling pad or footprint 3602. Footprint 3602 may be a marked area where pod cars 3309 drive to be coupled with a drone for travel out of the exchange station to another destination. Footprint 3602 may be considered a connect/release zone within bay 3207. A bare drone 3601 may have an optical coupling system installed that may enable a drone to couple to a pod car regardless of pod car orientation within the bay. However, an orderly pick up and departure routine may be practiced maintaining a relatively non-congested air space for drone pods 3307 to exit bay 3207 and eventually fly out of a drone departure bay such as bay 3211 of exchange station 3200 of FIG. 2. Bare drones 3601 may be notified and assigned to a pod car 3309 before drone coupling and chassis release operations. An optical system on each drone enables the drones to follow assigned pod cars.

As soon as a pod car 3309 enters zone 3602 and stops, a following bare drone 3601 may descend over the pod car and couple to the pod car. As soon as coupling is successful, the electrical systems of the drone and pod are bridged. Bare drone 3601 may report a successful coupling through the pod to the coupled smart chassis 3510, causing the smart chassis to release coupling from the pod. Drone pods 3307 may fly out of bay 3207, through the local airspace of exchange station 3200, and out through drone departure bay 3211 of FIG. 32. Smart chassis 3510 may drive off connect/release zone 3602 immediately after release from a pod coupled to a drone and may circle around within the bay to another point within the bay to accept a pod arriving by drone.

FIG. 36B is an elevation cut-away view of drone connect-release bay 3207 of FIG. 32 depicting a drone release operation. Drones carrying pods 3307 may fly into exchange station 3200 of FIG. 32 through drone arrival bay 3210 and may enter bay 3207 at a minimum height of about 3 to 4 meters. In one embodiment, the bay ceiling is approximately 12 to 14 meters high. In another embodiment, the ceiling of drone connect/release bay 3207 has an opening provided therethrough of sufficient dimensioning to enable drone cars to descend and depart through the opening.

In this view drone pods 3307 arriving from a remote destination enter bay 3207 to release pods onto smart ground chassis 3510. This may be accomplished on a designated footprint like zone 3602. Connect release zone 3602 may be two separate zones or the same zone. Smart chassis 3510 may drive onto connect release zone 3602 and may align to positional indicia in one embodiment. Drone pods 3307 may be individually signaled to descend onto zone 3602 in the direction of the arrows and couple to smart chassis 3510 creating pod cars 3309. Smart chassis 3510 may provide reporting of a successful coupling. Such reporting may be transferred through the pod into the drone, prompting the drone to execute a release command to decouple the drone from the pod. It may be noted herein that drones releasing pods may ascend back to minimum height and fly into an adjacent drone charging bay like bay 3209. Once charged, they may return to pick up pods for departure.

In one embodiment, drones may rely on pod batteries for maintaining a full charge of the drone battery. Therefore, if a pod is fully charged, the drone carrying it is also fully charged once the drone decouples from the pod, and the drone may hover for some period before it must either charge or couple to another charged pod. A larger drone such as a four-pod drone may rely on all four pod batteries for its power. In this embodiment every pod has an electrical bridge to the drone electrical system. A power distribution routine may enable the drone to derive power equally from each of the pods it is carrying, so that no pod batteries are depleted completely while in flight.

In one embodiment, a signaling system using light emitting diodes (LEDs), a signal flashing language, or other optical signaling might be provided to regulate the frequency of arrival and departure into drone connect/release bay 3207 and for descending and coupling to a pod and lifting off. Such a system may help to alleviate congested air space. In one embodiment, a space may be provided for arriving drones to park and power down while waiting for earlier arrivals to decouple from the pods. Pod cars 3309 resulting from drone decoupling onto smart chassis may travel out of drone connect/release bay 3207 into the adjacent passenger loading/unloading bay 3205 of FIG. 32.

Figure 37:
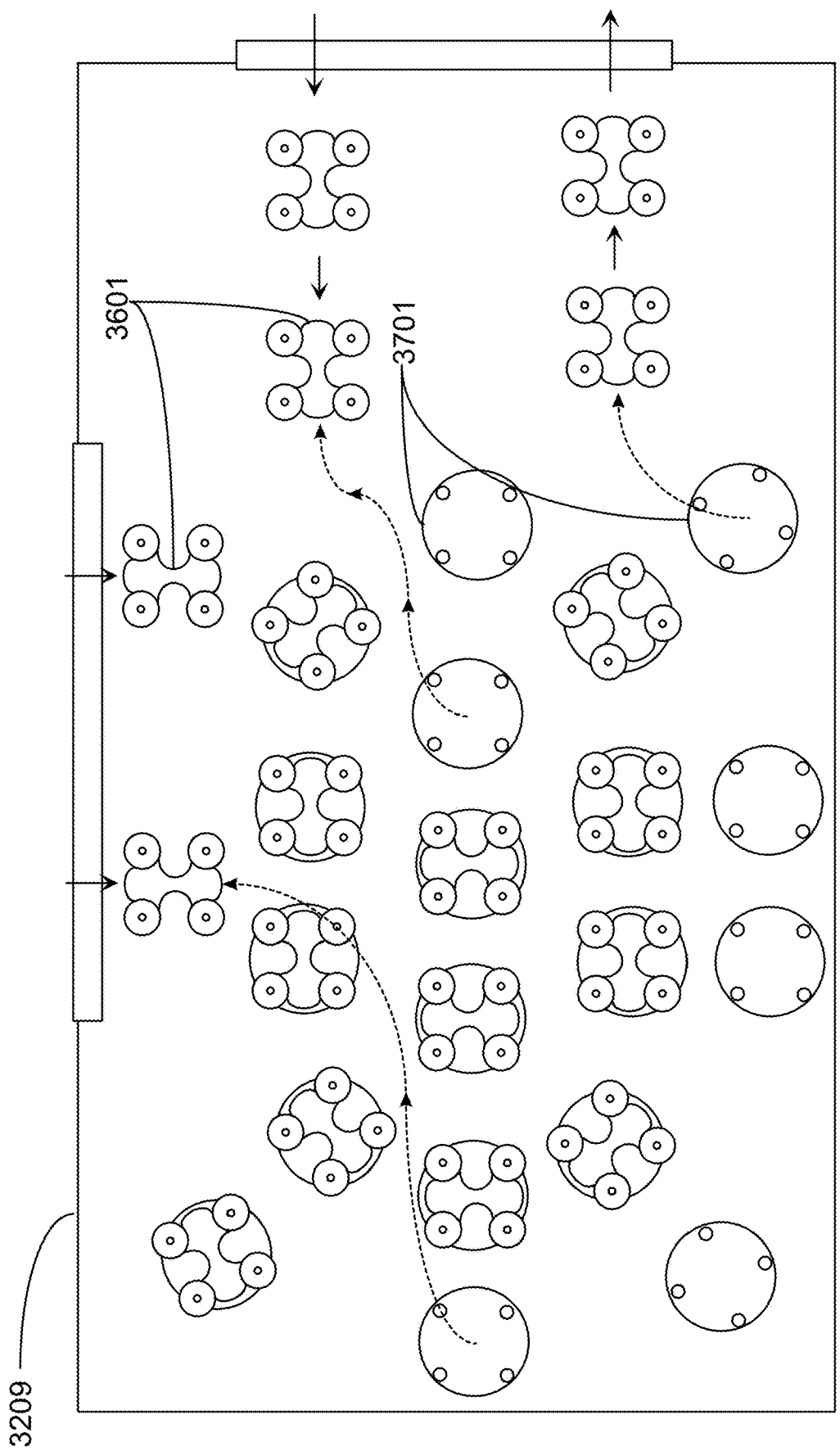
FIG. 37 is an overhead cut-away view of the drone charger bay of FIG. 32.

FIG. 37 is an exemplary overhead cut-away view of drone charger bay 3209 of FIG. 32. Drone charging bay 3209 may contain a plurality of drone charging platforms 3701 distributed perhaps evenly over the floor space of the bay. Each charging platform includes charge posts that may fit into charge ports underneath each drone propeller and motor. In one embodiment, bare drones 3601 that are not pod coupled may fly into charging bay 3209 and may observe optical signaling that may control their flight behavior while inside the bay. Bare drones 3601 may be signaled to descend over an available charge platform 3701. A bare drone 3601 may align itself to the charge posts of platform 3701 by utilizing optical proximity sensors and may power off for charging while connected to platform 3701 for a period of charging.

When a bare drone 3601 is fully charged, it may power up and lift off charging platform 3701 and my fly out of drone charging bay 3209 to pick up a pod in drone connect release bay 3207. Drones 3601 may fly into charging bay 3209 from drone connect/release bay 3207 after releasing a pod to a smart chassis, to charge up to full capacity. An optical signaling system may be provided to signal when a drone that has completed charging may lift off and fly out of the charging bay. Such a system may provide traffic management for flying drones within the bay. After charging drones 3601 may fly out of bay 3209 into adjacent drone connect/release bay 3207 to pick up a pod and depart the exchange station through the airspace in the building and out of a drone departure bay 3211 of FIG. 32.

Bare drones that are not pod connected may also arrive at drone charging bay 3209 from a remote location having come into the exchange station bare through drone arrival bay 3212 of FIG. 32 for charging before pod coupling. It may be noted herein that a drone may bridge electronic systems with a pod upon coupling to the pod and may charge itself from the pod battery and may not need regular charging to carry pods from station to another station. However, drones may have other duties that require long flight periods while not pod-connected. Such drones may be assigned to provide traffic flow monitoring relative to the at least three modes of main transport. Drones 3601 may also be fitted with diagnostic apparatus that may be used to detect problems in trolley rails, towers, or in other structure relative to the entire transportation system.

In general, a bare drone 3601 entering charging bay 3209 may be restricted to hover at a minimum height, perhaps 3 to 4 meters before being signaled to land on a designated charging platform 3701. Such signaling prevents more than one drone from attempting to land on a same platform. Such signaling also ensures that each signaled drone has the airspace and time to execute the descent maneuver. Likewise, bare drones 3601 perched on charging platforms 3701 may be restricted to wait on the respective charging platform 3701 until a signal that is optically or otherwise electronically received by the bare drone gives the bare drone permission to power up, lift off the platform and fly out of the charging bay.

In this embodiment, drone charging bay 3209 is immediately adjacent to drone connect/release bay 3207 of exchange station 3200 of FIG. 32. In another embodiment, drone charging bay 3209 may be implemented on the rooftop of the building or if the building has multiple floors, a floor could be dedicated for drone charging and drone connect and release operations relative to pods. In one embodiment, larger drones capable of carrying four or more pods and like charging platforms that fit them may be integrated into the same charging bay with small drones designed to carry a single pod and like charging platforms that accommodate them.

Drones may also be charged by apparatus and with methods described in U.S. Pat. No. 9,937,808, the disclosure of which is referenced above in the Cross-Reference.

Figure 38:
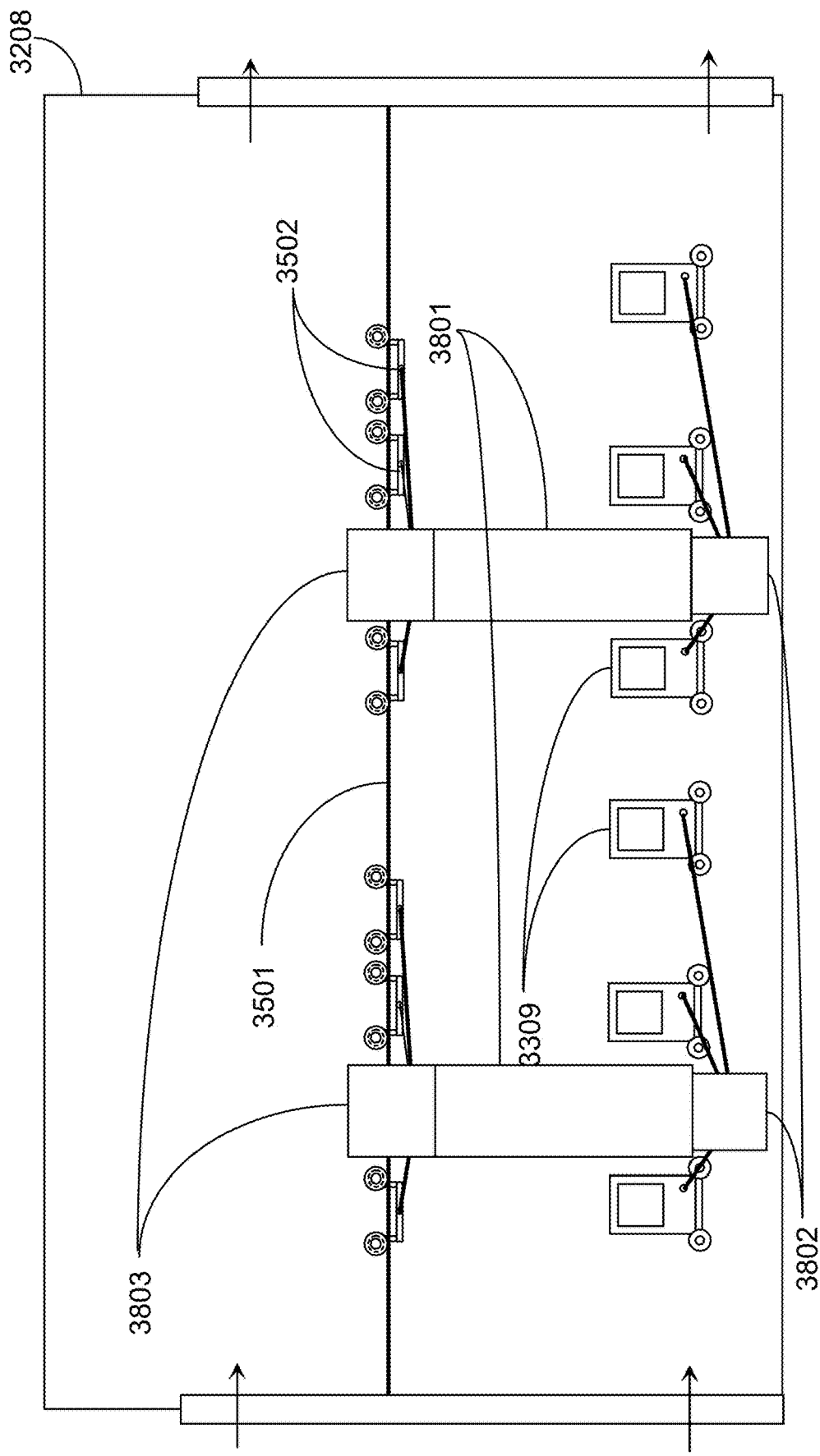
FIG. 38 is an elevation cut-away view of the trolley-pod charging bay of FIG. 32.

FIG. 38 is an elevation cut-away view of trolley/pod charging bay 3208 of FIG. 32. Trolley/pod charging bay 3208 is immediately adjacent to passenger loading/unloading bay 3205 and situated in line with trolley connect/release bay 3206. Therefore, trolley rails 3501 are supported at a minimum elevation such as 4 meters above ground level in each of these bays. Rail support pillars 3801 may be provided that may include central causeways allowing trolleys with and without pods to travel through the support pillars and receive charging without obstruction.

In this embodiment, there are ground-based charging units 3802 provided to charge pod cars 3309. Pod cars 3309 may enter pod/trolley charging bay 3208 from passenger loading/unloading bay 3205. A charge line or other indicia that may be detected by pod cars 3309 may be implemented at each ground charging unit 3802 such that self-navigating pod cars 3309 may recognize the charging station and position themselves and regulate passing speed to receive a successful charge. Charging may be quickly implemented such that pod cars 3309 need not stop completely and wait for a charge. Charging may be completed in the time that the pod car passes by.

Trolleys may be charged separately from pod cars. To that end, charging units 3803 adapted to charge trolleys may be provided at the top of the trolley platforms 3801. Charging units 3801 may engage trolleys 3501 passing by slowly or positioned on rails 3501 for charging. In one embodiment, rails at the charging units have indicia such as one or more marks, notches, or other implements that are detectable to trolleys 3501. Trolleys 3501 may detect a line, a marking, or other indicia and may stop or reduce speed to a move for the time it takes to charge. Trolleys 3501 may loop back into the trolley connect/release bay after charging in charging bay 3208.

In one embodiment, trolleys connected to pods may arrive in exchange station 3200 through trolley arrival bay 3212 and may enter trolley/pod charging bay 3208 and receive pod charge and trolley charge on the rails before passenger or parcel unloading. A trolley 3501 designated to pick up a pod with passenger(s) or a pod with parcels may be assumed fully charged if that trolley has just released a charged pod because the trolley may derive power and charge from the pod to which it is coupled. Each component that includes a battery may be enabled to report its current state of charge so that the transportation controller may intervene and divert a pod car, a trolley pod, or a drone pod to a nearest charging station at any time.

One with skill in the art of construction may appreciate that the functions provided through exchange station 3200 may also be distributed to designated floors of a multiple storied exchange station that may be in a denser urban area of the transportation system. One such exchange station may include several stories where at least one service bay may occupy each floor of the station.

In this embodiment of an exchange tower, drones may be serviced nearer to the top floors while trolleys may be serviced at one or more of the center floors and pod cars may be serviced at the lower floors. In such an architecture, pod cars may follow circular routes up from ground floor to higher floors, such as to connect with a trolley or to connect with a drone. Pod cars released on upper floors may navigate a circular path down to lower floors. Elevators for both pod cars and passengers on foot may also be provided for access to upper floors hosting service bays.

In one embodiment of the invention the smart chassis described in several places above, might have engagement elements both above and below, and trolley rails may be fashioned such that the smart chassis may also serve as a trolley traveling on the trolley rails. As a smart chassis it may travel on surfaces in the exchange station and may also be used on the trolley rails as a smart trolley.

One with skill in the art of railing construction will appreciate that trolley rails may enter a multiple storied exchange station at one floor and may occupy various routes inside the station and through certain service bays and may exit the station at the same floor at a different floor of the multistory exchange station. Trolley rails may be ramped up or down in elevation and may contain sections where directional path switching may exist for physically turning trolleys off a main rail path onto a side rail path or turning onto a main rail path from a side rail path. Side rail paths may be provided for servicing trolleys or coupling to and or releasing pods in an exchange bay like trolley connect/release bay 3206.

It will also be apparent to one with skill in the art that provision of ample height (up to 12 meters) in an otherwise closed space enables all three modes of transport to be supported within one building without any cross-interference between those modes of transportation. While a multistory exchange station may not require 12-meter ceilings to enable drone and trolley use in a same space, these transport modes may be assigned different floors such that drone and trolley exchange services and travel into and out of the building for each transport mode is not obstructed or otherwise delayed. In a large region covered by the transportation system of the invention, there may be several exchange stations, both single story and multistory. In one embodiment, a single floor exchange station may be provided as a group of separate buildings on an exchange campus without departing from the spirit and scope of the present invention.

In another implementation of exchange stations, a charging pole, as described in enabling detail in application Ser. No. 15/260,670, referenced in the Cross-Reference above, may be provided at the exchange station, in an area adjacent to the building structure, or on the roof of the building structure.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which software may be provided within the scope of the invention. The invention is limited only by the breadth of the claims below.

The invention claimed is:

1. A method for transporting a passenger from a first location to a second location, comprising:
mounting a passenger pod, being an enclosed capsule having a rechargeable battery, and a compartment with seating for the passenger, to a physically separate first transporter vehicle having electric motors for driving the first transporter vehicle, the passenger pod and the first transporter vehicle connected by a separable physical and electrical interface;
connecting the electric motors in the first transporter vehicle to the rechargeable battery in the passenger pod through the separable physical and electrical interface between the passenger pod and the first transporter vehicle, to power the electric motors by the rechargeable battery in the passenger pod; and
driving the first transporter vehicle with the passenger pod mounted, to a passenger loading position at or near the first location;
loading the passenger into the passenger pod mounted to the first transporter vehicle at the passenger loading position;
driving the first transporter vehicle carrying the passenger pod with the passenger from the passenger loading position to a first exchange point;
exchanging the passenger pod with the passenger inside from the first transporter vehicle to a separate second transporter vehicle at the first exchange point by de-mounting the passenger pod from the first transporter vehicle and then mounting the passenger pod to the second transporter vehicle by a separable physical and electrical interface between the passenger pod and the second transporter vehicle; and
driving the second transporter vehicle carrying the passenger pod and the passenger to the second location.

2. The method of claim 1 wherein the first transporter vehicle is an intelligent wheeled chassis capable of navigating on surface pathways, and the second separate transporter vehicle is an Unmanned Aerial Vehicle (UAV), adapted to carry the passenger pod suspended from the separable physical and electrical interface.

3. The method of claim 2 wherein the intelligent wheeled chassis has wheels adapted to engage a set of parallel rails that lead to the first exchange point.

4. The method of claim 1 wherein the second transporter vehicle is one of a UAV, an intelligent wheeled chassis, or a powered vehicle riding on a set of rails.

5. The method of claim 4 wherein the first location is a passenger terminal at an integrated exchange station and the first exchange point is a part of the integrated exchange station.

6. The method of claim 1 wherein the first transporter vehicle carries a single pod and the second transporter vehicle carries a plurality of pods.

7. The method of claim 5 comprising recharging transport vehicles and pod batteries as needed within the exchange station.

8. A method for transporting a parcel from a first location to a second location, comprising:
mounting a parcel pod, being an enclosed capsule having a rechargeable battery, and a compartment for carrying the parcel, to a physically separate first transporter vehicle having electric motors for driving the first transporter vehicle, the parcel pod and the first transporter vehicle connected by a separable physical and electrical interface;
connecting the electric motors in the first transporter vehicle to the rechargeable battery in the parcel pod through the separable physical and electrical interface between the parcel pod and the first transporter vehicle, to power the electric motors by the rechargeable battery in the parcel pod; and
driving the first transporter vehicle with the parcel pod mounted, to a parcel loading position at or near the first location;
loading the parcel into the parcel pod mounted to the first transporter vehicle at the parcel loading position;
driving the first transporter vehicle carrying the parcel pod with the parcel from the parcel loading position to a first exchange point;
exchanging the parcel pod with the parcel inside from the first transporter vehicle to a separate second transporter vehicle at the first exchange point by de-mounting the parcel pod from the first transporter vehicle and then mounting the parcel pod to the second transporter vehicle by a separable physical and electrical interface between the parcel pod and the second transporter vehicle; and
driving the second transporter vehicle carrying the parcel pod and the parcel to the second location.

9. The method of claim 8 wherein the first transporter vehicle is an intelligent wheeled chassis capable of navigating on surface pathways and the second separate transporter vehicle is an Unmanned Aerial Vehicle (UAV), adapted to carry the parcel pod suspended from the separable physical and electrical interface.

10. The method of claim 9 wherein the intelligent wheeled chassis has wheels adapted to engage a set of parallel rails that lead to the first exchange point.

11. The method of claim 8 wherein the second transporter vehicle is one of a UAV, an intelligent wheeled chassis, or a powered vehicle riding on a set of rails.

12. The method of claim 11 wherein the first location is a passenger terminal at an integrated exchange station and the first exchange point is a part of the integrated exchange station.

13. The method of claim 8 wherein the first transporter vehicle carries a single pod and the second transporter vehicle carries a plurality of pods.

14. The method of claim 12 comprising recharging transport vehicles and pod batteries as needed within the exchange station.

15. The method of claim 8 comprising loading a plurality of parcels having a common destination to a single parcel pod.

* * * * *